United States Patent [19]
Taketomi et al.

[11] Patent Number: 6,166,834
[45] Date of Patent: Dec. 26, 2000

[54] DISPLAY APPARATUS AND METHOD FOR FORMING HOLOGRAM SUITABLE FOR THE DISPLAY APPARATUS

[75] Inventors: Yoshinao Taketomi, Kyoto; Takeshi Karasawa, Osaka; Shiro Asakawa, Nara; Eiichiro Okuda, Osaka; Tohru Okauchi, Nara, all of Japan

[73] Assignee: Matsushita Electric Industrial Co., Ltd., Osaka, Japan

[21] Appl. No.: 08/818,578

[22] Filed: Mar. 14, 1997

[30] Foreign Application Priority Data

| Mar. 15, 1996 | [JP] | Japan | 8-059012 |
| Dec. 26, 1996 | [JP] | Japan | 8-346981 |

[51] Int. Cl.$^7$ ................................. G03H 1/00
[52] U.S. Cl. ................... 359/13; 359/15; 359/34; 349/5; 349/86
[58] Field of Search ...................... 359/13, 15, 34; 349/5, 86

[56] References Cited

U.S. PATENT DOCUMENTS

| 3,572,879 | 3/1971 | Nassenstein et al. |
| 4,942,102 | 7/1990 | Keys et al. ................................. 430/1 |
| 4,942,112 | 7/1990 | Monroe et al. ......................... 430/282 |
| 5,801,793 | 9/1998 | Faris et al. ............................... 349/15 |

FOREIGN PATENT DOCUMENTS

| 0 375 185 | 6/1990 | European Pat. Off. |
| 0 407 772 | 1/1991 | European Pat. Off. |
| 0 692 730 | 1/1996 | European Pat. Off. |
| 0 724 174 | 1/1996 | European Pat. Off. |
| 2-3081 | 1/1990 | Japan . |
| 2-889 | 1/1990 | Japan . |
| 3-175421 | 7/1991 | Japan . |
| 3-186816 | 8/1991 | Japan . |
| 4-311924 | 11/1992 | Japan . |
| 4-323619 | 11/1992 | Japan . |
| 5-107999 | 4/1993 | Japan . |
| 5-197324 | 8/1993 | Japan . |
| 6-166706 | 6/1994 | Japan . |
| 8-59012 | 3/1996 | Japan . |
| WO 91/16654 | 10/1991 | WIPO . |
| WO 96/02862 | 2/1996 | WIPO . |

OTHER PUBLICATIONS

Smothers, et al., "Photopolymers for Holography", *SPIE*, vol. 1212 Practical Holography IV, 1990, pp. 20–39.
Communication from European Patent Office (Oct. 7, 1997) and attached Search Report.

*Primary Examiner*—Darren Schuberg
*Attorney, Agent, or Firm*—Merchant & Gould P.C.

[57] ABSTRACT

A dichroic or trichromatic transparent display apparatus through which a background view is seen comprises a transparent substrate, a hologram formed on a rear face of the transparent substrate, a dispersion liquid crystal device disposed in front of a front face of the transparent substrate, a light source disposed for facing a side face of the transparent substrate and a transparent layer at least partially provided between the transparent substrate and the hologram. The refractive index of the transparent layer is smaller than that of the transparent substrate. A first light emitted from the light source and having a first wavelength is totally reflected by the boundary face between the transparent substrate and the transparent layer so that the first light moves to and is diffracted by a first region of the hologram where the transparent layer is not provided. A second light having a second wavelength is diffracted by a second region of the hologram where the transparent layer is provided. Thus, at least dichroic display is realized.

9 Claims, 55 Drawing Sheets

Lower region L

Upper region U

Degree of modulation of refraction index of light of hologram

Upper region U (PRIOR ART)

DISPLAY APPARATUS AND METHOD FOR FORMING HOLOGRAM SUITABLE FOR THE DISPLAY APPARATUS

FIELD OF THE INVENTION

This invention relates to a display apparatus and a hologram device used as an illuminator in the display, and especially relates to a transparent display apparatus through which the background view is observable.

DESCRIPTION OF THE PRIOR ART

In recent years, a polymer dispersed liquid crystal display apparatus (hereinafter abbreviated as PDLC display apparatus), in which liquid crystal is dispersed in a polymer and utilizes the light scattering of the liquid crystal, has been widely developed. Since the PDLC display apparatus does not use any polarizing plate, it can display an image brighter than that of the conventional twisted nematic liquid crystal display apparatus. A conventional PDLC display apparatus, for example, described in the Publication Gazette of Unexamined Japanese Patent Application Hei 3-186816, displays a high contrast color image by illumination of light sources disposed out of animaor field without any back light.

The constitution of the conventional PDLC display apparatus is described with reference to FIG. 55. As can be seen from FIG. 55, the conventional PDLC display apparatus comprises a liquid crystal layer 99 in which liquid crystal is dispersed in a high polymer, a pair of transparent substrates 100 and 101, a pair of transparent electrodes 102 and 103, a pair of illumination lamps 104, a light absorption plate 105 and a color filter 106. The lamps 104 are disposed at positions where an observer cannot see them directly.

Generally, when a voltage is applied between the electrodes 102 and 103, the liquid crystal dispersed in the polymer base material in the liquid crystal layer 99 is changed from the scattering state in which the liquid crystal molecules are at random to the transparent state in which the liquid crystal molecules are arranged in the same direction, and vice versa. Thus, a unit of the liquid crystal layer 99 disposed between a unit of transparent electrodes 102 and 103 constituting a pixel changes its state corresponding to the voltage applied between the electrodes 102 and 103 in each pixel.

The above-mentioned conventional PDLC display apparatus mainly uses external light such as natural light and room light for displaying the image. The external light passes through the transparent substrate 101 and the color filter 106 and enters into a pixel of the liquid crystal layer 99. When the liquid crystal molecules in the pixel are in the transparent state, the light further passes through the liquid crystal layer 99 and is absorbed by the light absorption plate 105. Thus, the observer sees the pixel as black. On the other hand, when the the liquid crystal molecules in the pixel are in the scattering state, a part of the light is scattered in the backward direction, passes through the color filter 106 again and exits in a wide angle. Thus, the observer sees the pixel as being colored. Since the lamps 104 are disposed out of the image plane, the image of the display is made brighter.

A conventional technique relating to a holographic recording film made of a photopolymer is now described. A hologram recorded in a recording film is called a volume phase hologram and has a periodic structure of minute regions respectively having different refractive indices in a medium. Thus, a surface of the hologram is flat, and the appearance of the hologram is substantially the same as that of a transparent film. Furthermore, the hologram has a high resolution, so that an optional hologram having desired functions can be realized with no relation to the reflecting type or the transmission type hologram.

A material of the photopolymer is described, for example, in the Publication Gazettes of Japanese Unexamined Patent Applications of Hei 2-889, Hei 2-3081, Hei 5-107999, and Hei 5-197324 and U.S. Pat. No. 4,942,102.

The photopolymer having the recording characteristics of the above-mentioned prior art techniques has a composition that a pigment serving as a sensitizer for giving sensitivity to laser light in the visible light region is added into a mixture of a polymerization initiator, a chain transfer agent, a binder, a monomer and a plasticizer if necessary.

A typical and conventional method for forming a hologram using a dry film type photopolymer shown, for example, in "Photopolymers for holography", SPIE 1212, 1990 is described:

| CONVENTIONAL PROCESSES | CONDITION |
|---|---|
| Forming of hologram by exposure of laser light | less than several tens mJ/cm$^2$ |
| Fixing by irradiation of Ultraviolet light | less than 100 mJ/cm$^2$ |
| Heat treatment | 120° C. two hours |

The laser light is exposed by an optical system shown in FIG. 56. As can be seen from FIG. 56, a laser light beam 108 emitted from a laser light source 107 is split into first and second laser light beams 110 and 111 by a beam splitter 109. First and second mirrors 112 and 113 are respectively positioned so that a first optical path of the first laser light beam 110 reflected by the first mirror 112 crosses a second optical path of the second laser light beam 111 reflected by the second mirror 113 at right angle, and the length of the first optical path is the same as that of the second optical path. At the position crossing of the first and second optical paths, the first and second laser light beams 110 and 111 interfere, and form a standing wave having a frequency defined by the crossing angle and the wavelength of the laser light beams.

A hologram plate 116 is formed by adhering a photopolymer 114 on a substrate 115 closely. The hologram plate 116 is alternatively provided at a first exposing position 117 illustrated by solid lines and a second exposing position 118 illustrated by dotted lines in the figure. When the hologram plate 116 is disposed at the first exposing position 117, the standing wave is recorded in a direction substantially parallel to the photopolymer 114. The completed hologram is a reflection type one. On the other hand, when the hologram plate 116 is disposed at the second exposing position 118, the standing wave is recorded in a direction substantially perpendicular to the photopolymer 114. The completed hologram is a transmission type one.

The mechanism for recording the standing wave and thereby for forming the hologram is described in detail.

For making the explanation simple, the first and second laser light beams 110 and 111 are assumed as plane waves. The standing wave formed by the interference of the first and second laser light beams 110 and 111 has an intensity distribution as shown in FIG. 57(a) which shows a substantial sine wave. Hereupon, a portion, where the intensity of light is high, is called a bright portion. Another portion, where the intensity of light is low, is called a dark portion. As shown by the cross-hatching in FIG. 57(b), photopolymerization of the photopolymer 114 starts in the bright portions. When the photopolymerization advances, a monomer is consumed in the bright portions, and thereby the density of the monomer reduces. Thus, the monomer which has not reacted moves from the dark portions to the bright portions and diffuses in the bright portions. As a result, the photopolymerization in the bright portions further advances as shown by the cross-hatching in FIG. 57(*c*). Repeating the above-mentioned processes, portions where the photopolymerization has advanced and portions where the photopolymerization has not advanced are frequently arranged in the photopolymer 114. As shown in FIG. 57(*d*), the form of the distribution of the density of the photopolymerization is substantially the same as the form of the standing wave formed by the first and second laser light beams 110 and 111. The distribution of the density of the photopolymerization appears as a modulation of the refractive index of light, so that the recorded wavefront is reproduced by a result of interaction with the light.

In the fixing process, ultraviolet light evenly irradiates a surface of the photopolymer 114 to advance the photopolymerization of the photopolymer 114 including the portions where the photopolymerization has not yet advanced. Thus, the form of the distribution of the photopolymerization by the exposure of the laser light beams is fixed. After the fixing process, even when light irradiates the photopolymer 114, the form of the distribution cannot be damaged. Thus, the intensity of the irradiation of the ultraviolet light is sufficient to be at about 100 mJ/cm$^2$.

Heat treatment has been executed for the following purposes. First is for heat hardening of the hologram by hardening of the polymer due to heat polymerization and removing remaining volatile matters. Second is for heat enhancement of the hologram by increasing the modulation of the refractive index of light due to heat distribution of radicals. Depending on the kind of the photopolymer, the modulation of the refractive index of light is largely increased by the heat treatment, and the diffraction efficiency of the hologram can become two times as much.

FIG. 58 shows absorption characteristic curves of a photopolymer suitable for forming a hologram. In FIG. 58, a characteristic curve (a) shows the change of absorption of pigment in a photopolymer which is not exposed. A characteristic curve (b) shows the change of absorption of pigment in a photopolymer after exposing with the laser light beams and fixing by ultraviolet light. A characteristic curve (c) shows the change of absorption of pigment in a photopolymer after heat treatment.

In comparing the characteristic curves (a) and (b), discoloration due to the exposure of the laser light beams and the ultraviolet light can be observed a little. However, the inherent absorption characteristic of the pigment is notably observed. For example, a peak of absorption exists in the vicinity of a wavelength 650 nm. In other words, most of the pigment remains.

In view of the characteristic curve (c), the peak of the absorption which is inherent to the pigment is largely reduced. That is, most of the pigment is decomposed by the heat treatment. Generally the photopolymer after the heat treatment is a little colored but substantially clear in appearance. Thus, the hologram made of the photopolymer geometrically disposed can be used with no problem.

However, the above-mentioned conventional display cannot display a high luminance image because of the following reasons. As shown in FIG. 59, incident light 119 incident on a surface of the polymer dispersed liquid crystal layer 99 is transformed to forward scattering light 120 and back scattering light 121. Intensity of the back scattering light 121 cannot be larger than that of the forward scattering light 120 by an inherent characteristic of the liquid crystal layer 99. Thus, more than half of the incident light 119 incident on the scattering state of the pixel of the conventional display shown in FIG. 55 is absorbed by the light absorption plate 105. Since the image has low illuminance at all times, it is substantially impossible to constitute a direct view display.

Furthermore, the display of an image by the illumination lamps 104 which are disposed out of the field of view of the observer also has a lower illuminance because of the following reasons. The incident light emitted from the lamps 104 passes through the transparent substrate 100 and enters into the liquid crystal layer 99. When the pixel of the liquid crystal layer 99 is in the scattering state, most of the incident light is transformed to the forward scattering light. However, the intensity of light in the scattering light which reaches to an observer's eyes through the color filter 106 is very small. In the conventional display shown in FIG. 55, an incident angle of the incident light from the lamps 104 to the center of the image plane is too large, that is, about 70 to 80 degrees. A component of the forward scattering light of the liquid crystal layer 99 reaching to the observer is at most 35% when the scattering condition is the best. If the positions of the lamps 104 are distant from the liquid crystal layer 99 so as to reduce the incident angle, the efficiency of the light component reaching to the observer can be increased. However, the depth of the display apparatus becomes large.

Furthermore, in the conventional display apparatus, the liquid crystal layer 99 is disposed between the light absorption plate 105 and the color filter 106. Thus, the inherent characteristic of the liquid crystal layer, that is that the liquid crystal layer can be made clear by applying a voltage, cannot be utilized.

Problems of the above-mentioned conventional hologram are now described. The appearance of the conventional hologram formed by the above-mentioned processes is a little colored, since the material of the hologram scatters some of the incident light intended for reconstruction. Depending on the kind of holograms, the coloring of the holograms generally reduces the quality of the holograms.

FIGS. 60(*a*) and 60(*b*) show a configuration of a conventional edge-lit type hologram, for example, described in the Publication Gazettes of Unexamined Japanese Patent Applications Hei 6-166706 and Hei 8-59012. As can be seen from the figures, illumination light from a lamp 123 enters into a side face of the substrate 122. A hologram of a photopolymer 124 is reconstructed by the illumination light and a hologram image 125 is reconstructed in a direction to an observer 126. In the conventional edge-lit type hologram, the reduction of quality due to the coloring is notable.

The scatterings which are the cause of the problems are roughly classified into a scattering due to a material of the hologram and a coloring due to remaining pigment.

The scattering in the material of the hologram is called "haze". With the conventional material for the holograms such as silver-salt, bicromate gelatine, etc., the haze is reduced. Similarly, with a photopolymer, haze is minimized sc, that the occurrence of haze can be ignored in a hologram formed in conventional geometry.

However, the occurrence of haze is not completely prevented. The occurrence of haze is oriented so as not to attract the attention of the observer. When the surface of the photopolymer is irradiated and observed along the surface of the photopolymer, the scattering light can be found in the irradiated region. Specifically, as shown in FIG. 61, an end face 128 of a glass substrate 127 is polished, and illumination light 130 enters into a surface of a photopolymer 129 which crosses the end face 128 at right angle. When the surface of the photopolymer 129 is observed from the end face 128, a region 131 irradiated by the illumination light 130 is clearly distinguished. This is because scattering light 132 occurring in the irradiated region 131 is observed by an observer 133.

The scattering light 132 does not enter the observer's eyes as if the haze does not occur, when a hologram of the photopolymer is formed in the conventional geometry, light irradiates the surface of the photopolymer and reproducing light from the surface of the photopolymer is observed.

The coloring due to the remaining pigment is also a cause for reducing the transparency of the hologram. Hereinafter, the term "scattering noise" includes both the haze and the coloring.

In the above-mentioned edge-lit type hologram shown in FIGS. 60(a) and 60(b), the illumination light enters on the end side of the substrate and the reconstructed light exits from the front face of the substrate. Thus, the scattering light due to the illumination light exits from the surface of the substrate.

As can be seen from FIG. 62, the scattering light 134 is observed superimposed on the reconstructed image 135. Thus, the scattering light 134 is a noise for reducing the quality of the reconstructed image 135. Furthermore, in a background region where the hologram is not formed, the scattering light 134 exits from the surface of the substrate. Thus, a portion which should be essentially transparent and the background of the substrate is seen to be muddy. The quality of the hologram device is therefore reduced.

Generally, the scattering noise in the illuminated region by laser light is larger than that in the background region. A conventional method for reducing the scattering noise in the illuminated region is described in the Publication gazette of Unexamined Japanese Patent Application Hei 8-59012. Furthermore, there are scattering noises of various intensities in the illuminated region.

FIG. 63 shows a characteristic curve of a photopolymer. As can be seen from FIG. 63, the scattering noise, which is mainly caused by the scattering due to the material of the hologram, at first, increases corresponding to the increase of the exposure. After reaching the peak, the scattering noise gradually reduces corresponding to the increase of the exposure. When such material is used for a hologram, the region where the scattering noise becomes the largest is a boundary of the illuminated region as shown in FIG. 64. That is, the boundary region 142 is irradiated by only one of a reference beam 136 and an object beam 137. Since the region is irradiated by only one of the beams 136 and 137, the amount of light irradiating the boundary region is not sufficient.

Generally, it is difficult to coincide the region irradiated by the reference beam 136 with the region irradiated by the object beam 137. Only when a mask 138 is inserted in front of a photopolymer 141 in an exposing process in a limited geometrical disposition can the regions irradiated by the reference beam and the object beam be coincident with each other. As can be seen from FIG. 65, when an incident angle of one of the reference beam 136 and the object beam 137 becomes larger, it will be difficult to coincide with the regions. Because, the reference beam 136 and the object beam 137 respectively passing the mask 138 moye in different directions having different incident angles respectively. Inevitably, the boundary region 142 where only one of the reference beam 136 and the object light 137 irradiates occurs.

Processes for forming of the edge-lit type hologram are shown in FIG. 66. As can be seen from FIG. 66, a glass block 144 such as a prism is optically contacting with a hologram plate 143 and with a photopolymer 147. A reference beam 145 enters through a mask 148 into the glass block 144 with a predetermined incident angle from a side face substantially perpendicular to the surface of the photopolymer 147. An objective beam 146 enters through a mask 148 into the hologram plate 143 substantially perpendicular to the surface of the photopolymer 147. In this forming process, a region irradiated by the reference beam 145 and a region irradiated by the object beam 146 can not be coincident with each other on the photopolymer 147. Furthermore, the mask 148 is distant from the photopolymer 147, so that a diffraction pattern at an edge of the mask 147 occurs. Thus, the boundary 149 of an illuminated region by laser light cannot be distinct. As a result, the level of scattering noise is high.

SUMMARY OF THE INVENTION

A purpose of this invention is to provide a direct view color display apparatus by which luminance of image is higher and image display region is transparent. Another purpose of this invention is to provide a hologram having a high quality and a high transparency without scattering noise in the entire illuminated region due to illumination from an edge by laser light. Still another purpose of this invention is to provide a forming method for the hologram.

A first display apparatus of this invention comprises a polymer dispersed liquid crystal display device, a Light source, a transparent substrate, a transparent layer having a refractive index of light lower than that of the transparent substrate and a hologram; wherein at least a part of said hologram is closely in contact with said transparent substrate via said transparent layer.

By such a configuration, a first light emitted from the light source and having a first wavelength is totally reflected by the boundary face between the transparent substrate and the transparent layer so that the first light moves to and is diffracted by a first region of the hologram where the transparent layer is not provided. A second light having a second wavelength is diffracted by a second region of the hologram where the transparent layer is provided. Consequently, a dichroic or trichromatic transparent display apparatus through which a background view is seen is realized.

A second display apparatus of this invention comprises a polymer dispersed liquid crystal display device, a light source, a transparent substrate, a hologram having a refractive index of light lower than that of the transparent substrate and closely in contact with said transparent substrate.

A third display apparatus of this invention comprises a polymer dispersed liquid crystal display device, a Light source, a transparent substrate, a hologram having multiple hologram structure and closely in contact with said transparent substrate.

A fourth display apparatus of this invention comprises a polymer dispersed liquid crystal display device, a light source, a transparent substrate, a reflection hologram closely in contact with said transparent substrate, wherein a light emitted from the light source enters into the transparent substrate from a bottom end face thereof, and the light is diffracted by the hologram and obliquely and downwardly exits from a front face of the transparent substrate for irradiating the dispersion liquid crystal display device.

A fifth display apparatus of this invention comprises a polymer dispersed liquid crystal display device, a light source, a transparent substrate, a transmission hologram closely in contact with said transparent substrate, wherein a light emitted from the light source enters into the transparent substrate from a bottom end face thereof, and the light is diffracted by the hologram and obliquely and upwardly exits from a front face of the transparent substrate for irradiating the dispersion liquid crystal display device.

In the above-mentioned display apparatuses, it is preferable that when the refraction index of light of the transparent layer is nT, the refraction index of light of the transparent substrate is nS, with respect to at least one propagation light moving in the transparent light by repeating the reflection at a boundary face between the transparent substrate and the transparent layer with an incident angle θ, said nT and nS satisfy a relation that nT≦nS·sin θ.

Furthermore, it is preferable that when the hologram is a reflection type, a light emitted from the light source enters into the transparent substrate from a bottom end face thereof, and the light is diffracted by the hologram and obliquely and downwardly exits from a front face of the transparent substrate.

Alternatively, it is preferable that when the hologram is a transmission type, a light emitted from the light source enters into the transparent substrate from a bottom end face thereof, and the light is diffracted by the hologram and obliquely and upwardly exits from a front face of the transparent substrate.

Furthermore, it is preferable that at least one of a pitch and a slanted angle of a periodic structure of the hologram be varied corresponding to a portion of the hologram.

Furthermore, it is preferable that when the pitch of the periodic structure of the hologram is Λ, the slanted angle of the periodic structure is φ, a mean value of a refraction index of light of the hologram is nH, the refraction index of light of the transparent substrate is nS, the circular constant is π, and a wavelength of at least one light emitted from the light source is λ, these parameters satisfy a formula of φ+cos⁻¹(λ/2πnHΛ)+sin⁻¹(1/nS)<π/2.

Alternatively, it is preferable that when the pitch of the periodic structure of the hologram is Λ, the slanted angle of the periodic structure is φ, a mean value of a refraction index of light of the hologram is nH, a wavelength of at least one light emitted from the light source is λ satisfies a formula of λ/2nHΛ>1.

Furthermore, it is preferable that the degree of modulation of the refraction index of light of the hologram be varied corresponding to various portions of the hologram.

On the other hand, a first method for forming a hologram of this invention comprises the steps of forming an interference fringe by interference of a first laser light beam and a second laser light beam in a medium for the hologram, wherein an intensity of the first laser light beam gradually increases in a predetermined direction, and an intensity of the second laser light beam gradually reduces in the direction.

A second method for forming a hologram of this invention comprises the steps of forming an interference fringe by interference of a first laser light beam and a second laser light beam in a medium for the hologram, wherein coherency of each of the first and second laser light beams gradually reduces in a predetermined direction.

In the above-mentioned methods, it is preferable that a sum of the intensities of the first and second laser light beams be substantially constant.

Furthermore, it is preferable that the medium for the hologram be a photopolymer, and the photopolymer be heated and irradiated with light after being exposed to the first and second laser light beams.

Furthermore, it is preferable that the heating and the light irradiation of the photopolymer be executed at the same time.

Furthermore, it is preferable that a temperature for heating of the photopolymer be in a range of 40 to 90° C.

Furthermore, it is preferable that the light irradiating the photopolymer have a wavelength less than 390 nm and have a power more than 10 J/cm².

Alternatively, it is preferable that the light irradiating the photopolymer have a wavelength more than 390 nm and have a power more than 50 J/cm².

Alternatively, it is preferable that the light irradiating the photopolymer includes a first light component having a wavelength less than 390 nm and having a power more than 10 J/cm², and a second light component having a wavelength more than 390 nm and having a power more than 50 J/cm².

Furthermore, it is preferable that a lamp emitting ultraviolet light and visible light be used as a light source for the light irradiation.

Alternatively, it is preferable that sunlight be used as a light source for the light irradiation.

Furthermore, it is preferable that a mask pattern be exposed on the medium for the hologram prior to the irradiation of the first and second laser light beams so as to inactivate the exposed region.

Furthermore, it is preferable that said mask pattern be formed by a spatial light modulator.

On the other hand. a method for duplicating a hologram of this invention comprises the steps of: inactivating a first region of a medium for duplicating the hologram where the hologram is not duplicated; closely contacting a master hologram on a second region of the medium where the hologram is duplicated; and exposing a laser light beam on the second region of the medium through the master hologram.

In the above-mentioned method for duplicating a hologram, it is preferable that a mask pattern be exposed on the medium for inactivating the first region prior to the exposure with the laser light beam.

Furthermore, it is preferable that said mask pattern be formed by a spatial light modulator.

DETAILED DESCRIPTION OF THE EMBODIMENTS

FIRST EMBODIMENT

A first embodiment relating to a dichroic display apparatus of this invention is now described with reference to the figures.

Figure 1:
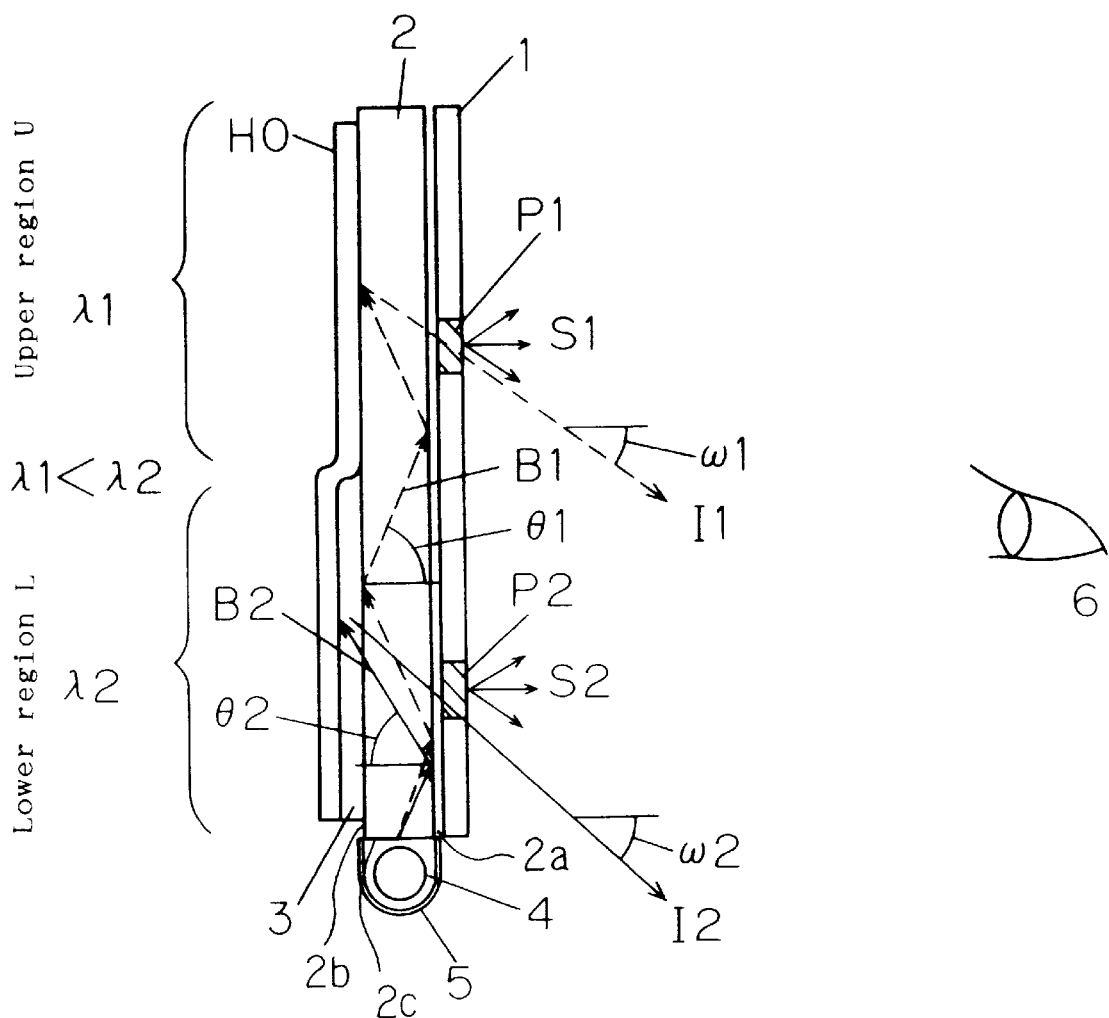
FIG. 1 is cross-sectional side view showing a configuration of a dichroic display apparatus of this invention.

FIG. 1 shows a first configuration of the dichroic display apparatus of this invention. As can be seen from FIG. 1, the display apparatus comprises a transparent substrate 2, a polymer dispersed liquid crystal device 1 disposed in front of a front face 2a of the transparent substrate 2, a transparent layer 3 formed on a part of a rear face 2b of the transparent substrate 2, a reflection type hologram H0 formed on surfaces of the transparent substrate 2 and the transparent layer 3, a cold cathode fluorescent lamp 4 disposed for facing a side face 2c of the transparent substrate 2 and a reflection mirror 5 enclosing the lamp 4. Numerical reference 6 designates an observer in the figure.

Reference I1 designates a first illumination light having a first wavelength $\lambda 1$. Reference I2 designates a second illumination light having a second wavelength $\lambda 2$. With respect to the relation between the first illumination light I1 and the second illumination light I2, the first wavelength $\lambda 1$ is shorter than the second wavelength $\lambda 2$. Reference P1 designates a first pixel which is in the scattering state. Reference S1 designates first forward scattering light from the first pixel S1. Reference P2 designates a second pixel which is in the scattering state. Reference S2 designates second forward scattering light from the second pixel S2.

The liquid crystal device 1 displays a dichroic image by using the forward scattering light due to the liquid crystal layer. The first illumination light I1 diffracted to the hologram HO irradiates the first pixel P1 from the back. The second illumination light I2 diffracted by the hologram H0 irradiates the second pixel P2 from the back. When the first pixel P1 is in the scattering state, the first illumination light I1 is scattered by the first pixel P1 and is converted to the first forward scattering light S1. Similarly, when the second pixel P2 is in the scattering state, the second illumination light I2 is scattered by the second pixel P2 and is converted to the second forward scattering light S2. The first forward scattering light SI and the second forward scattering light S2 respectively reach to the eyes of the observer 6. Thus, the observer 6 sees the dichroic image displayed by the display apparatus. It is preferable that the image be formed by one selected from dot-matrix, patterns, a combination of dot-matrix and patterns, etc.

The hologram H0 is a volume phase and reflection type one. A hologram device, including the hologram H0, the transparent substrate 2, the cold cathode fluorescent lamp 4 and the reflection mirror 5, is called an edge-lit hologram device. The hologram device serves as an illuminator of the display apparatus. The light emitted from the lamp 4 enters into the transparent substrate 2 from the side face 2c which is an edge of the hologram device. The hologram H0 diffracts light, which obliquely enters into the hologram H0 with a predetermined incident angle, toward the front face 2a of the transparent substrate 2. The hologram H0, however, does not diffract the other light, for example, which perpendicularly enters into the transparent substrate 2. Thus, an appearance of the hologram device is transparent.

Since the liquid crystal device 1 is disposed in front of the hologram device, when all the pixels of the liquid crystal device 1 are turned in the transparent state, the image field of the display apparatus is entirely transparent. The background view of the display apparatus can be seen as if it is observed through a glass.

When the first and second illumination lights I1 and I2 irradiate the pixels or the regions in the transparent state of the liquid crystal device 1, the first and second illumination lights II and I2 pass through the pixels or the regions. Since the hologram H0 exits the first and second illumination lights I1 and I2 in downward direction with a predetermined exit angle, unnecessary illumination lights I1 and I2 passing through the pixels or the regions in the transparent state of the liquid crystal device 1 do not reach the eyes of the observer 6. In other words, the observer 6 sees only the first and second forward scattering lights S1 and S2. Only the first and second pixels P1 and P2 in the scattering state, can be seen as shining to the observer 6. As a result, a high contrast image can be displayed superimposed on the background of the display apparatus.

A feature of the first embodiment of the display apparatus is partially to provide the transparent layer 3 having a refraction index lower than that of the transparent substrate 2 on the rear face 2b of the transparent substrate 2. With such a configuration, the display apparatus can display a dichroic image. In the upper region U of the image field of the display apparatus, the liquid crystal device 1 is illuminated by the first illumination light I1 having the first wavelength λ1. In the lower region L of the image field of the display apparatus, the liquid crystal device 1 is illuminated by the second illumination light I2 having the second wavelength λ2.

Figure 2:
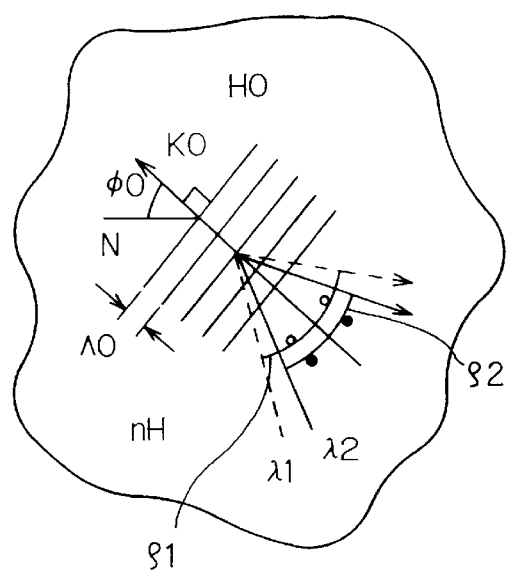
FIG. 2 is a drawing schematically showing a periodic structure of a hologram and optical paths diffracted by the hologram of the dichroic display apparatus.

A relation between the hologram H0 and a propagation light moving in the transparent substrate 2 is described with reference to FIGS. 2 and 3. FIG. 2 illustrates a relation between a periodic structure of the hologram H0 and light. Reference N designates the normal vector of a medium (eg. photopolymer film) of the hologram H0 or the normal vector of the rear face 2b of the transparent substrate 2 on which the hologram H0 is provided. Reference Λ 0 designates a pitch of the periodic structure (or grating). Reference K0 designates a grating vector. Reference φ 0 designates a slanted angle of the periodic structure with reference to the surface of the medium of the hologram H0. Reference nH designates a refraction index of the medium of the hologram H0.

As shown in FIG. 2, the hologram H0 reflects the first light having the first wavelength λ1 and crossing the grating vector K0 at an angle ρ1. Furthermore, the hologram H0 reflects the second light having the second wavelength λ2 and crossing the grating vector K0 at an angle ρ 2. These relations are shown by the following equations (1) and (2) and called the Bragg condition.

$$K0 = 4\pi nH \cdot \cos \rho 1/\lambda 1 = 4\pi nH \cdot \cos \rho 2/\lambda 2 \quad (1)$$

$$\Lambda 0 = 2\pi/K0 \quad (2)$$

Due to the theory of Kogelnik ("Coupled wave theory of thick hologram grating Bell Sys. Tech. J. 48, 2909(1969)), the maximum value of the diffraction efficiency of the hologram appears in the vicinity of an angle satisfying the Bragg condition. The diffraction efficiency has a finite value in a region of angle around the angle satisfying the Bragg condition. Thus, the phrases of "the first light having the wavelength λ1 and crossing the grating vector K0 at an angle ρ1"and "the second light having the wavelength λ2 and crossing the grating vector K0 at an angle ρ2"respectively imply that the first and second lights respectively include a plurality of light beams having an incident angle in a predetermined range of angle around the angle satisfying the conditions.

Figure 3:
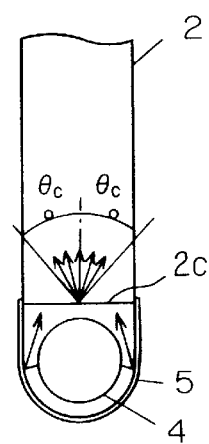
FIG. 3 is partial cross-sectional view showing the total reflection angle θ c of a propagation light moving in a transparent substrate.

As shown in FIG. 3, the light emitted from the cold cathode fluorescent lamp 4 enters directly or after reflection by the mirror 5 into the transparent substrate 2. FIG. 3 illustrates the motion of the light beams entering into the transparent substrate 2 respectively having an incident angle θ smaller than a predetermined angle θc. In FIG. 3, only the incident light beams entering at the center of the side face 2c of the transparent substrates 2 are illustrated. However, light beams emitted from the lamp 4 with the incident angle θ smaller than the total reflection angle θc can enter at any point of the side face 2c of the transparent substrate 2. The angle θc is called "total reflection angle", and is shown by the following equation (3) when the reflection index of the transparent substrate 2 is nS.

$$nS \cdot \sin \theta c = 1 \quad (3)$$

The propagation light moving in the transparent substrate 2 includes light beams (or light components) satisfying the Bragg condition with respect to the first and second wavelengths λ1 and λ2. Thus, when the propagation light enters into the hologram H0, the light beams with the first and second wavelengths λ1 and λ2 are diffracted by the hologram H0 at the same time.

Figure 4:
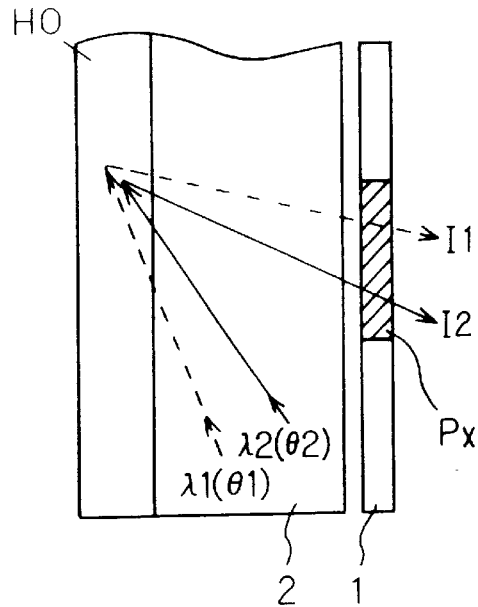
FIG. 4 is a partially enlarged cross-sectional view showing the principle that and second lights are diffracted by the hologram at the same time.

As shown in FIG. 4, the exit angle of the first illumination light I1 is a little different from the exit angle of the second illumination light I2. Thus, the first illumination light I1 and the second illumination light I2 are spatially separated and will reach to spatially different points. However, the hologram device serving as an illuminator and the liquid crystal device are closely disposed in the display apparatus. Thus, the first illumination light I1 and the second illumination light I2 are not independently separated when these illumination lights I1 and I2 reach to the pixel Px of the liquid crystal device 1. Consequently, the illumination light mixture of two colors irradiates the pixels in the scattering state.

Figure 5:
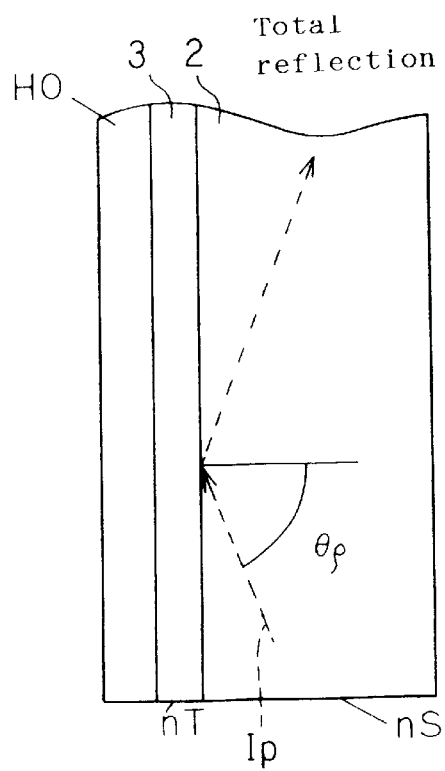
FIG. 5 is a partially enlarged cross-sectional view showing the total reflection on a boundary face between a transparent substrate and a transparent layer.

For separating the first and second illumination lights I1 and I2, the transparent layer 3 is partially provided between the hologram H0 and the transparent substrate 2, for example, in the lower legion L of the image field as shown in FIG. 1. FIG. 5 shows the total reflection on the boundary face between the transparent substrate 2 and the transparent layer 3. The refraction index nT of the transparent layer 3 is lower than the refraction index nS of the transparent substrate 2. When an incident angle θp of a first propagation light IP incident on the boundary face between the transparent layer 3 and the transparent substrate 2 is larger than the total reflection angle θc, the first propagation light IP is totally reflected. The condition for total reflection is shown by the following formula (4).

$$nT \leq nS \cdot \sin \theta c \quad (4)$$

The first propagation light IP having the incident angle θp satisfying the formula (4) is totally reflected by the boundary face, so that the first propagation light IP never reaches to the hologram H0. Thus, even when the first propagation light IP further satisfies the Bragg condition with respect to the hologram H0, no illumination light is converted from the first propagation light IP by diffraction due to the hologram H0, since the first propagation light IP does not reach the hologram H0.

Figure 6:
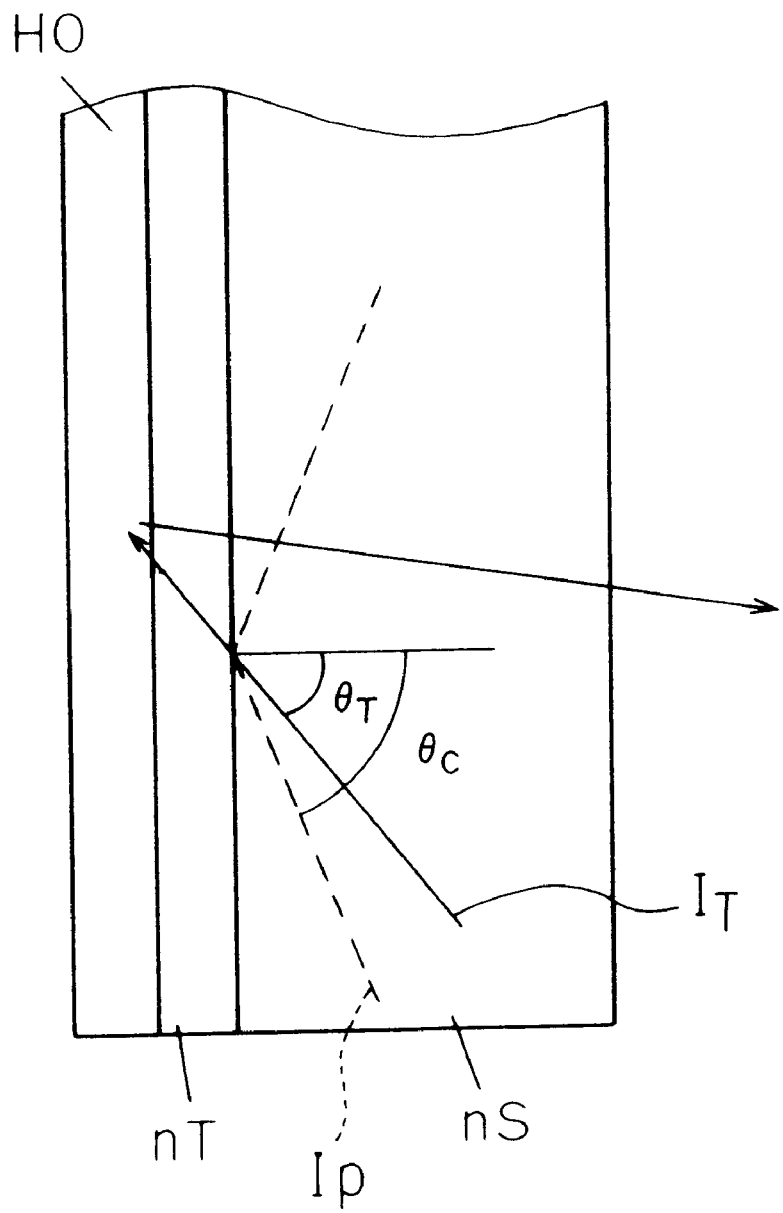
FIG. 6 is a partially enlarged cross-sectional view showing the phenomenon that a light passing the boundary between the transparent substrate and the transparent layer is diffracted by the hologram.

On the other hand, as shown in FIG. 6, when a second propagation light IT enters on the boundary face between the transparent layer 3 and the transparent substrate 2 with a small incident angle θt which does not satisfy the formula (4), the second propagation light IT passes through the boundary face. When the second propagation light IT satisfies the Bragg condition with respect to the hologram H0, the second propagation light IT is diffracted by the hologram H0 and is converted to illumination light.

As mentioned above, the first and second propagation lights IP and IT are separated corresponding to their incident angles θp and θt by the existence of the transparent layer 3 which is partially provided between the transparent substrate 2 and the hologram H0. Especially, since the reflection type hologram is used in the display apparatus of the first embodiment, the condition of total reflection can easily be satisfied with respect to the light having relatively shorter wavelength. On the contrary, when the transmission type hologram is used in the display apparatus, the condition of total reflection can easily be satisfied with respect to light having relatively longer wavelength.

Operation of the display apparatus using the above-mentioned principle for separating dichroic illumination lights is described with reference to FIG. 1.

The light emitted from the cold cathode fluorescent lamp 4 enters directly or after reflection by the mirror 5 into the transparent substrate 2. A part of the incident light (hereinafter, propagation light) moves in the transparent substrate 2 by repeating the total reflection on the boundary face between the transparent substrate 2 and the hologram H0 or the transparent layer 3. A part of the remainder reaches to the other end face of the transparent substrate 2 without being diffracted by the hologram H0.

A first propagation light B1 which is illustrated by dotted line in FIG.1 has the first wavelength λ1 and moves in the transparent substrate 2 by repeating the total reflection with a first incident angle θ1. The first propagation light B1 satisfies the formula (4). A second propagation light B2 which is illustrated by solid line in FIG. 1 has the second wavelength λ2 and moves in the transparent substrate 2 by repeating the total reflection with a second incident angle θ2. The second propagation light B2 does not satisfy the formula (4). Both the first propagation light B1 and the second propagation light B2 satisfy the equation (1) with respect to the Bragg condition, so that both the first propagation light B1 and the second propagation light B2 are diffracted by the hologram H0. The relation between "ρ" and "θ" in the equation (1) is defined by the following equations (5) and (6).

$$\theta1=\rho1+\phi0 \quad (5)$$
$$\theta2=\rho2+\phi0 \quad (6)$$

Figure 7A:
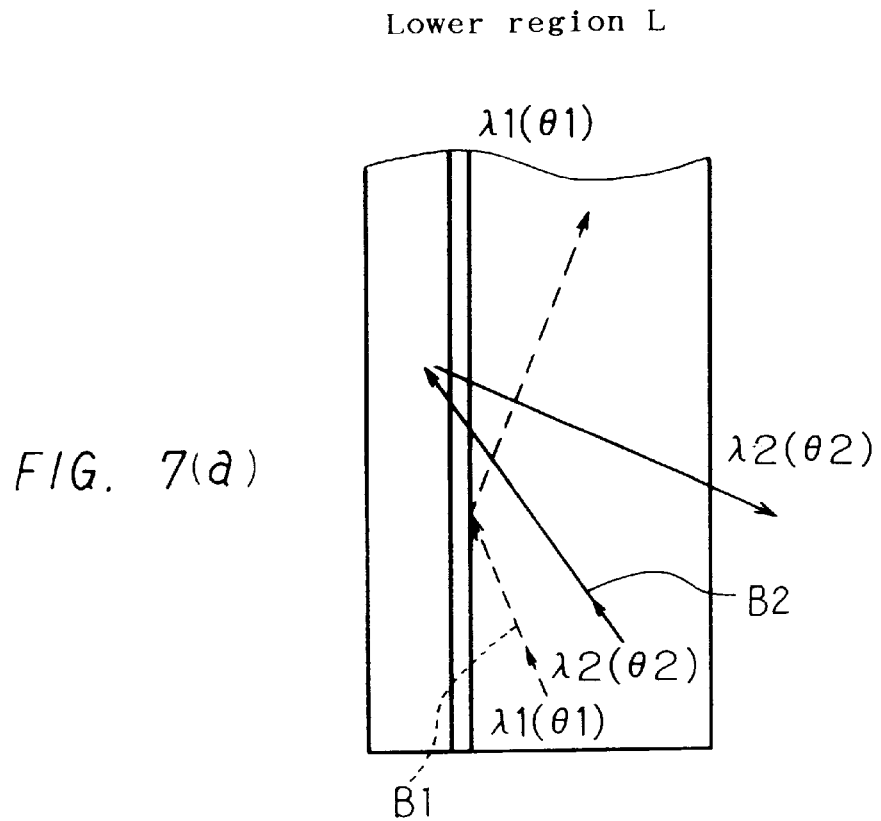
FIG. 7(a) is a partially enlarged cross-sectional view showing the phenomenon that the first light having a wavelength λ1 and the second light having a wavelength λ2 are separated.
Figure 7B:
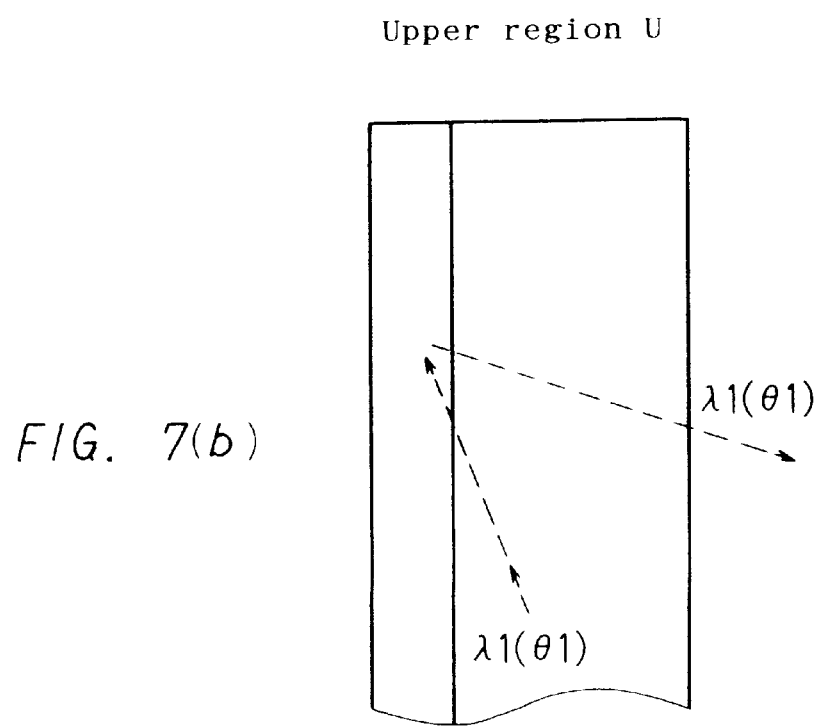
FIG. 7(b) is a partially enlarged cross-sectional view showing that the first light having the wavelength λ1 is diffracted by a part of the hologram where the transparent layer is not provided.

As shown in FIG. 7(a), the first propagation light B1 is totally reflected by the boundary face between the transparent substrate 2 and the transparent layer 3 in the lower region L. The first propagation light B1 further moves to the upper region U where the hologram H0 and the transparent substrate 2 directly contact as shown in FIG. 7(b). In the upper region U, the first propagation light B1 is diffracted by the hologram H0, and exits to the outside (atmosphere) with an exit angle ω1 as shown in FIG. 1. The exit light corresponds to the first illumination light I1. The first illumination light I1 enters into the first pixel P1 of the liquid crystal device 1, and is scattered by the liquid crystal in the first pixel P1. The first illumination light I1 is converted to first scattering light S1 by the first pixel P1. Finally, the first scattering light S1 reaches to the observer 6.

On the other hand, as shown in FIG. 7(a), the second propagation light B2 does not satisfy the condition of total reflection in the lower region L, so that the second propagation light B2 passes through both the transparent substrate 2 and the transparent layer 3 in the lower region L. In the Lower region L, the second propagation light B2 is diffracted by the hologram H0, and exits to the outside with an exit angle ω2 as Shown in FIG. 1. The exit light corresponds to the second illumination light I2. The second illumination light I2 enters into the second pixel P2 of the liquid crystal device 1, and is scattered by the liquid crystal in the pixel P2. The second illumination light I2 is converted to the second scattering light S2 by the second pixel P2. Finally, the second scattering light S2 reaches to the observer 6.

Most of the second propagation light B2 is converted to the second illumination light I2 in the lower region L, and rarely reaches to the upper region U. Thus, the second illumination light I2 having the wavelength λ2 rarely occurs in the upper region U.

By the above-mentioned mechanisms, the first and second pixels P1 and P2 are respectively observed as different colored scattering pixels by the observer 6.

Specific data for parameters of the display apparatus in the first embodiment are recited below. However, the display apparatus of this invention is not limited to the indicated values of the parameters.

The color of the cold cathode fluorescent lamp 4 was a mixture of blue and green, and the diameter of the lamp 4 was 3 mm;

The reflection mirror 5 was an evaporation film of aluminum;

The material (optical glass) of the transparent substrate 2 was BK7, the refraction index nS thereof was 1.52, and the thickness of the transparent substrate 2 was 4 mm;

The material of the transparent layer 3 was $SiO_2$, the refraction index thereof was 1.46 and the thickness of the transparent layer 3 was 1 μm;

The first wavelength λ1 was 485 nm, and the second wavelength λ2 was 545 nm;

The material of the hologram H0 was photopolymerizing type photopolymer, the refraction index nH thereof was 1.5, and the thickness of the hologram H0 was 10 μm;

The slanted angle φθ0 of the periodic structure of the hologram H0 was 45 degrees;

The pitch Λ0 of the periodic structure of the hologram H0 was 0.19 μm;

The first incident angle θ1 of the first propagation light B1 having the first wavelength λ1 was 79 degrees, and the exit angle ω1 of the first illumination light I1 to the atmosphere was 17 degrees;

The second incident angle θ2 of the second propagation light B2 having the second wavelength λ2 was 65 degrees, and the second exit angle ω2 of the second illumination light I2 to the atmosphere was 40 degrees; and The total reflection angle θc was 74 degrees.

The first exit angle ω1 with 17 degrees and the second exit angle ω2 with 40 degrees of the display apparatus of this invention are obviously smaller than the exit angles in the conventional display apparatus. Thus, the intensities of the first and second scattered lights S1 and S2 scattered by the first and second pixels P1 and P2 of the liquid crystal display 1 are greatly increased by this invention in comparison with the conventional display apparatus.

Figure 8:
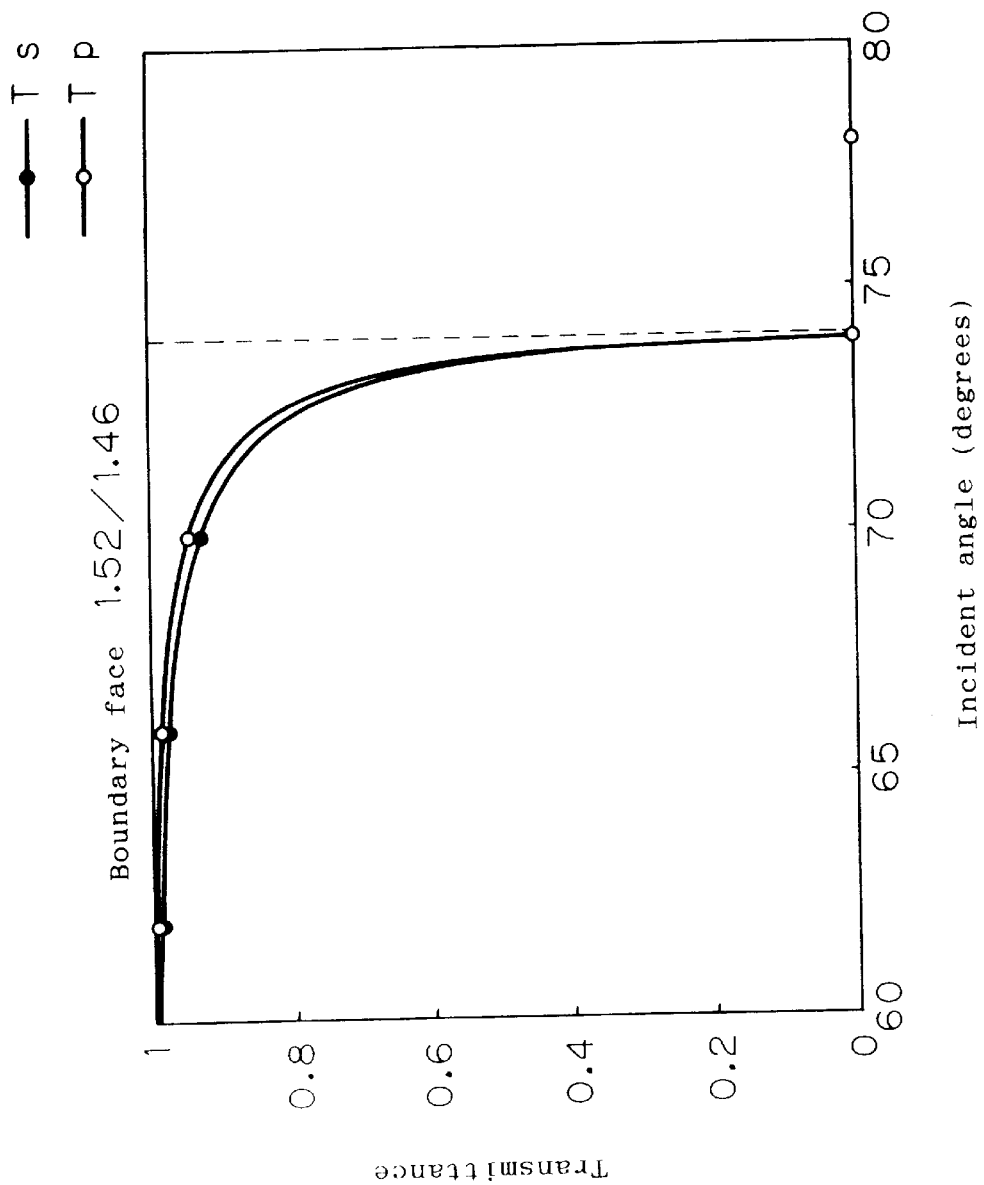
FIG. 8 is a graph showing dependency of the transmittance on an incident angle of the light on the the boundary between the transparent substrate and the transparent layer.

FIG. 8 is a graph showing characteristic curves of the relation between transmittance and the incident angle of the propagation light on a supposed bulk boundary between the transparent substrate 2 which was made of BK7 and the transparent layer 3 which was made of $SiO_2$. In FIG. 8, a characteristic curve Ts shows the change of the transmittance with respect to the s-polarized light, and a characteristic curve Tp shows the change of the transmittance with respect to the p-polarized light. As can be seen from FIG. 8, both the p-polarized light and the s-polarized light were respectively totally reflected in the vicinity of the incident angle with 74 degrees, and the transmittance becomes 0 in the range of the incident angle larger than 74 degrees.

In the first embodiment, the transparent layer 3 was a thin film having the thickness of 1 μm formed by sputtering of $Sio_2$. If the thickness of the transparent layer 3 is thinner than a predetermined thickness, the propagation light, which satisfies the condition of total reflection, passes through the transparent layer 3 and reaches to the hologram H0. However, when the thickness of the transparent layer 3 was 1 μm, the propagation light rarely reached to the hologram H0. Thus, the transparent layer 3 satisfied the condition of total reflection, as if the bulk of $SiO_2$ existed.

The materials of the transparent layer 2 and the transparent layer 3 are not restricted by the above-mentioned case. Many combinations of the materials so long as they satisfy the above-mentioned generic condition are usable.

Figure 9:
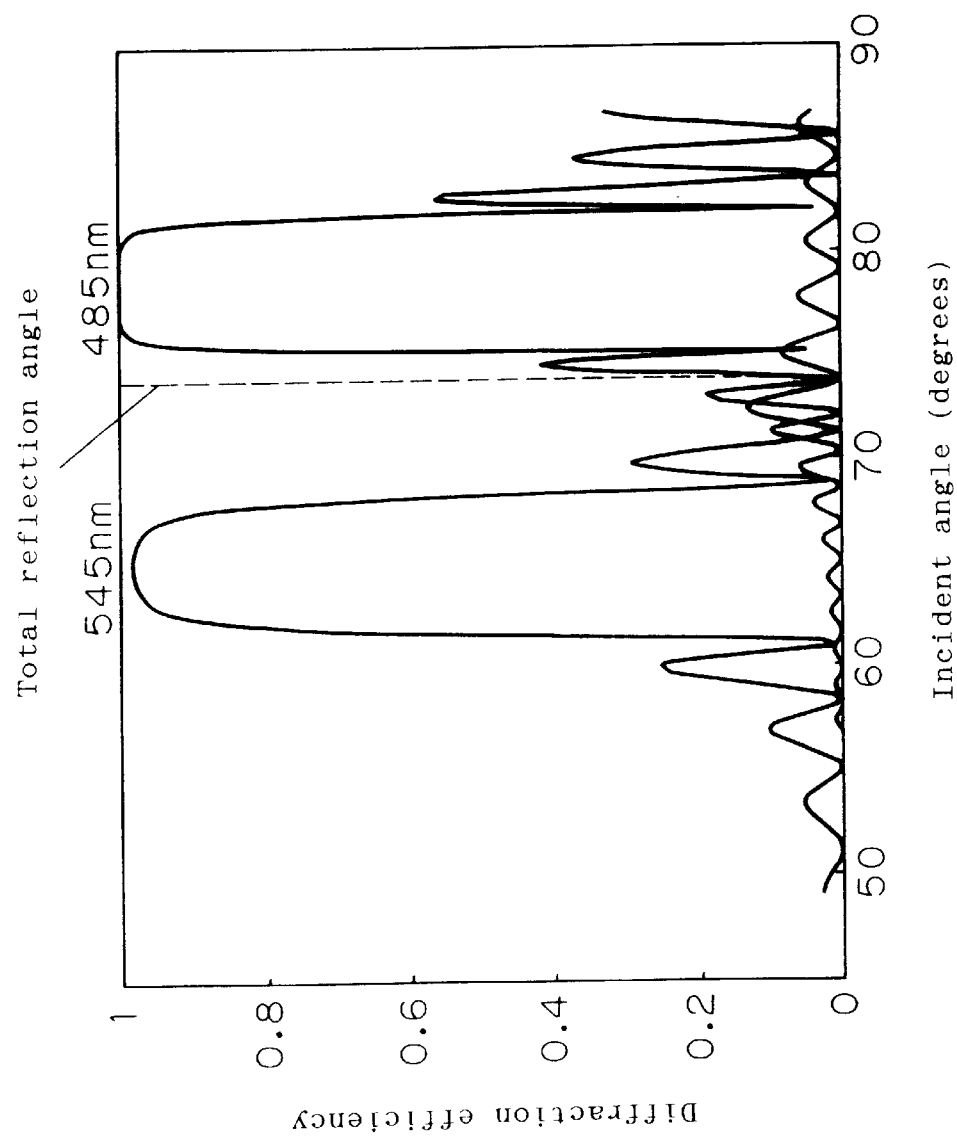
FIG. 9 is a graph showing dependency of diffraction efficiency of the hologram on the incident angle of t.

FIG. 9 is a graph showing characteristic curves of a relation between the diffraction efficiency of the hologram H0 and the incident angle of the propagation light, and especially shows the characteristic curves with respect to the first propagation light B1 having the wavelength with 485 nm (λ1) 1) and the second propagation light B2 having the wavelength with 545 nm (λ2). In order to simplify the graph, the characteristic curves for the s-polarized light are plotted in the figure.

As can be seen from FIG. 9, with respect to the first propagation light B1 which has the wavelength with 485 nm and satisfies the Bragg condition, the first incident angle of the first propagation light B1 incident on the hologram H0 must be within a range having a center incident angle with about 79 degrees. The smallest incident angle, by which the first propagation light B1 was diffracted by the hologram H0, was larger than the total reflection angle with 74 degrees on the boundary face between the transparent substrate 2 and the transparent layer 3. Thus, the first propagation light B1 having the wavelength with 485 nm and satisfying the Bragg condition is totally reflected by the boundary face between the transparent substrate 2 and the transparent layer 3. Thus, as shown in FIG. 1, in the lower region L where the transparent layer 3 is provided, the first illumination light I1 having the first wavelength with 485 nm (λ1) does not occur.

Figure 10:
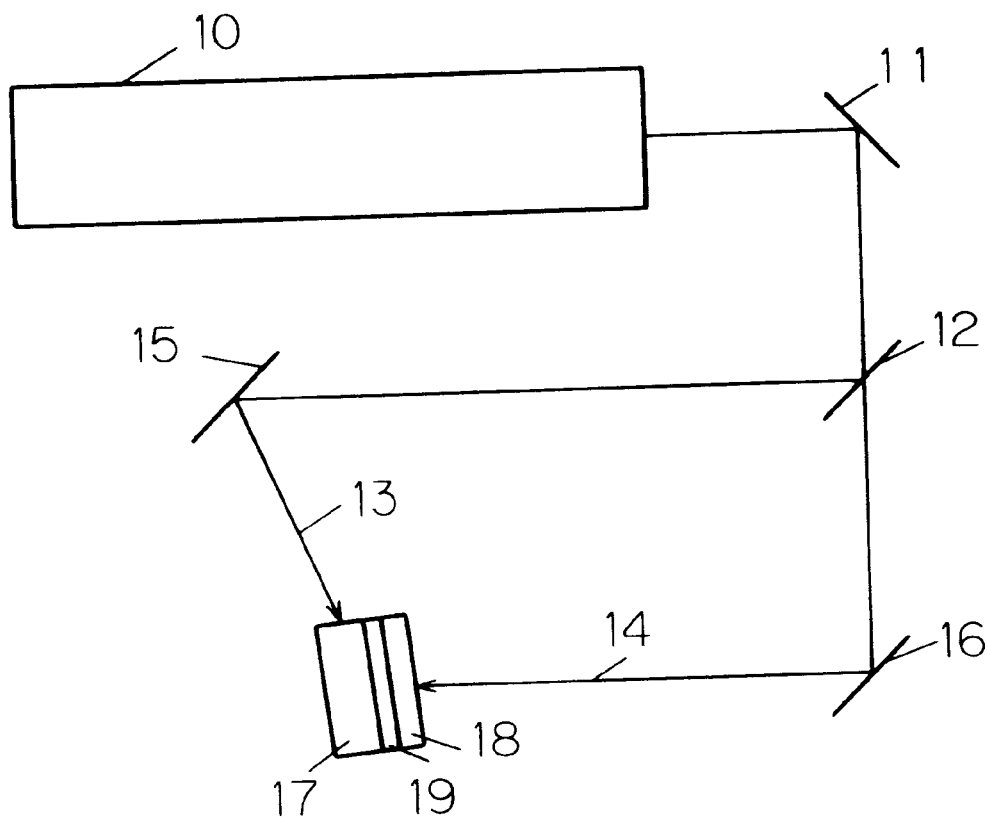
FIG. 10 is a plan view showing an optical system for forming the hologram.

FIG. 10 shows an exposure system for forming the hologram H0. As can be seen from FIG. 10, the exposure system comprises an argon laser 10, first, second and third reflection mirrors 11, 15 and 16, a beam splitter 12, a first glass block 17, a second glass block 18 and a hologram substrate 19. The argon laser 10 emits a laser light having a wavelength with 514.4 nm, and the polarizing direction of the laser light is in a direction perpendicular to the paper sheet of FIG. 10. In FIG. 10, numerical reference 13 designates a reference light beam and numerical reference 14 designates an object light beam.

The laser light beam emitted from the argon laser 10 is reflected for changing the moving direction by the first reflection mirror 11 and expanded to have a cross-sectional area wider than the size of the hologram substrate 19 by a beam expander not shown in the figure. Furthermore, the laser beam is split into the reference light beam 13 and the object light beam 14 by the beam splitter 12. The reference light beam 13 is reflected for changing the moving direction by the second reflection mirror 15 and reaches an exposing position with a predetermined angle. The object light beam 14 is reflected for changing the moving direction by the third reflection mirror 16 and reaches to the exposing position with a predetermined angle. The hologram substrate 19, which is nipped by the first and second glass blocks 17 and 18, is disposed at the exposing position. The integration of the first and second glass blocks 17 and 18 and the hologram substrate 19 has predetermined angles with respect to both the reference light beam 13 and the object light beam 14.

Figure 11:
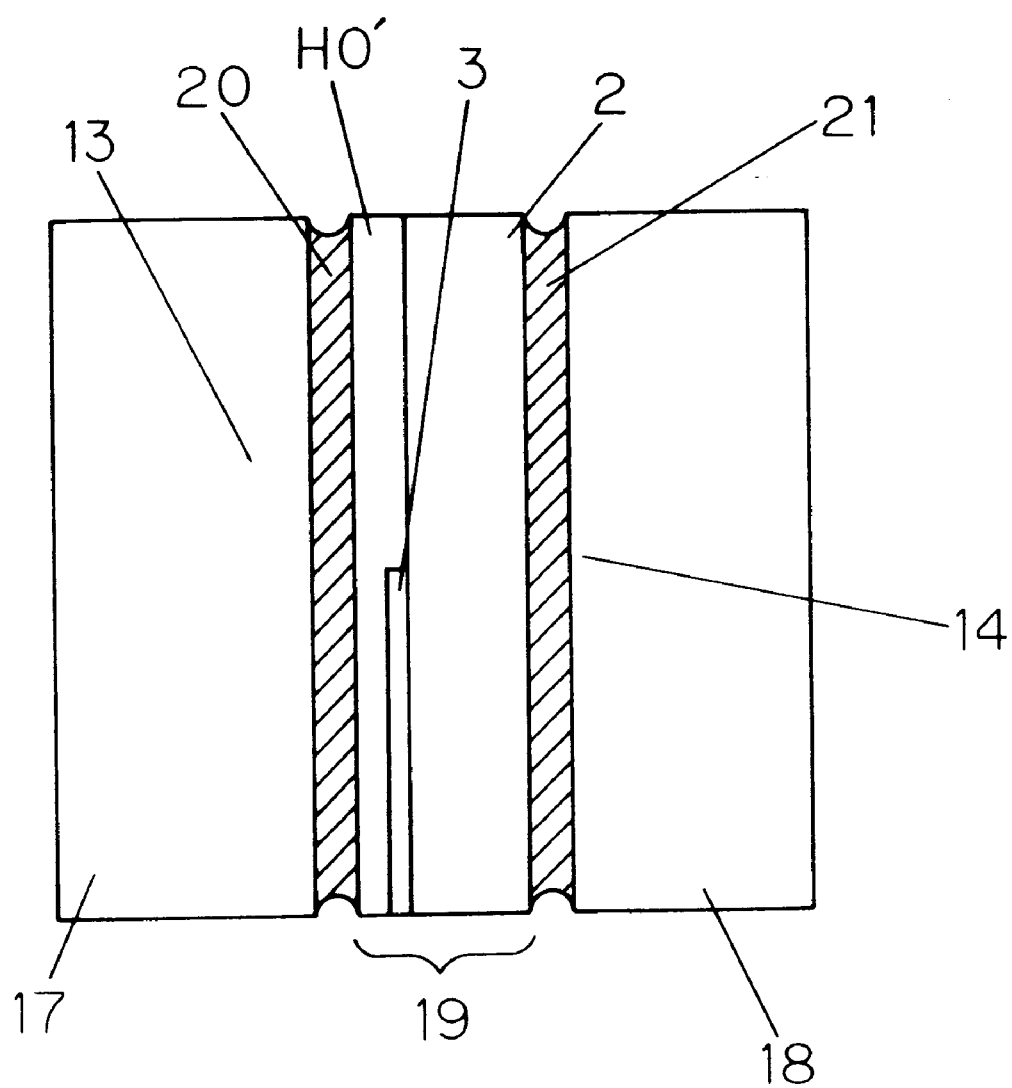
FIG. 11 is an enlarged side view showing a configuration of an integration of a hologram substrate.

FIG. 11 illustrates the details of the integration of the first and second glass blocks 17 and 18 and the hologram substrate 19. As can be seen from FIG. 11, the hologram substrate 19 comprises a transparent substrate 2, a transparent layer 3 partially formed on a surface of the transparent substrate 2 and a photopolymer H0' formed so as to contact the surfaces of the transparent substrate 2 and the transparent layer 3. The first glass block 17 and the hologram substrate 19 are closely adhered with a first reflection index matching fluid 20. The second glass block 18 and the hologram substrate 19 are closely adhered with a second reflection index matching fluid 21. The reference light beam 13 enters into the first glass block 17 from the side face thereof and reaches to the photopolymer H0'. The object light beam 14 enters into the second glass block 18 from the front face thereof and reaches to the photopolymer H0'. An interference fringe is formed by the reference light beam 13 and the object light beam 14 in the photopolymer H0'. Thus, the pattern of the interference fringe is recorded as a hologram. By the configuration of the exposure system shown in FIG.10, an upper part of the photopolymer H0' in FIG. 11 corresponds to the upper region U of the image field shown in FIG. 1.

In the exposure system shown in FIG. 10, the reference light beam 13 enters from the side face of the first glass block 17. Alternatively, it is possible that the reference light beam enters from the side face of the second glass block 18 and passes through the front face of the hologram substrate 19. At this time, the object light beam 14 enters from the side face of the first glass block 17.

The photopolymerization type photopolymer having refraction index of 1.5 was used for the material of the hologram. After exposing with the laser light beams, an ultraviolet light evenly irradiates the surface of the photopolymer H0' for entirely photopolymerizing the photopolymer H0'. However, the material of the hologram is not restricted by the photopolymer. Another material such as silver halide emulsions, dicromated gelatin, etc. can be used as a material of the hologram.

Furthermore, a light absorption member is closely adhered on the glass blocks 17 and 18 for absorbing surplus light, if necessary. The shapes of the glass blocks 17 and 18 are not restricted by the illustration in FIGS. 10 and 11. For example, a prism having a triangle cross-section can be used as a glass block 17 or 18.

Figure 12A:
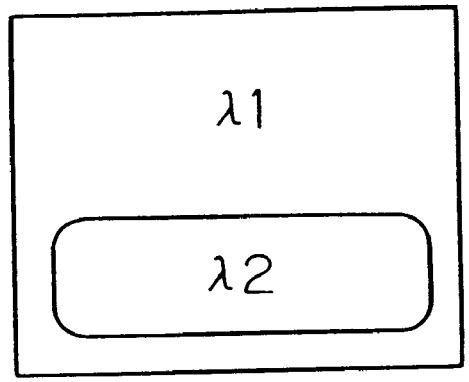
FIG. 12(a) is a schematic front view showing a first example of an image field of the display apparatus of this invention.
Figure 12B:
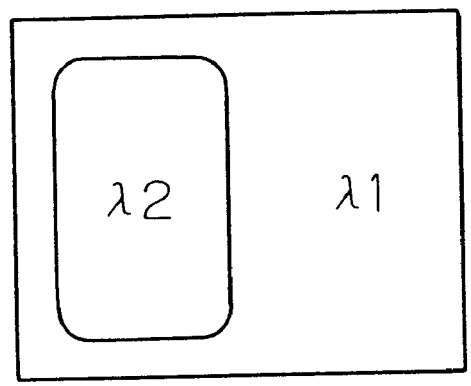
FIG. 12(b) is a schematic front view showing a second example of an image field of the display apparatus of this invention.
Figure 12C:
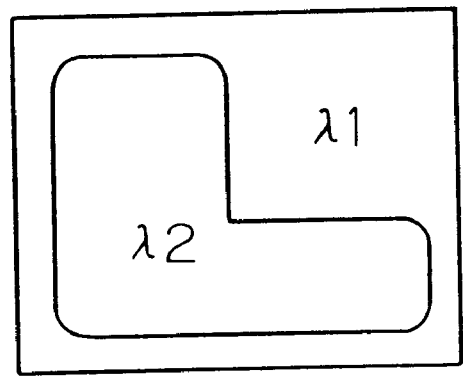
FIG. 12(c) is a schematic front view showing a third example of an image field of the display apparatus of this invention.

Variations of the display apparatus in the first embodiment are now described referring to FIGS. 12(a) to 12(c) which show an image field of the display apparatus. In the figures, the illumination light source (not shown in the figures) are supposed to be disposed below the image field.

FIG. 12(a) shows a first example of the display apparatus in which a first region displaying a monochromatic image by the first illumination light I1 having the first wavelength $\lambda 1$ is disposed in an upper portion of the image field, and a second region displaying a monochromatic image by the second illumination light I2 having the second wavelength $\lambda 2$ is disposed in a lower portion of the image field. The sizes of the first and second region are freely selected.

FIG. 12(b) shows a second example of the display apparatus in which the first region corresponding to the first illumination light I1 is disposed in a left-hand portion of the image field, and the second region corresponding to the second illumination light I2 is disposed in a right-hand portion of the image field. The positions of the first region and the second region are changeable.

FIG. 12(c) shows a third example of the display apparatus in which the first region corresponding to the first illumination light I1 is disposed in an upper right portion of the image field, and the second region corresponding to the second illumination light I2 is disposed in upper left, lower right and left portions of the image field. The sizes of the first and second region are freely selected.

Furthermore, when at least one of the first and second regions is vertically oblong in the image field, it is preferable that the modulation of refraction index of the hologram H0 be distributed (first configuration). Alternatively, it is preferable that the slanted angle of the periodic structure of the hologram H0 be distributed (second configuration). Alternatively, it is preferable that both the modulation of refraction index and the slanted angle of the periodic structure of the hologram H0 be distributed (third configuration).

Figure 13:
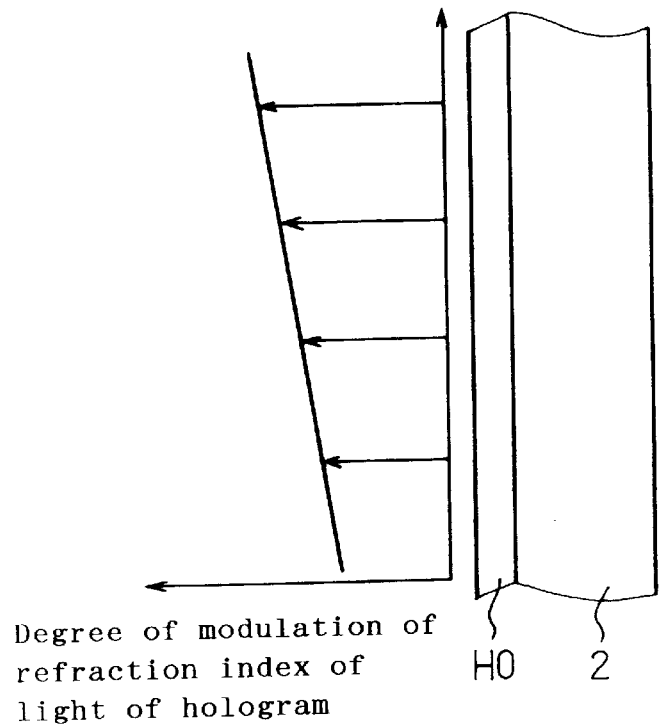
FIG. 13 is a drawing schematically showing a distribution of the degree of modulation of the refraction index of light due to the hologram.

At first, the distribution of the modulation of refraction index of the hologram in the first configuration is described. FIG. 13 shows the distribution of the modulation of refraction index of the hologram H0. As can be seen from FIG. 13, the refraction index of the hologram H0 gradually increases from the lower region to the upper region of the image field. By such a configuration, the intensity of the illumination light can be made even in the vertical direction of the image field. As a result, the luminance of the display apparatus is made even.

Figure 14:
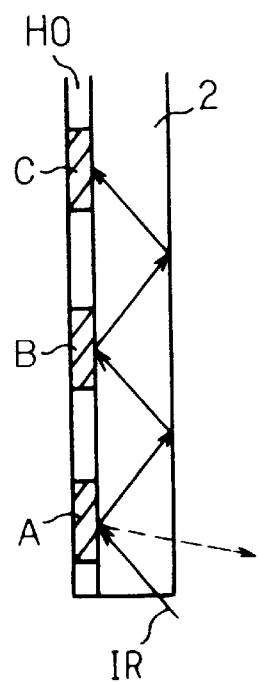
FIG. 14 is a partially enlarged cross-sectional view showing the motion of the propagation light in the transparent substrate.

FIG. 14 schematically shows the movement of the propagation light IR in the transparent substrate 2. When the propagation light IR reaches to a first region A of the hologram H0, a part of the propagation light IR is converted to the illumination light by the diffraction due to the first region A of the hologram H0.

If the diffraction efficiency due to the first region A of the hologram H0 is higher, most of the propagation light IR is consumed by the diffraction. At an extreme, if the diffraction efficiency due to the first region A is 100%, all the propagation light IR is converted to the illumination light, and no propagation light reaches to a second region B, a third region C, . . . of the hologram H0. Thus, the lower region of the image field is relatively bright and the upper region is relatively dark. The cause of this phenomenon is that the diffraction efficiency due to the first region A is assumed higher.

Generally, the diffraction efficiency depends on the degree of modulation of the refraction index of the hologram H0. Thus, when the modulation of the refraction index of the hologram is distributed as shown in FIG. 13, the diffraction efficiency of the hologram H0 in the lower region of the image field near to the illumination light source becomes relatively smaller, and the diffraction efficiency of the hologram H0 in the upper region of the image field distant from the illumination light source becomes relatively larger. The consumption of propagation light IR in the lower region of the image field is less, and the remaining light is distributed to the upper region. Thus, the luminance of the display apparatus is made even.

In a reflection type hologram, when the modulation of refraction index of the hologram increases, the diffraction efficiency asymptotically approaches 100%. After that, the luminance of the display apparatus increases by expansion of the band width of diffraction angle or wavelength.

A method for obtaining the distribution of refraction index of the hologram H0 is now described with reference to FIGS. 15(a), 15(b) and 15(c). These figures show the distribution of the intensity of the reference light beam 13 and the object light beam 14 in the exposure system shown in FIG. 10 in the vertical direction of the image field.

Figure 15A:
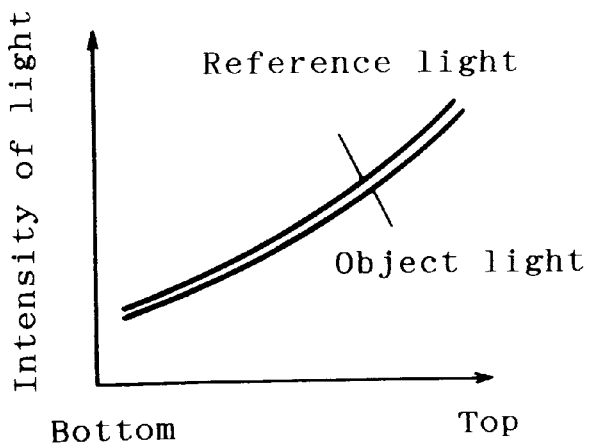
FIG. 15(a) is a graph showing distribution curves of intensity of the reference light and the object light for realizing the uniformity of luminance of the display apparatus.

FIG. 15(a) shows a first method in which the intensity of the reference light beam 13 gradually increases from the lower region to the upper region of the image field corresponding to the increase of the intensity of the object light beam 14. By such a configuration, a quantity of the light exposure in the lower region of the image field is relatively smaller and the quantity of the light exposure in the upper region of the image field is relatively larger. As a result, the above-mentioned distribution of the modulation of refraction index of the hologram shown in FIG. 13 is obtained. The first method is generally known.

Figure 15B:
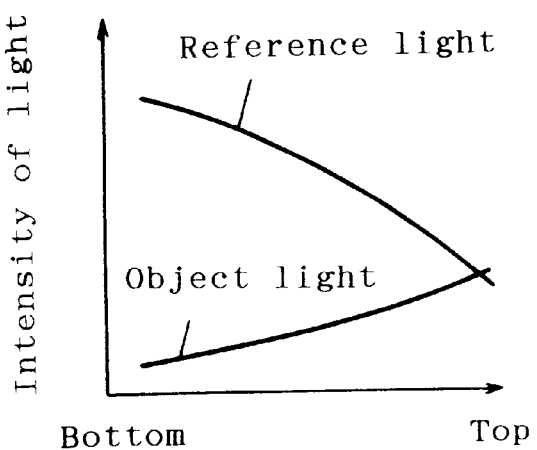
FIG. 15(b) is a graph showing distribution curves of intensity of the reference light and the object light for realizing the uniformity of luminance of the display apparatus and for minimizing the occurrence of haze.
Figure 15C:
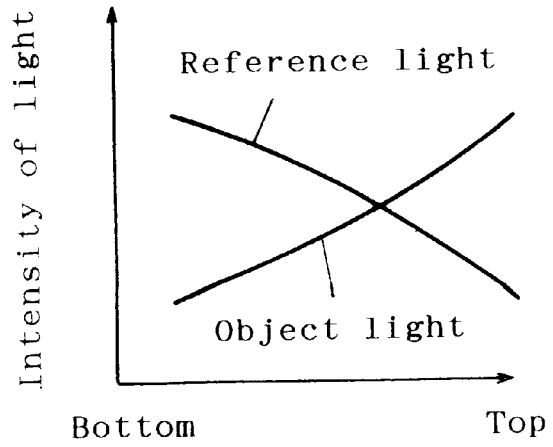
FIG. 15(c) is a graph showing distribution curves of intensity of the reference light and the object light for increasing the intensity in the vicinity of the center of the image field of the display apparatus.

FIG. 15(b) shows a second method in which the intensity of the reference light beam 13 is gradually reduced from the lower region to the upper region of the image field, and the intensity of the object light beam 14 is gradually increased from the lower region to the upper region of the image field. Furthermore, at the upper end of the image field, the intensity of the reference light beam 13 is substantially equal to the intensity of the object light beam 14. By such a configuration, the degree of the modulation of the interference fringe in the lower region of the image field is relatively smaller, and the degree of the modulation of the interference fringe in the upper region of the image field is relatively larger. As a result, the above-mentioned distribution of the modulation of refraction index of the hologram shown in FIG. 13 is obtained.

Figure 63:
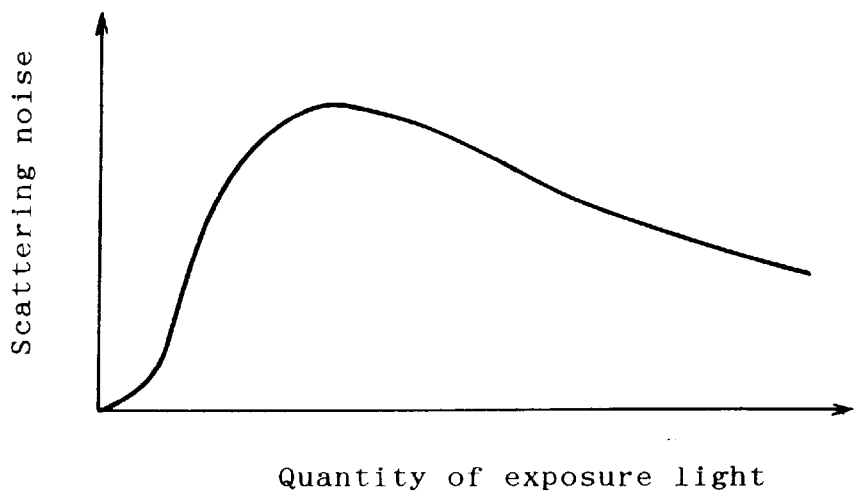
FIG. 63 is a graph showing the relation between the scattering noise due to the photopolymer and the intensity of exposure light for forming the hologram.
Figure 64:
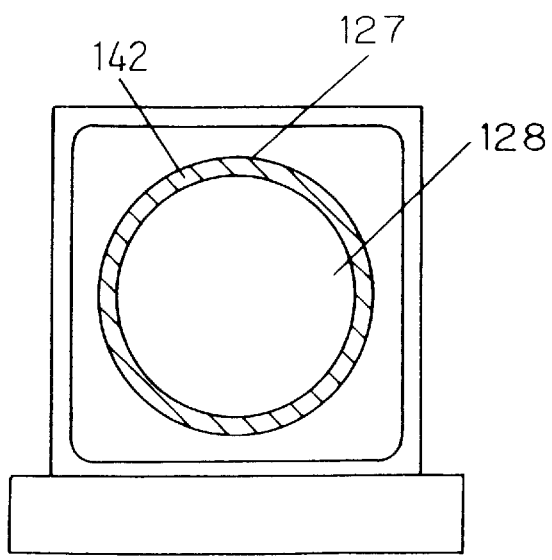
FIG. 64 is a front view of the conventional display apparatus showing a boundary region where the laser light irradiates.
Figure 65:
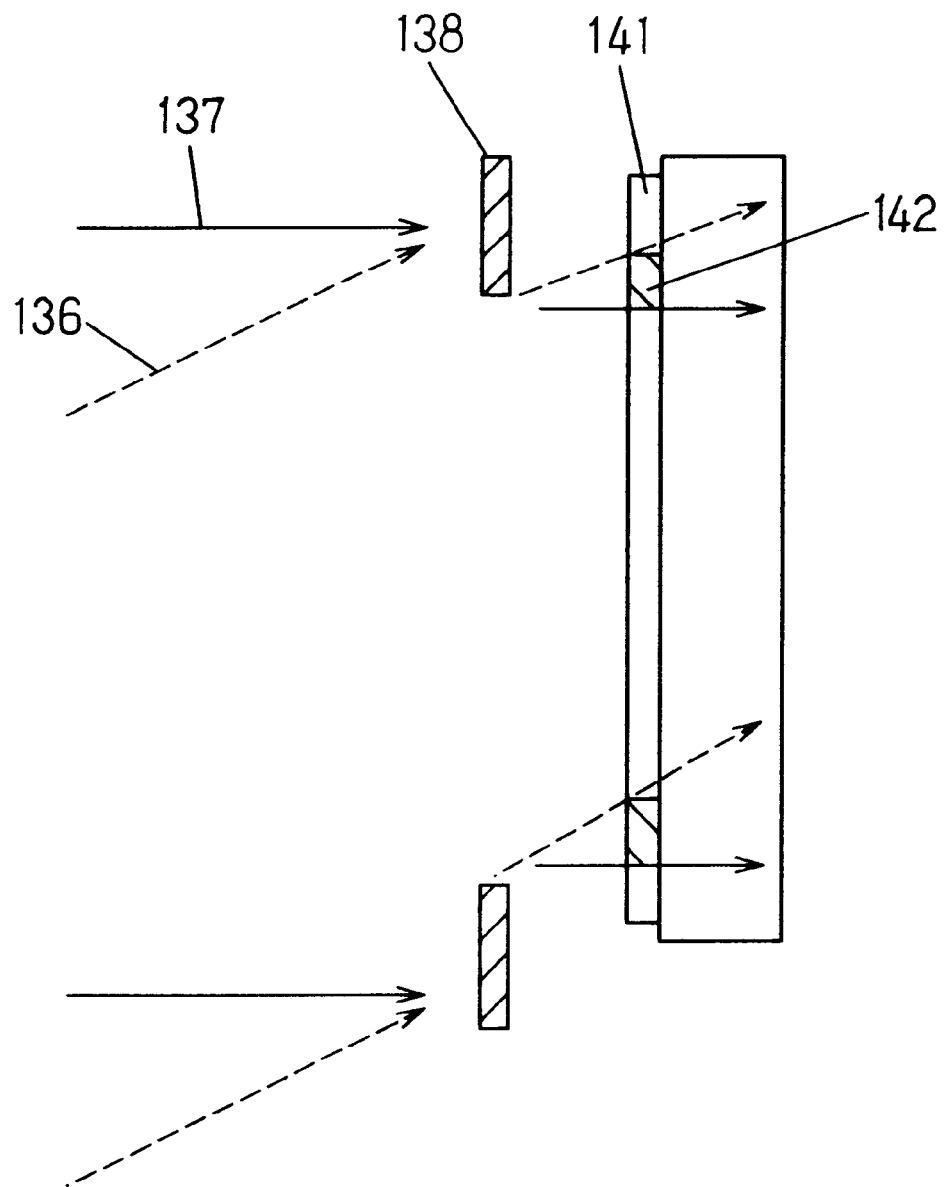
FIG. 65 is a cross-sectional side view showing the principle by which the boundary region is formed.
Figure 66:
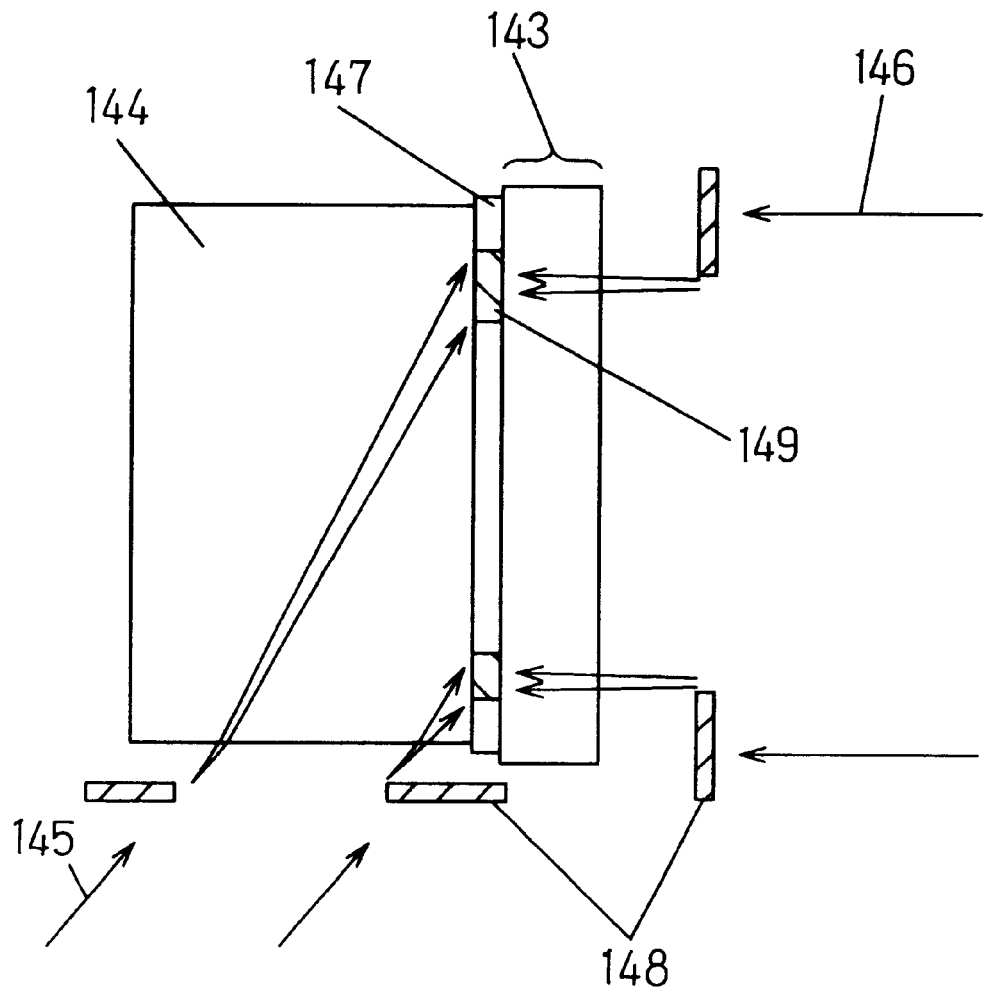
FIG. 66 is a cross-sectional side view showing the principle by which the boundary region is formed in the conventional edge-lit hologram.

The method shown in FIG. 15(b) further has an advantage that the haze of the hologram is reduced. When the quantity of the exposure light is not sufficient, the haze appears in the hologram as described in the description of the prior art (see FIG. 63). The occurrence of the haze damages the quality of the image, especially in the transparent display apparatus of this invention.

For minimizing the occurrence of the haze in the hologram, the quantity of the exposure light at each portion of the medium of the hologram must be larger than a predetermined value. However, in the distribution of the intensity of the light shown in FIG. 15(a), the quantity of the exposure light in the lower region of the image field is inevitably smaller, so that the haze easily occurs. When the quantity of the exposure light in the lower region of the image field is increased by lengthening the exposure time so as to eliminate the haze, the diffraction efficiency of the hologram in the lower region of the image field is made higher. Thus, the luminance of the display apparatus is not even in the vertical direction of the image field.

In order to minimize the occurrence of the haze and to optimize the distribution of the modulation of refraction index at the same time, the distribution of the reference light beam 13 and the object light beam 14 in the second method shown in FIG. 15(b) is preferable. Specifically, when the amount of the quantity of the exposure light due to the reference light beam 13 and the quantity of the exposure light due to the object light beam 14 is constant, a preferable result is obtained in the whole of the image field.

In the above-mentioned first and second methods shown in FIGS. 15(a) and 15(b), the goot is to make the luminance of the display apparatus appear even. However, by a third method shown in FIG. 15(c), the luminance in the vicinity of the center of the image field is higher. As can be seen from FIG. 15(c), the intensity of the reference light beam 13 is a reversal of the intensity of the object light beam 14. By such a configuration, the degree of the modulation of the interference fringe in the vicinity of the center of the image field is maximum, and the degree of the modulation of the interference fringe is gradually reduced toward the upper region and lower region of the image field. As a result, the hologram having the highest modulation of refraction index in the vicinity of the image field is formed, so that the luminance in the vicinity of the center of the image field of the display apparatus is higher.

Alternatively, the distribution of the modulation of refraction index of the hologram is realized by utilizing a distribution of coherency of the laser light beam.

Figure 16:
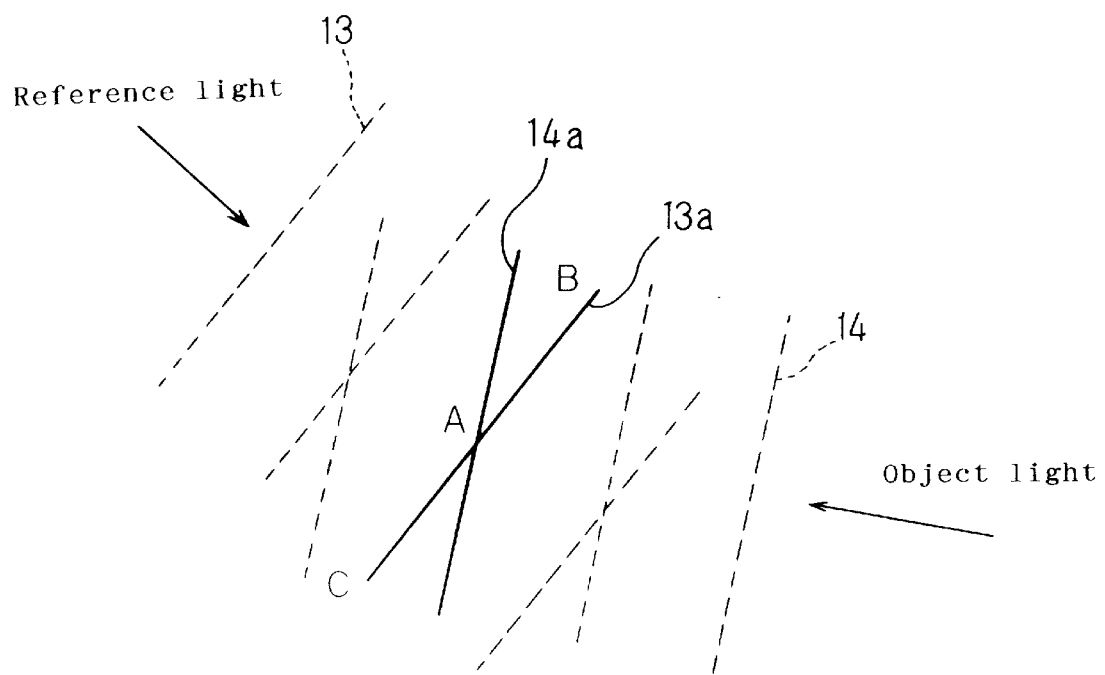
FIG. 16 is a drawing schematically showing the relation between a wave front of a reference light beam having the same phase and a wave front of an object light beam having the same phase.

As can be seen from FIG. 16, with respect to the reference light beam 13 and the object light beam 14 which cross at a predetermined angle, a wave front 13a of the reference light beam 13 having the same phase is slanted to a wave front 14a of the object light beam 14 having the same phase. For example, an optical path length of the reference light beam 13 and an optical path length of the object light beam 14 are assumed to be equal at a point A where the wave front 13a of the reference light beam 13 crosses the wave front 14a of the object light beam 14. At this time, the object light beam 14 at a point B on the wave front 13a is delayed. The object light beam 14 at a point C on the wave front 13a is advanced. Thus, there is a difference between the optical paths at the points B and C due to the delay and advance of the object light beam 14.

The degrees of the modulation of the interference fringe at the points B and C are less than the degree of the modulation of the interference fringe at the point A. If the difference between the optical paths is in the same order of the coherence length of the laser light beam, the degrees of the modulation of the interference fringe at the points B and C are largely reduced.

Actually, the coherence length of the argon laser used in the exposure system shown in FIG. 10 is reduced to several tens of millimeters without using the etalons. Thus, there is a region where the degree of the modulation of the interference fringe is reduced to a preferable level for forming the distribution of the modulation of refraction index of the hologram within the surface of the hologram having an area of 60 mm×60 mm. When the hologram is exposed in such a condition, the distribution of the modulation of refraction index of the hologram by which the luminance of the display apparatus is made even is obtained. Furthermore, the intensity of the exposure light is made even in the whole surface of the hologram, so that the occurrence of the haze is minimized.

Figure 17:
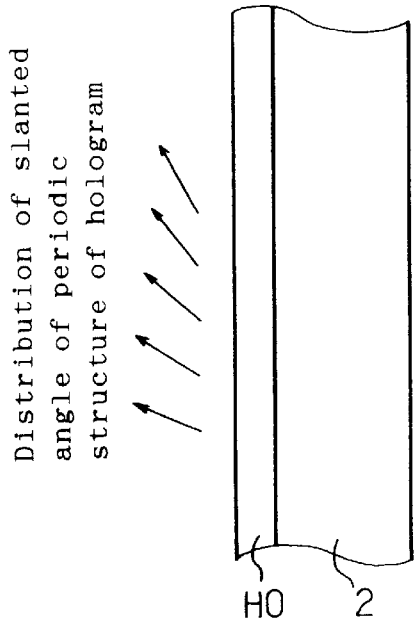
FIG. 17 is a drawing schematically showing a distribution of a slanted angle of a periodic structure of the hologram.

The distribution of the slanted angle of the periodic structure of the hologram H0 in the above-mentioned second configuration is now described. FIG. 17 schematically shows the distribution of the slanted angle of the periodic structure of the hologram H0. The slanted angle of the periodic structure gradually increases from the lower region near to the illumination light to the upper region distant from the illumination light source. By such a configuration, the intensity of the illumination light or the luminance of the display apparatus in the vertical direction of the image field is made even.

Figure 18:
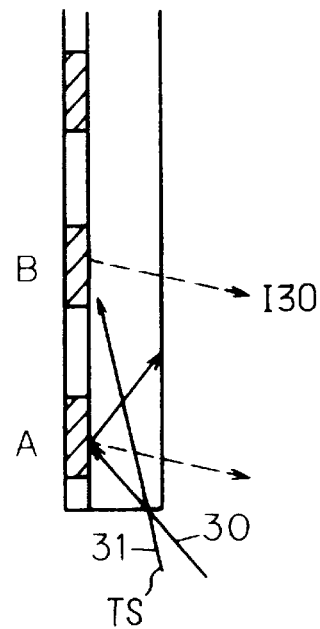
FIG. 18 is partially enlarged cross-sectional side view showing the principle that a first light 30 and a second light 31 having different incident angles are diffracted by different portions of the hologram.

FIG. 18 schematically shows the movement of propagation lights in the transparent substrate 2. When a first propagation light 30 enters into a first region A of the hologram H0, a part of the first propagation light 30 is converted to a first illumination light I30 by the diffraction due to the hologram H0. When the diffraction efficiency due to the first region A of the hologram H0 is higher, most of the first propagation light 30 is consumed by the diffraction. However, when a region B of the hologram H0 has a high diffraction efficiency with respect to a second propagation light 31 which has an incident angle different from that of the first propagation light 30, the loss of the first propagation light 30 in the first region A is no problem. Since the optimum condition of diffraction of the propagation light is varied at each position of the hologram H0 in the vertical direction of the image field, the luminance of the display apparatus is made even and is increased.

Figure 19:
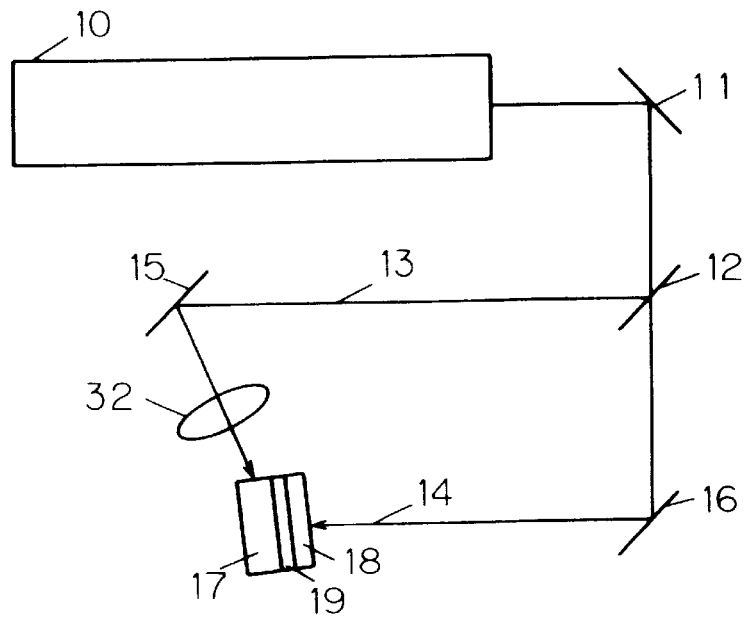
FIG. 19 is a plan view showing another optical system for forming the hologram for obtaining the distribution of the slanted angle of the periodic structure.

The hologram having the distribution of the slanted angle of the periodic structure is manufactured by using an exposure system shown in FIG. 19. The exposure system further includes a convex cylindrical lens 32 inserted into the optical path as compared to the exposure system shown in FIG. 10. The hologram manufactured by the exposing system shown in FIG. 19 further has a distribution of the pitch of the periodic structure in the vertical direction of the image field.

Alternatively, when a concave cylindrical lens is inserted into the optical path, a hologram having a distribution such that the slanted angle of the periodic structure is gradually increased from the lower region to the upper region of the image field is obtained. This hologram also has the optimum condition of diffraction of the light varied at each position of the hologram H0 in the vertical direction of the image field, so that the luminance of the display apparatus is made even and is increased.

Furthermore, when the distribution of the modulation of refraction index and the distribution of the slanted angle of the periodic structure of the hologram are combined as the above-mentioned third configuration, a display apparatus having even and higher luminance is obtained. Alternatively, a display apparatus having a distribution of luminance in which an optional portion is higher can also be obtained.

Figure 20:
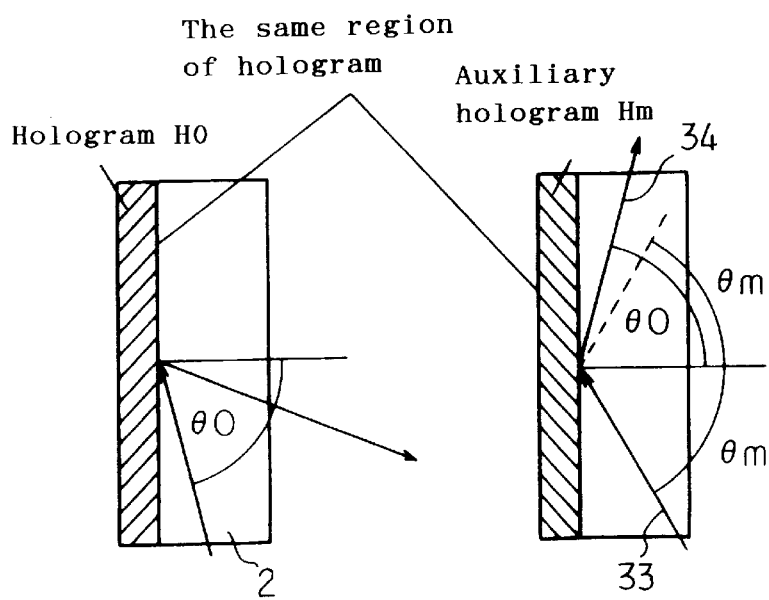
FIG. 20(a) is cross-sectional side views showing the principle of a multiple hologram structure.

Furthermore, it is preferable that the hologram H0 be a multiple hologram. FIG. 20 shows the principle of the multiple hologram. In FIG. 20, the above-mentioned hologram H0 and an auxiliary hologram Hm are multiples formed on the same region. A first propagation light 33 has a first reflection angle θm and does not satisfy the diffraction condition of the hologram H0. The auxiliary hologram Hm diffracts the first propagation light 33 so as to convert a second propagation light 34 which has a reflection angle θ0 and satisfies the diffraction condition of the hologram H0.

If the auxiliary hologram Hm is not provided, the first propagation light 33 moves in the transparent substrate 2 without being diffracted by the hologram H0, reaches to a side face opposite to the illumination light source, and finally exits to the outside of the transparent substrate 2. That is, the first propagation light 33 does not contribute to the illumination. However, when the first light 33 is converted to the second light 34 satisfying the diffraction condition of the hologram H0 by the auxiliary hologram Hm, the incident light entering into the transparent substrate 2 is effectively used for increasing the intensity of the illumination light.

Figure 21:
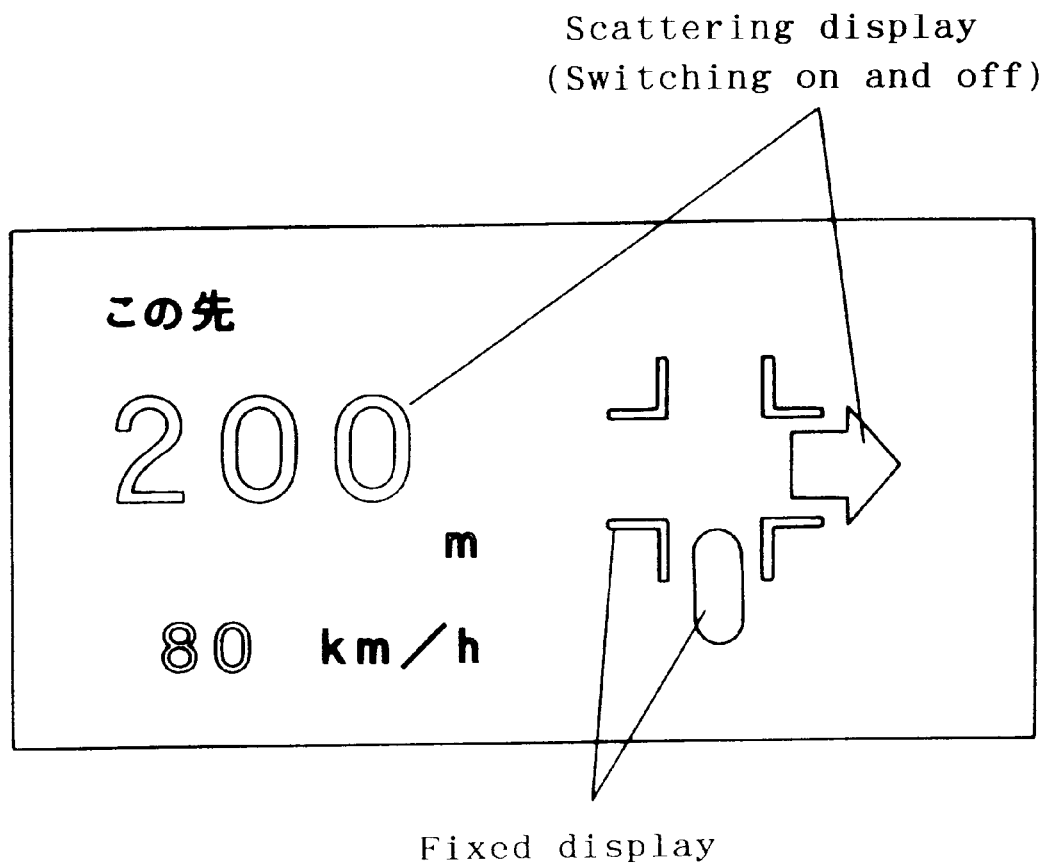
FIG. 21 is a plan view showing an example of an image displayed by the display apparatus of this invention.

Furthermore, by using the auxiliary hologram Hm, a fixed pattern can be displayed. FIG. 21 shows an image displayed by the display apparatus, such as information of a navigation system loaded on a vehicle. The information of the navigation system includes a distance to an object intersection, a speed of the vehicle, an arrow mark for designating the direction to turn, etc. These signs are to be observed in a wide view angle, and the color thereof is not changed. Furthermore, a fixed pattern such as the situation at the object intersection is displayed. The fixed pattern should directly reach to the observer's eyes through the transparent region of the polymer dispersed liquid crystal device, so that the exit direction of the fixed pattern is to be substantially perpendicular to the image field. The fixed pattern can be rainbow-colored responding to the view point of the observer. When this display apparatus is mounted on a dash board of the cockpit of the vehicle, it is possible to see the front situation of the road through the display apparatus while observing the information.

In the above-mentioned first embodiment, the cold cathode fluorescent lamp 4 and the reflection mirror 5 comprises the illumination light source. However, the illumination light source is not restricted by such configuration. An organic light emitting device can be used as an illumination light source and the reflection mirror can be omitted. Alternatively, the illumination light source can be disposed distant from the display apparatus, and the illumination light is guided to the side face of the transparent substrate 2 by an optical fiber cable. In any case, the illumination light is not collimated and enters into the transparent substrate from the side face at random. The illumination light source or the exit portion of the optical fiber cable is disposed in the vicinity of the side face of the transparent substrate.

SECOND EMBODIMENT

A second embodiment relating to a method for forming the hologram of this invention is described with reference to the figures.

Figure 22:
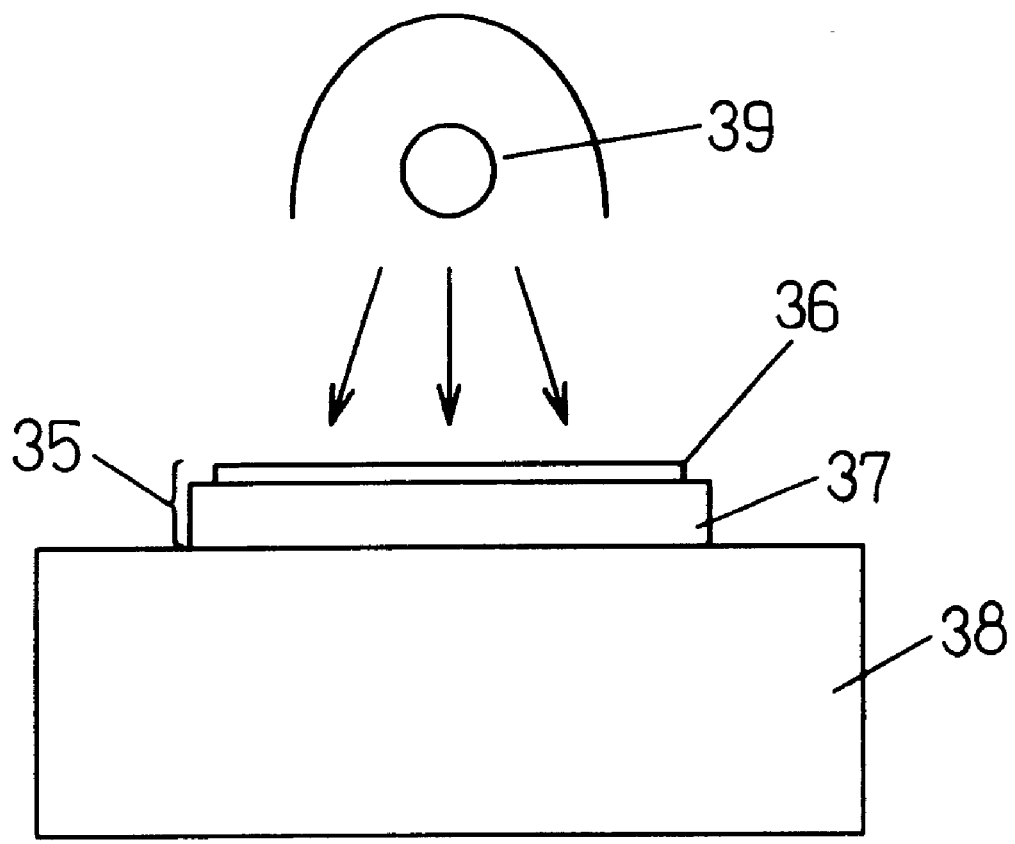
FIG. 22 is a side view showing a configuration of an apparatus for heating and light irradiating a medium of the hologram in a method for forming a hologram of this invention.

FIG. 22 shows a configuration of an experimental apparatus for heating and light irradiating for the medium of the hologram. These processes are further executed after the exposure by the laser light beams and before the heat treatment in the conventional method for forming of the hologram.

In FIG. 22, the experimental apparatus comprises a temperature control plate 38 and a metal halide lamp 39. A hologram plate 35 is mounted on the temperature control plate 38. The hologram plate 35 has a configuration that a photopolymer 36 serving as the medium of the hologram is closely adhered on the hologram substrate 37.

Prior to the experiment, the temperature control plate 38 has been stabilized at a predetermined processing temperature, and the metal halide lamp 39 also has been stabilized so as to output the light at a constant power. When the exposure of the hologram plate 35 by the laser light beams is completed, the hologram plate 35 is mounted on the temperature control plate 38 in a manner so that the hologram substrate 37 is positioned below the photopolymer 36. The hologram plate 35 remains for a sufficient time so that the whole of the hologram plate 35 is at the predetermined temperature. After that, the metal halide lamp 39 irradiates light for a predetermined time. When the heating and light irradiating processes are completed, the hologram plate 35 is processed with a heat treatment at 120° C. for two hours similar to the conventional heat treatment for hardening and sensitizing the hologram.

For clarifying the optimum regions of the heating and the light irradiation, the following experiment was executed. The photopolymer (medium of the hologram) was estimated in view of the scattering noise in the background. The exposure of the laser light beams was omitted but the light irradiated the photopolymer and it was subjected to the heating condition.

At first, the characteristics of the photopolymer which was heated and irradiated with light by the conventional processes and the condition of the conventional processes are described.

(Conventional processes)

(1) Exposure with laser light beams was omitted;
(2) Temperature in the fixing process was at room temperature (25° C. ) and the intensity of the light irradiation was 0.1 $J/cm^2$; and
(3) The heat treatment was executed at 120° C. for two hours.

(Result of the experiment)

Scattering noise of the photopolymer was 18–30 $cd/m^2$.

(Condition of the experiment)

The material of the photopolymer was HRF750×245-9 (du Pont);

The size of the substrate was 50 mm×50 mm×4 mm and four surfaces thereof were polished;

The material of the substrate was BK7 optical glass;

The lamp for irradiating the light was a metal halide lamp;

The light irradiated the photopolymer from the base film side;

The illuminance meter was a UIT-101 ultraviolet illuminance meter (Ushio), the first photoreceptor was a UVD-365PD (wave band 330-390 nm) and the second photoreceptor was a UVD-405PD (wave band 330-490 nm);

The illumination light source was a cold cathode fluorescent lamp having a diameter of 3 mm; and The luminance meter was a LS-100 (MINOLTA).

Figure 23:
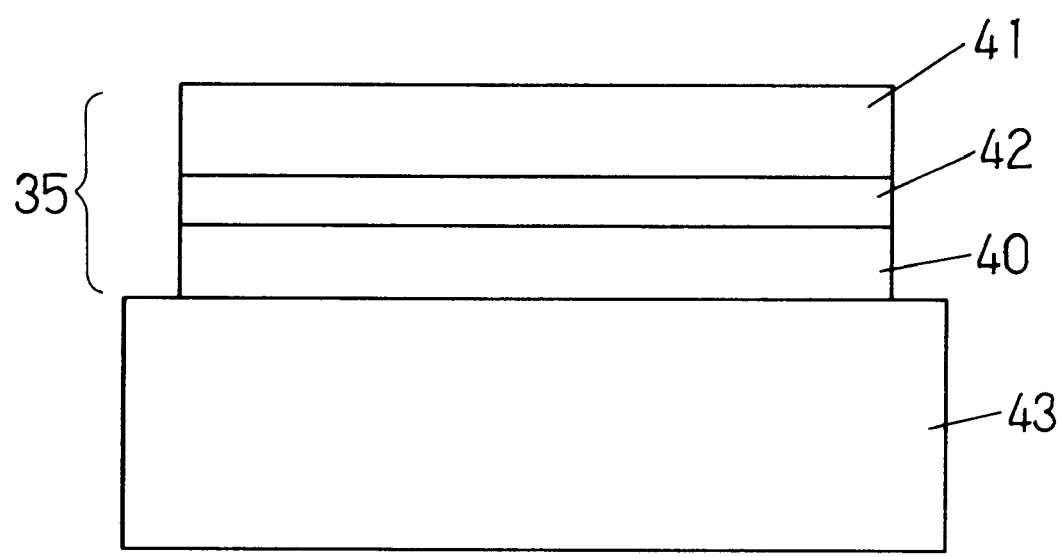
FIG. 23 is a side view showing a configuration of a hologram dry plate used in this invention.

The above-mentioned condition of the experiment was essentially fixed except the specially mentioned case. The above-mentioned photopolymer is for full-colored hologram having sensitivity for recording the hologram in the whole region of visible light. The photopolymer device has a multi-layer structure of a photopolymer 40, a cover film 41 and a barrier film 42 as shown in FIG. 23. The above-mentioned hologram plate 35 is formed by adhering the photopolymer on a hologram substrate 43.

The cover film 41 is removable, since the hologram can easily be duplicated by directly contacting a medium for duplication on the isotropic barrier film 42. However, the cover film 41 generally remains in place during the normal processes. In this experiment, the above-mentioned heating and light irradiating processes are executed with the cover film 41 in place. After the heat treatment, the cover film 41 was removed just before the measurement described below.

The value of the quantity of the light irradiation was calculated as the product of the intensity of the light and the irradiation time. The above-mentioned value 0.1 J/cm² implies that the light having the intensity of 2 mW/cm² including the wavelength 330 nm to 390 nm measured by the first photoreceptor was irradiated for 50 seconds.

Figure 24:
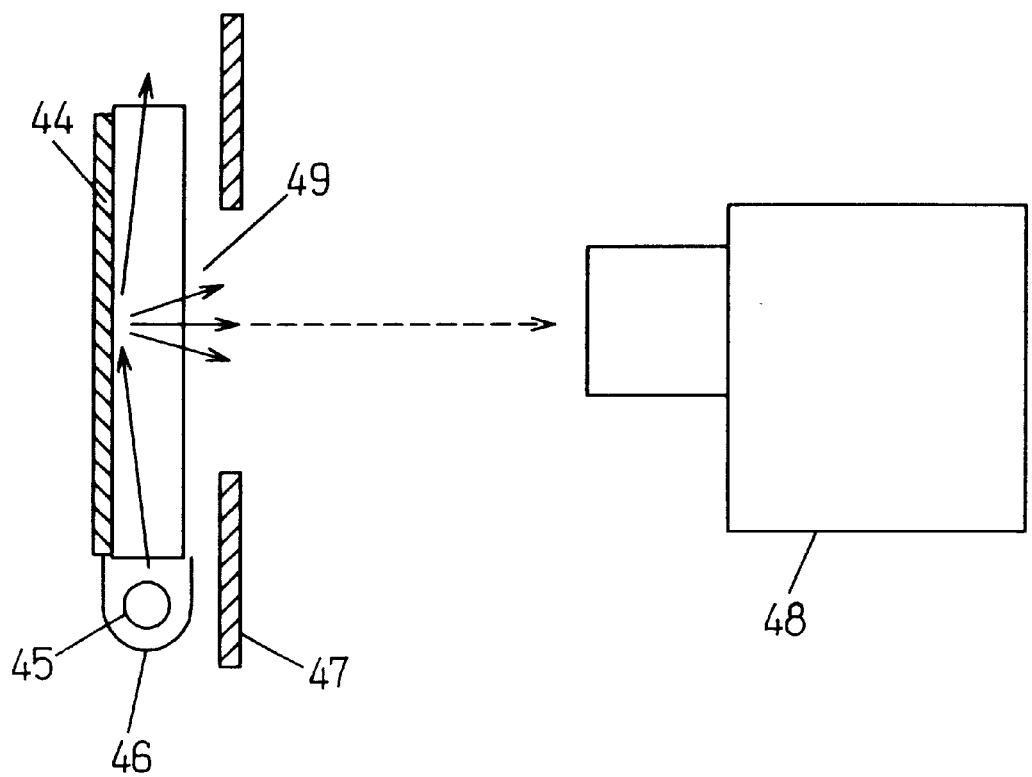
FIG. 24 is a cross-sectional side view showing a configuration of a system for measuring scattering noise using a luminance meter.

The scattering noise was estimated by using the measurement system shown in FIG. 24. The measurement system comprised a luminance meter 48, a shielding plate 47 having an opening facing the luminance meter 48, a cold cathode fluorescent lamp 45 and a reflection mirror 46. The hologram device 44 which is to be estimated was disposed facing the luminance meter 48 via the shielding plate 47 with a distance about 1m from the luminance meter 48. The level of scattering light 49 due to the illumination light from the cold cathode fluorescent lamp 45 was measured by the luminance meter 48. The cold cathode fluorescent lamp 45 was lit by a power supply not shown in the figure in which the voltage and current were fixed at predetermined values. The measurement of the scattering noise was measured after waiting a sufficient time for stabilizing the output of the luminance meter 48.

A method for quantitatively estimating the scattering noise of an edge-lit type hologram device has not been established. In this embodiment, the scattering noise was shown by the measured data of the luminance meter, in order to quantitatively show the effect of this invention by luminance, the standard parameter of optical measurement.

Figure 25:
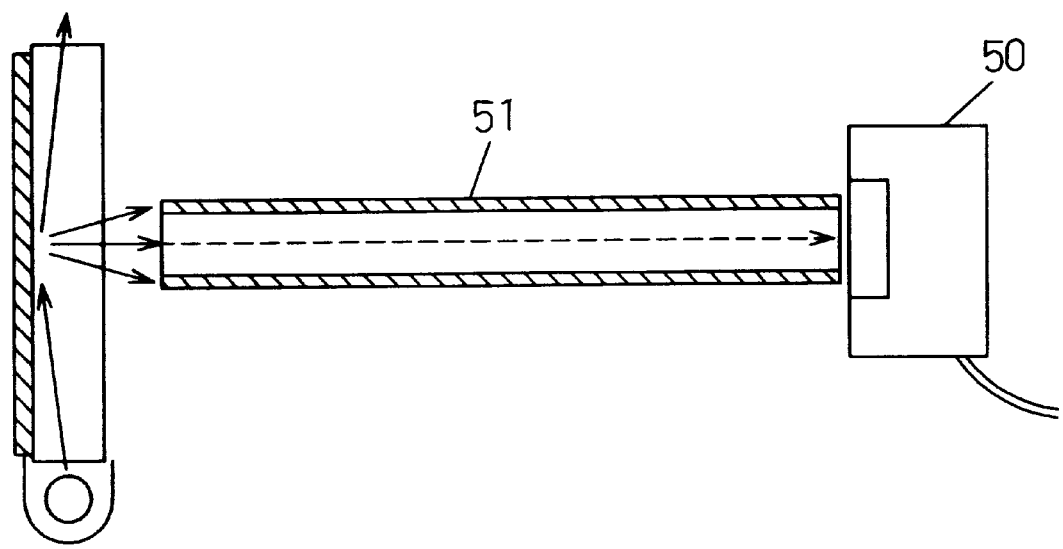
FIG. 25 is a cross-sectional side view showing a configuration of another system for measuring scattering noise using a power meter.

Alternatively, another measurement system shown in FIG. 25 comprises a power meter 50 and a black finished pipe or an array of irises 51. The hologram devices of this invention and the conventional display apparatus were compared by using this measurement system. It was found that the quantitative tendency of the results of the measurement were similar to the results of the measurements with the luminance meter.

With respect to the data for the hologram device formed by conventional processes measured by the luminance meter shown in FIG. 24, most of the data were larger than a value of 18 cd/m². The largest value in the data was about 30 cd/m². The value of 30 cd/m² due to scattering noise is a luminance which can be observed in a relatively bright room.

The hologram substrate should essentially be transparent; that is, background of the display apparatus should be observed as if it is observed through window glass. However, when scattering noise is emitted from the hologram device, the background will be hazy. Even though the smallest value of 18 cd/m² would be sensed as being bright so that an object behind the hologram device could hardly be observed when a room is dark.

Auxiliary experiments and results thereof are now described for showing the advantageous merits of this invention. The photopolymer was actually heated and irradiated with light without forming the hologram. Thus, the exposure with laser light was omitted in each experiment. The scattering noise of the photopolymer was measured by the luminance meter.

(First Experiment)
(1) The exposure of the laser light beam was omitted;
(2) Fixing and discoloration processes were executed under the condition that the heating temperature was at 40° C., the intensity of the light irradiation was 10 J/cm² by the first photoreceptor, and the filter was U330 having a thickness of 3mm for cutting off the visible light; and
(3) Heat treatment was executed at 120° C. for two hours.
(Result of the First Experiment)
Output of the luminance meter was 9–10 cd/f².

(Second Experiment)
(1) The exposure of the laser light beam was omitted;
(2) Fixing and discoloration processes were executed under the condition that the heating temperature was at 90° C., the intensity of the light irradiation was 10 J/cm² by the first photoreceptor, and the filter was U330 having a thickness of 3 mm for cutting off the visible light; and
(3) Heat treatment was executed at 120° C. for two hours.
(Result of the Second Experiment)
Output of the luminance meter was 9–10 cd/m².

(Third Experiment)
(1) The exposure of the laser light beam was omitted;
(2) Fixing and discoloration processes were executed under the condition that the heating temperature was at 25° C., the intensity of the light irradiation was 10 J/cm² by the first photoreceptor, and the filter was U330 having a thickness of 3 mm for cutting off the visible light; and
(3) Heat treatment was executed at 120° C. for two hours.
(Result of the Third Experiment)
Output of the luminance meter was 12–13 cd/m².

(Fourth Experiment)
(1) The exposure of the laser light beam was omitted;
(2) Fixing and discoloration processes were executed under the condition that the heating temperature was at 105° C., the intensity of the light irradiation was 10 J/cm² by the first photoreceptor, and the filter was U330 having a thickness of 3mm for cutting off the visible light; and
(3) Heat treatment was executed at 120° C. for two hours.
(Result of the Fourth Experiment)
Output of the luminance meter was 11–13 cd/m².

From the results of the above-mentioned first to fourth experiments, it is found that the transparency of the background of the sample of the photopolymer can be increased by irradiation of light with an intensity of 10 J/cm² and including at least light having wavelength in a range of 330–390 nm and with heating temperature in a range of 40–90° C.

(Fifth Experiment)
(1) The exposure of the laser light beam was omitted;
(2) Fixing and discoloration processes were executed under the condition that the heating temperature was at 40° C., the intensity of the light irradiation was 50 J/cm² by the second photoreceptor and the filter was a colored glass of L-40; and
(3) Heat treatment was executed at 120° C. for two hours.
(Result of the Fifth Experiment)
Output of the luminance meter was 8–9 cd/m².

(Sixth Experiment)
(1) The exposure of the laser light beam was omitted;
(2) Fixing and discoloration processes were executed under the condition that the heating temperature was at 90° C., the intensity of the light irradiation was 50 J/cm² by the second photoreceptor, and the filter was a colored glass of L-40; and
(3) Heat treatment was executed at 120° C. for two hours.

(Result of the Sixth Experiment)
Output of the luminance meter was 9–10 cd/in$^2$.
(Seventh Experiment)
(1) The exposure of the laser light beam was omitted;
(2) Fixing and discoloration processes were executed under the condition that the heating temperature was at room temperature, the intensity of the light irradiation was 50 J/cm$^2$ by the second photoreceptor, and the filter was a colored glass of L-40; and
(3) Heat treatment was executed at 120° C. for two hours.
(Result of the Seventh Experiment)
Output of the luminance meter was 11–12 cd/m$^2$.
(Eighth Experiment)
(1) The exposure of the laser light beam was omitted;
(2) Fixing and discoloration processes were executed under the condition that the heating temperature was at 105° C. the intensity of the light irradiation was 50 J/cm$^2$ by the second photoreceptor, and the filter was a colored glass of L-40; and
(3) Heat treatment was executed at 120° C. for two hours.
(Result of the Eighth Experiment)
Output of the luminance meter was 11–13 cd/m$^2$.

Figure 26:
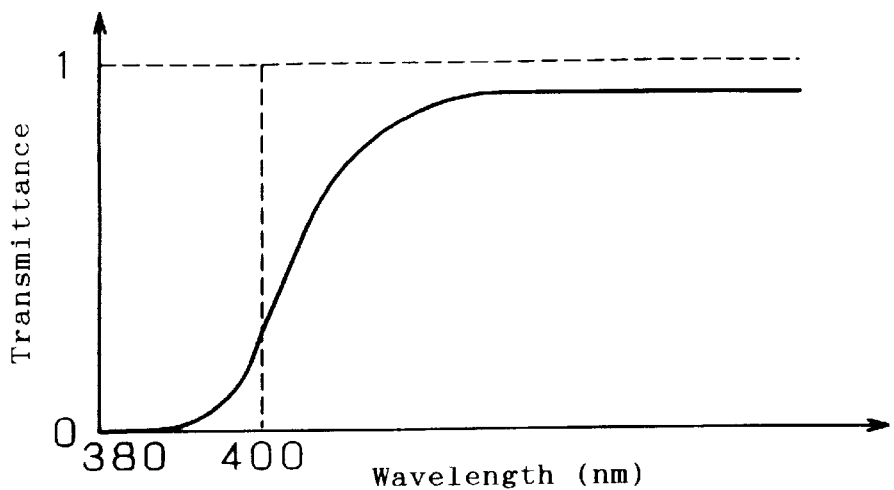
FIG. 26 is a graph showing transparency of a colored glass.

The colored glass of L-40 used in the above-mentioned fifth to eighth experiments has an optical characteristic for cutting off light having a wavelength less than 390 nm as shown in FIG. 26. The output level of the second photoreceptor was lower by about 30% than the output level thereof if the filter was not used.

From the results of the above-mentioned fifth to eighth experiments, it was found that the transparency of the background of the sample of the photopolymer was increased by irradiation of light with intensity of 50 J/cm$^2$ and including at least light having wavelength in a range of 390–490 nm and with heating temperature in a range of 40–90° C.

(Ninth Experiment)
(1) The exposure of the laser light beam was omitted;
(2) Fixing and discoloration processes were executed under the condition that the heating temperature was at 40° C., the intensity of the light irradiation was 10 J/cm$^2$ by the first photoreceptor and 70 J/cm2 by the second photoreceptor; and
(3) Heat treatment was executed at 120° C. for two hours.
(Result of the Ninth Experiment)
Output of the luminance meter was 8–9 cd/m$^2$.
(Tenth Experiment)
(1) The exposure of the laser light beam was omitted;
(2) Fixing and discoloration processes were executed under the condition that the heating temperature was at 90° C., the intensity of the light irradiation was 10 J/cm$^2$ by the first photoreceptor and 70 j/cm$^2$ by the second photoreceptor; and
(3) Heat treatment was executed at 120° C. for two hours.
(Result of the Tenth Experiment)
Output of the luminance meter was 8–9 cd/m$^2$.
(Eleventh Experiment)
(1) The exposure of the laser light beam was omitted;
(2) Fixing and discoloration processes were executed under the condition that the heating temperature was at room temperature, the intensity of the light irradiation was 10 J/cm$^2$ by the first photoreceptor and 70 J/cm$^2$ by the second photoreceptor; and
(3) Heat treatment was executed at 120° C. for two hours.
(Result of the Eleventh Experiment)
Output of the luminance meter was 11–12 cd/m$^2$.
(Twelfth Experiment)
(1) The exposure of the laser light beam was omitted;
(2) Fixing and discoloration processes were executed under the condition that the heating temperature was at 105° C. the intensity of the light irradiation was 10 J/cm$^2$ by the first photoreceptor and 70 J/cm$^2$ by the second photoreceptor; and
(3) Heat treatment was executed at 120° C. for two hours.
(Result of the Eleventh Experiment)
Output of the luminance meter was 10–11 cd/m$^2$.

From the results of the above-mentioned ninth to twelfth experiments, it was found that the transparency of the background of the sample of the photopolymer was increased by first irradiation of light with intensity of 10 J/cm$^2$ and including at least the light having wavelength in a range of 330–390 nm and second irradiation of light with intensity of 70 J/cm$^2$ and including at least the light having a wavelength in a range of 330–490 nm and with heating temperature in a range of 40–90° C.

(Thirteenth Experiment)
(1) The exposure of the laser light beam was omitted;
(2) Fixing and discoloration processes were executed under the condition that the heating temperature was at 40° C., the intensity of the light irradiation was 5 J/cm$^2$ by the first photoreceptor and 35 J/cm$^2$ by the second photoreceptor; and
(3) Heat treatment was executed at 120° C. for two hours.
(Result of the Thirteenth Experiment)
Output of the luminance meter was 10–12 cd/m$^2$.
(Fourteenth Experiment)
(1) The exposure of the laser light beam was omitted;
(2) Fixing and discoloration processes were executed under the condition that the heating temperature was at 90° C., the intensity of the light irradiation was 5 J/cm$^2$ by the first photoreceptor and 35 J/cm$^2$ by the second photoreceptor; and
(3) Heat treatment was executed at 120° C. for two hours.
(Result of the Fourteenth Experiment)
Output of the luminance meter was 10–11 cd/m$^2$.
(Fifteenth Experiment)
(1) The exposure of the laser light beam was omitted;
(2) Fixing and discoloration processes were executed under the condition that the heating temperature was at 90° C., the intensity of the light irradiation was 1 J/cm$^2$ by the first photoreceptor and 7 J/cm$^2$ by the second photoreceptor; and
(3) Heat treatment was executed at 120° C. for two hours.
(Result of the Fifteenth Experiment)
Output of the luminance meter was 13–14 cd/m$^2$.
(Sixteenth Experiment)
(1) The exposure of the laser light beam was omitted;
(2) Fixing and discoloration processes were executed under the condition that the heating temperature was at 40° C., the intensity of the light irradiation was 1 J/cm$^2$ by the first photoreceptor and 7 J/cm$^2$ by the second photoreceptor; and
(3) Heat treatment was executed at 120° C. for two hours.
(Result of the Sixteenth Experiment)
Output of the luminance meter was 13–15 cd/m$^2$.

From the results of the above-mentioned thirteenth to sixteenth experiments, it was found that the transparency of the background of the sample of the photopolymer was not increased if the intensity of the first irradiation of light and including at least light having a wavelength in a range of 330–390 nm is less than 10 J/cm$^2$ and the intensity of the second irradiation of light and including at least light having a wavelength in a range of 330–490 nm is less than 50 J/cm$^2$ and with heating temperature in a range of 40–90° C.

In summary, due to the above-mentioned four conditions of the processes of this invention, the output of the luminance meter was less than 10 cd/m$^2$. However, the output of the luminance meter was not less than 10 cd/m$^2$ under other conditions.

Figure 27:
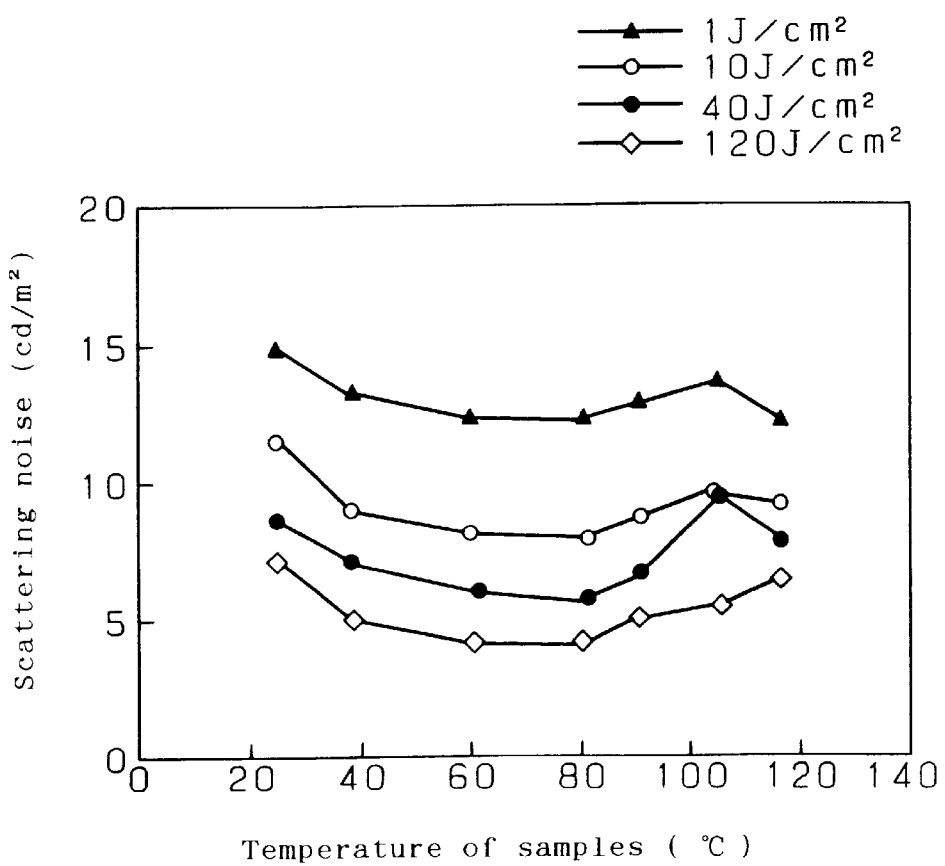
FIG. 27 is a graph plotted with the measured data of the scattering noise.

Data from the experiments are plotted in FIG. 27. As can be seen from FIG. 27, an effect of this invention substantially the same as that of the above-mentioned experiments is seen in a range of 40–90° C. With respect to the quantity of light irradiation, in a range larger than 10 J/cm$^2$ of light irradiation, the intensity of the scattering noise is less than 10 cd/m$^2$. Especially, when the quantity of the light irradiation was 120 J/cm$^2$ which is more than a thousand times larger than that in the conventional processes, a splendid result of the intensity of the scattering noise in a range of 4–5 cd/m$^2$ was obtained. Scattering noise within a range of 4–5 cd/m$^2$ is a level wherein the background of the sample of the photopolymer can clearly be observed in a dark room.

Generally, when the lamp for the light irradiation and the sample of the photopolymer are closely disposed, the temperature of the sample naturally increases due to both the luminance energy of the irradiation light and the heat radiation of the lamp. The quantity of the light irradiation for fixing and discoloration in the processes of this invention is about a hundred times as much larger than that in conventional processes, so that the temperature of the sample will increase about 30–50 degrees during the light irradiation. When the experiment starts at a room temperature of 25° C., the temperature of the sample naturally will increase to 55–75° C. during the light irradiation. Thus, the result of the measurement will be similar to a result in the case where the temperature is intentionally increased. Accordingly, it is possible to make the processes more simple by utilizing the natural heating due to the lamp. Corresponding to the lighting condition and cooling condition in the light irradiation system, there is a possibility that the temperature of the sample is more than 100° C. and that haze due to the overheat can occur. At an extreme, the base film, the photopolymer and the glass substrate will seize.

In order to prevent the troubles indicated, in the above-mentioned experiments, the sample of the photopolymers 36 were disposed on the temperature control plate 38 having a cooling mechanism in the form of a Peltier device, and the optimum heating temperature range was decided and maintained. Even though the cooling mechanism was used, the temperature of the sample increased less than 20 degrees due to the lamp. In this regard, it is also possible to maintain the heating temperature of the sample in a predetermined range by controlling the distance between the lamp and the sample.

The temperature control plate 38 is not always necessary in the above-mentioned processes, if the temperature condition and the light irradiation condition of this invention are satisfied. For example, even when the natural temperature rise due to the lamp 39 is utilized without controlling the heating temperature, the ranges of the temperature and the quantity of the light irradiation by which a splendid result is obtained are restricted in the above-mentioned conditions obtained from the experiments.

Figure 28:
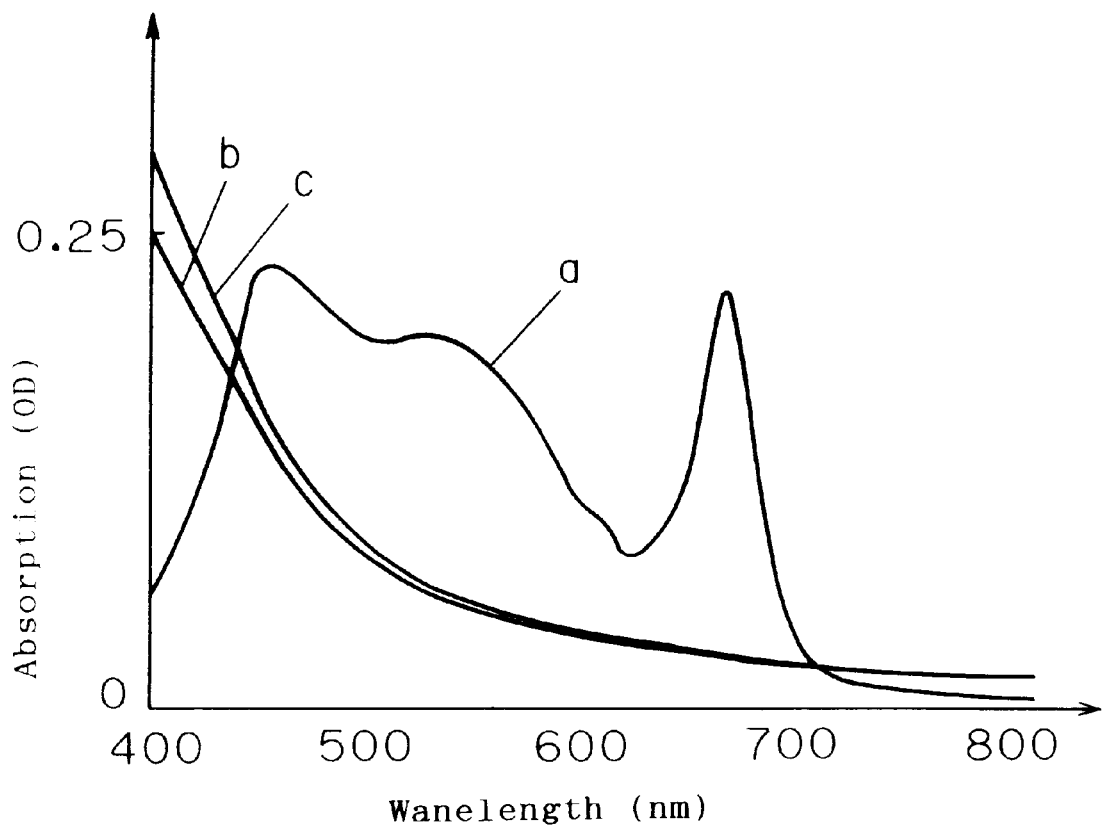
FIG. 28 is a graph showing characteristic curves of absorption of a photopolymer treated by processes of the method for forming the hologram of this invention.

FIG. 28 shows absorption characteristic curves of the photopolymer in respective processes. In FIG. 28, a characteristic curve (a) shows the change of absorption by pigment in the photopolymer which is not exposed. A characteristic curve (b) shows the change of absorption by pigment in the photopolymer after heating and light irradiation. A characteristic curve (c) shows the change of absorption by pigment in a photopolymer after the heat treatment.

In comparing the characteristic curves (a) and (b), the peaks of the absorption which is inherent to the pigment on the characteristic curve (a) have disappeared on the characteristic curve (b) before the heat treatment. Furthermore, in view of the characteristic curve (c) after heat treatment, the characteristic of absorption is not changed. After completing the processes, the photopolymer was a little orange colored. However, the level of the scattering noise of the photopolymer was very low.

In the above-mentioned estimation, the hologram was not actually formed, and the scattering noise was estimated by the background of the photopolymer. However, the increase of the transparency of the hologram must be estimated by estimating the scattering noise in the region where the hologram will be formed.

Figure 29:
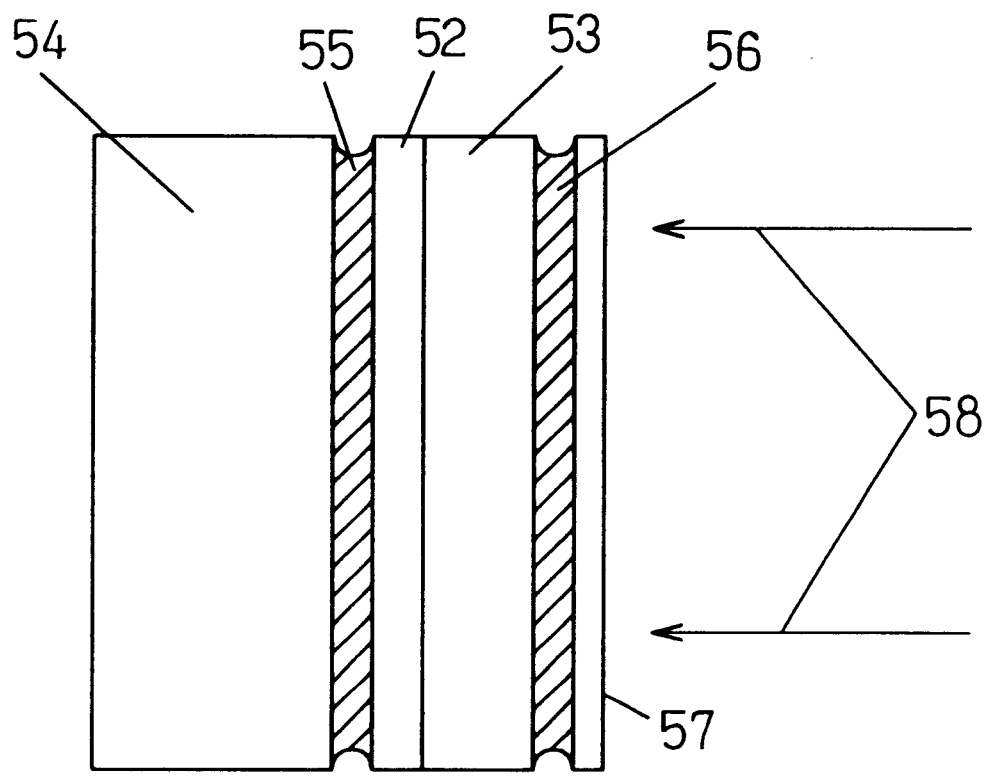
FIG. 29 is a side view showing a configuration of an optical system for forming a spectral reflection hologram used in the method of this invention.

FIG. 29 shows an optical system for forming a specular reflection type hologram. In the optical system shown in FIG. 29, a photopolymer 52 is provided on a substrate 53. A surface reflection mirror 54 contacts the photopolymer 52 via a refraction index adjusting liquid 55. An antireflection substrate 57 contacts the substrate 53 via a refraction index adjusting liquid 56. Laser light beam 58 enters the antireflection substrate 57. A specular reflection hologram is formed in the photopolymer 52 by interference of the incident laser light beams 58 through the antireflection substrate 57 and the reflected laser light from the surface reflection mirror 54.

As a source of the laser light beams 58, an argon laser emitting laser light having a wavelength of 488 nm has used. As a material for the photopolymer 52, the above-mentioned HRF750X245-9 was used. As the refraction index adjusting liquid 55 and 56, xylene was used. After the exposure by the laser light beams 58, the photopolymer 52 was heated and irradiated with light corresponding to the above-mentioned processes of this invention. Furthermore, the photopolymer 52 was treated in the conventional heat treatment. A hologram formed by the processes was irradiated by the cold cathode fluorescent lamp from a side face of the hologram, and the scattering noise due to the hologram was observed.

In the conventional specular reflection hologram formed by the conventional processes, the region where the hologram was formed was distinguishable from the background. The specular reflection hologram does not generate any diffraction light in a direction toward the surface of the substrate with respect to the incident light from the side face. In other words, the phenomenon that the hologram region is observable implies that the level of the scattering noise is higher. Based on data from the luminance meter, the level of the scattering noise in the hologram region was about 5–10 cd/m$^2$ higher than that in the background.

Since the difference of the levels of scattering noise in the hologram region and that in the background of the hologram device formed by the processes of this invention is in the range of about 1–2 cd/m$^2$, scattering noise due to the hologram can be ignored. That is, the effect of this invention is notable in the region where the laser light beams are exposed. The spectral characteristic of the reflection hologram was estimated after heating and light irradiation, and it was found that the reflectance of the hologram was increased more than that just after laser light exposure, and the half bandwidth of the reflectance was spread. However, sensitization due to heating and light irradiation was not so large in comparison with the sensitization due to conventional heat treatment at 120° C. for two hours. Thus, a high sensitization of the hologram is obtained by final heat treatment.

Figure 30:
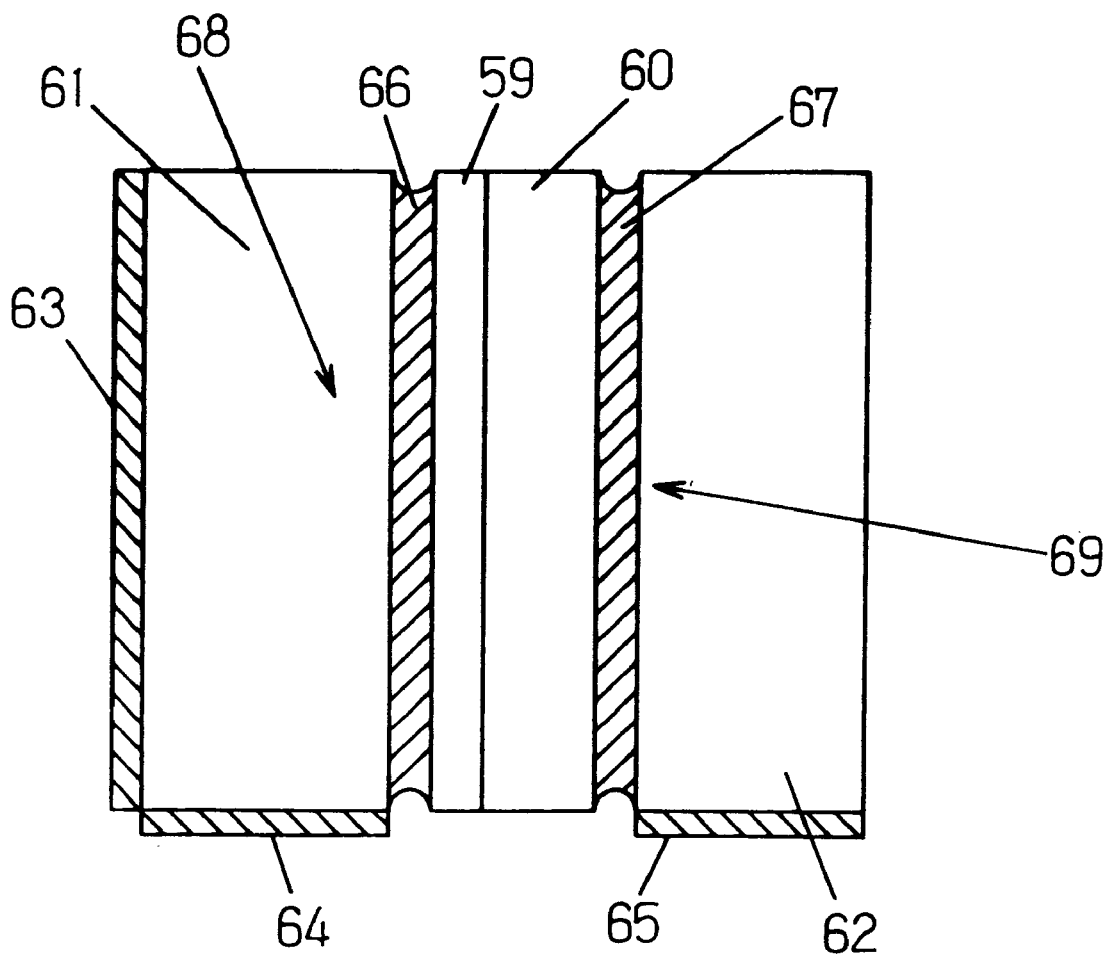
FIG. 30 is a side view showing a configuration of an optical system, for forming a reflection hologram used in the method of this invention.

FIG. 30 shows an optical system for forming a specular reflection type hologram. In the optical system shown in FIG. 30, a photopolymer 59 is provided on a substrate 60. A first glass block 61 and the photopolymer 59 are contacted via a refraction index matching fluid 66. A second glass block 62 and the substrate 60 are contacted via a refraction index matching fluid 67. A first light absorption plate 63 is provided on a rear face of the first glass block 61. A second light absorption plate 64 is provided on a side face of the first glass block 61. A third light absorption plate 65 is provided on a side face of the second glass block 62. Reference light beam 68 enters into the first glass block from a side face thereof. Object light beam 69 enters into the second glass block 62 from a front face thereof. Thereby, a reflection hologram is formed in the photopolymer 59 by interference of the reference light beam 68 and the object light beam 69.

In the reflection hologram formed by the above-mentioned optical system, the diffracted light actually exits from the surface of the substrate, so that it is difficult to quantify the scattering noise in the background independently. Thus, the exit light was observed from a direction different from the exit direction of the light. The scattering noise due to the hologram was largely reduced in comparison with the conventional reflection hologram.

Figure 31:
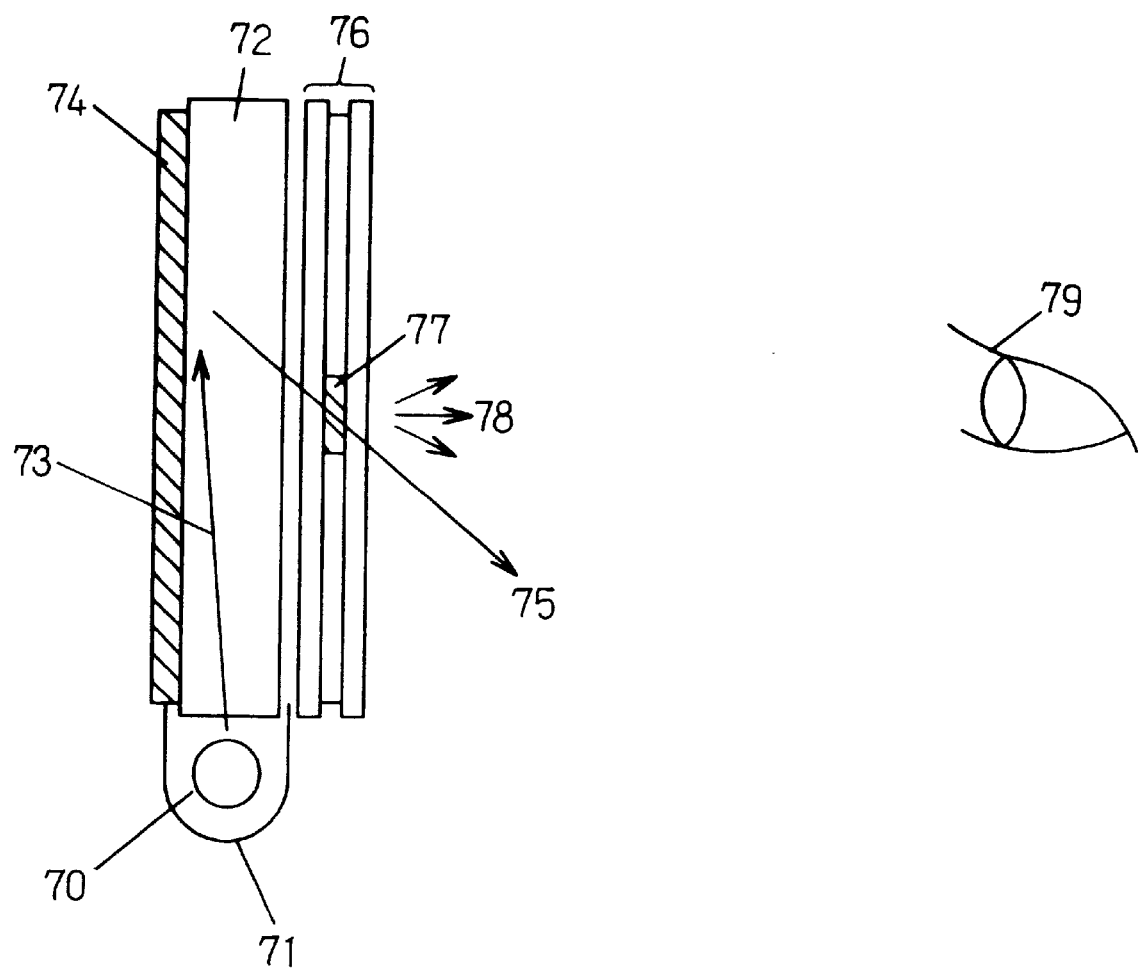
FIG. 31 is a cross-sectional side view showing a configuration f a display apparatus configured by using an edge-lit type hologram device and a distribution liquid crystal device.

The hologram device of this invention can be applied in the display device, for example, shown in FIG. 31. FIG. 31 shows a configuration of a conventional display apparatus described, for example, in the Publication Gazettes of Unexamined Japanese Patent Application Hei 6-166706, and etc. A hologram 74 is formed on a rear face of a substrate 72. A cold cathode fluorescent lamp 70 and a reflection mirror 71 are disposed in the vicinity of a side face of the substrate 72. A polymer dispersed liquid crystal device 76 is disposed in front of a front face of the substrate 72. In FIG. 31, numerical reference 73 designates an incident light. Numerical reference 75 designates an illumination light. Numerical reference 77 designates a pixel of the liquid crystal device 76 in a scattering state. Numerical reference 78 designates scattering light. Numeral reference 79 designates an observer.

The light 73 emitted from the lamp 70 enters into the substrate 72 from the side face directly or after reflection by the mirror 71. The light 73 is diffracted by the hologram 74 and converted to the illumination light 75. The illumination light 75 exits from the front face of the substrate 72 downwardly and enters into the liquid crystal device 76 for illuminating the pixel 77 in the scattering state. The illumination light 75 is scattered by the pixel 77 and converted to the scattering light 78. The scattering light 78 finally reaches to the eyes of the observer 79. In the liquid crystal display, the other pixels except the pixel 77 in the scattering state are in a transparent state, so that the illumination light 75 passes through the other pixels. The observer 79 cannot find the existence of the other pixels.

The above-mentioned edge-lit type hologram device was actually formed by the above-mentioned method for forming the holograms of this invention. The background view was clearly observed in the region where the pixels of the liquid crystal device were in the transparent state. Thus, a transparent display apparatus, a head-up display apparatus, and a direct view display apparatus for color display which are described in the above-mentioned documents can be realized.

Figure 32:
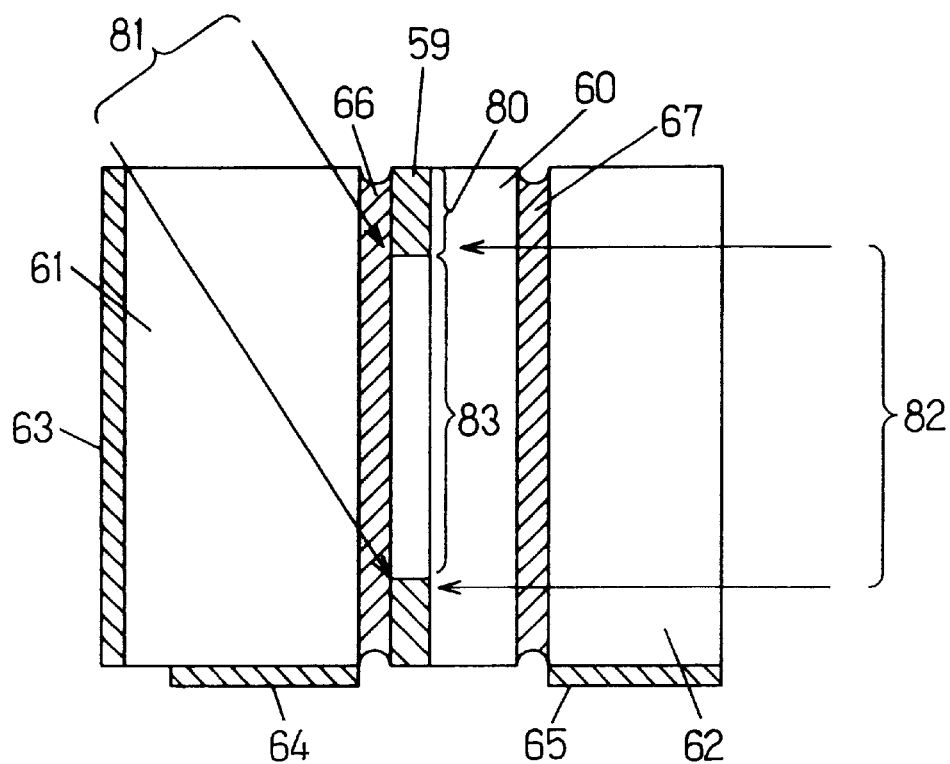
FIG. 32 is a side view showing a configuration of an optical system for forming a reflection hologram, in which a peripheral region is inactivated, used in the method of this invention.

For forming the hologram, the optical system shown in FIG. 30 can be used. However, as shown in FIG. 32, a peripheral region of the photopolymer 59 was previously exposed for forming inactive region 80 shown by cross-hatching in the figure. Thus, a boundary of an exposed region 83 where the hologram was formed by the interference of the reference light 81 and the object light 82 was clearly distinguishable. As a result, the scattering noise at the boundary of the exposed region 83 of the hologram was minimized.

In the above-mentioned description of the second embodiment, the photopolymer of HRF750X245-9 was used. When another product of photopolymer by du Pont Corp. such as HRF600X001, HRF700X071, HRF750X199, HRF750X181, HRF750X122, HRF750X083, Omnidex 352, etc. was used, substantially the same effect was obtained. It is submitted that the method for forming the hologram of this invention is also effective for still other photopolymers which are not listed here.

If the base film of the photopolymer is not removed, the transparency of the hologram formed by using the photopolymer can be a little inferior due to dirt, any defect on the surface of the base film or the scattering of light inside the base film. Thus, for forming a hologram having much higher transparency, especially for forming an edge-lit type hologram, it is preferable that the base film be removed and the isotropic barrier film be exposed outside. Alternatively, a transparent film or glass is adhered on the surface of the barrier film via a transparent adhesive such as an ultraviolet photo-curing resin.

Figure 33:
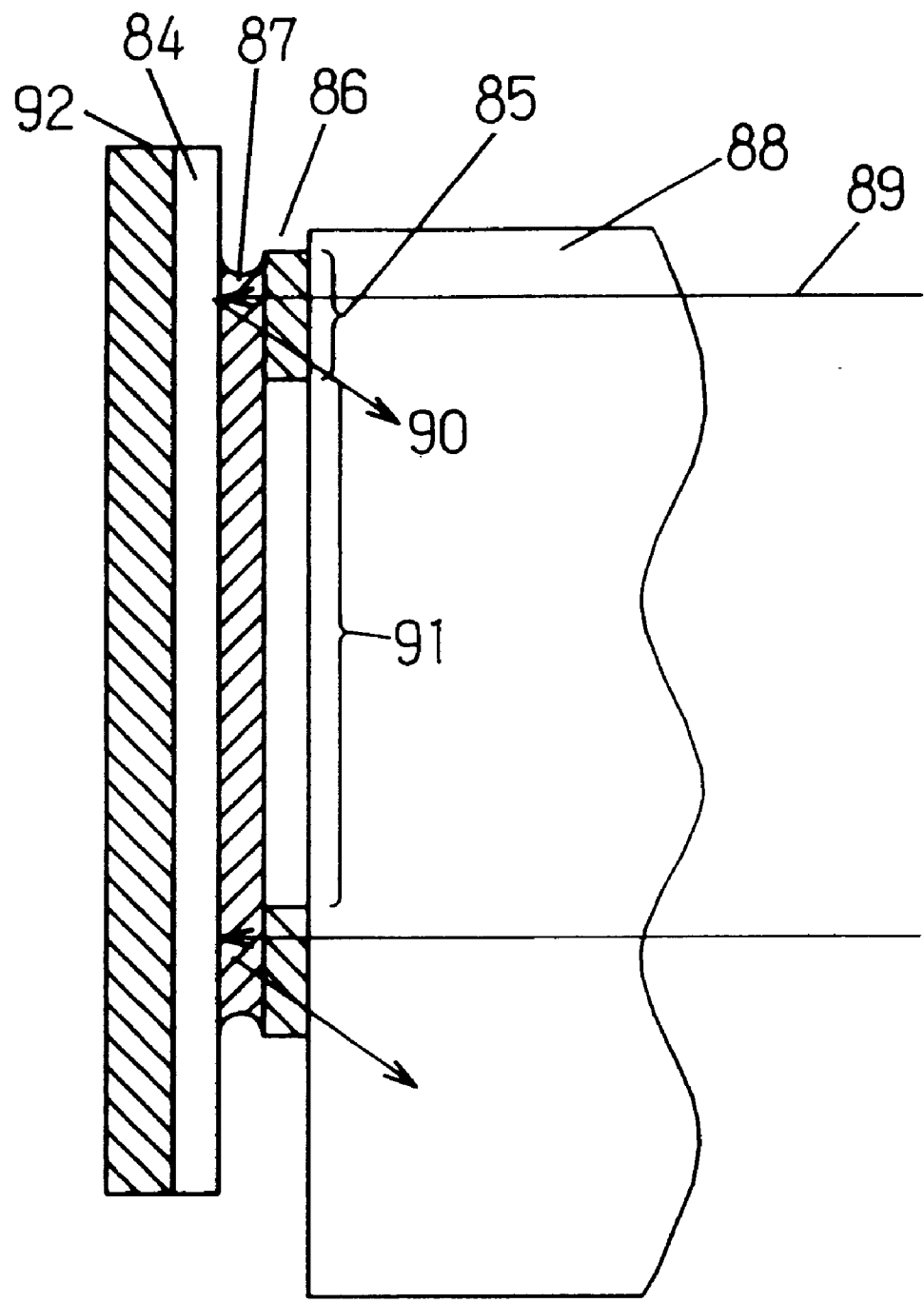
FIG. 33 is a cross-sectional side view showing a configuration of an optical system for duplicating a master hologram.

FIG. 33 shows a method for duplicating a hologram from a master hologram. A photopolymer 86 is provided on a glass block 88. A master hologram 84 is closely adhered on the photopolymer 86 for duplication via a refraction index adjusting liquid 87. A light absorption plate 92 is provided on the rear face of the master hologram 84. In FIG. 33, numerical reference 85 designates an inactive region, and numerical reference 91 designates an exposed region where the hologram is duplicated. A diffraction light 90 for duplicating the hologram enters through the glass block 88.

The master hologram 84 is formed by the above-mentioned method. The hologram is evenly formed in an effective region. The master hologram 84 is selectable from a solo photopolymer film or from a photopolymer film adhered on a substrate. Since the hologram 86 for duplication closely contacts the master hologram 84, the laser light 89 for duplication irradiates through the glass block 88. The diffraction light 90 for duplication, which is diffracted by the master hologram, interferes with the laser light 89 for duplication in the photopolymer 86. Thus, the hologram 91 which is the duplication of the master hologram 84 is formed. A part of the diffraction light 90 which is not diffracted by the master hologram 84 is absorbed by the light absorption plate 92. Since the inactive region 85 is provided, the boundary of the duplicated hologram 91 is distinguishable, and the scattering noise in the boundary is minimized.

Figure 34:
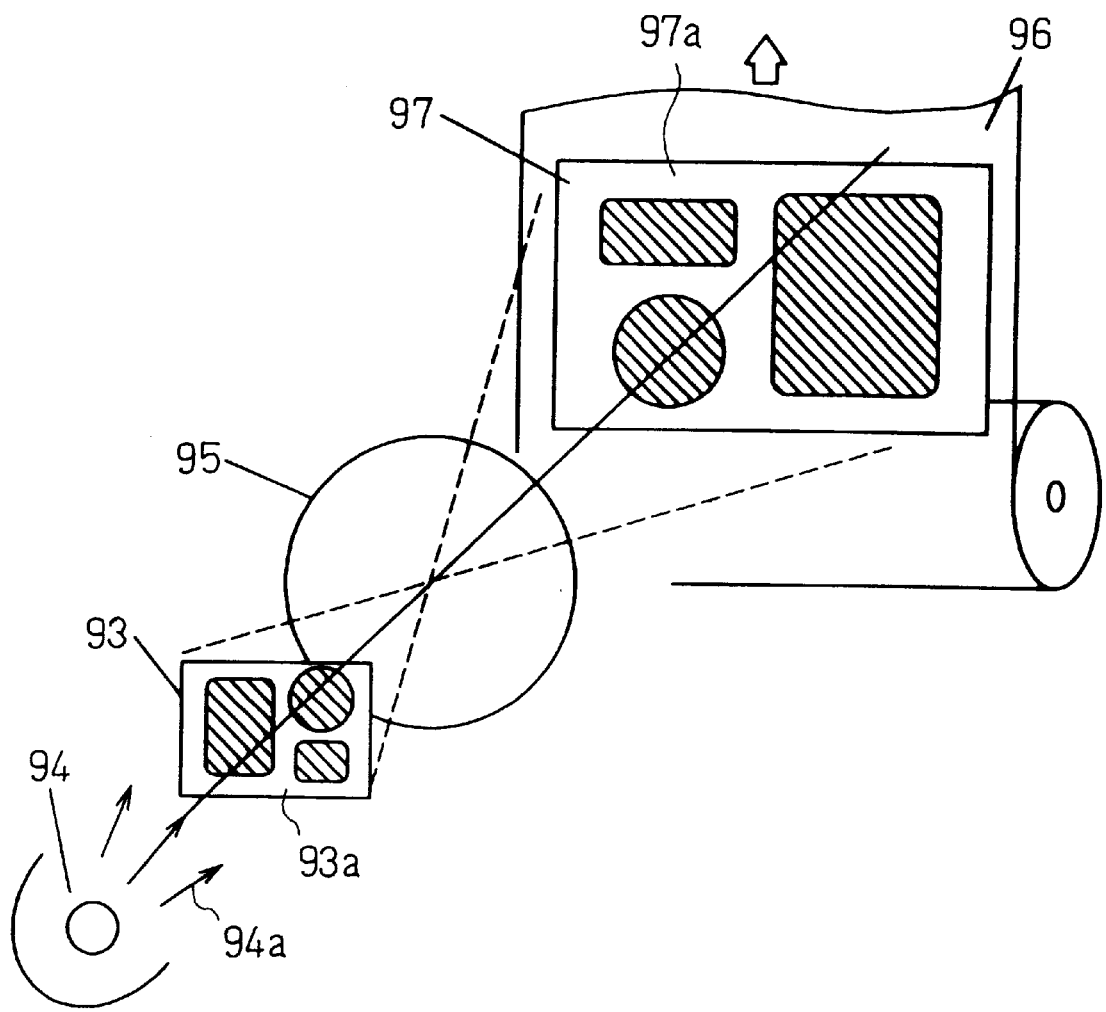
FIG. 34 is a perspective view showing a mask pattern of a photopolymer film for forming an inactivated region on the hologram.

FIG. 34 shows a method for forming an inactive region by exposing a mask pattern on the photopolymer film. An exposure light 94a emitted from a light source 94 passes through a mask pattern 93 and moves to the photopolymer film 96. Thus, a projection pattern 97 is enlargingly, reducingly or equally formed on the photopolymer film 96 by the exposure light 94a. The mask pattern 93 is formed by, for example, a negative film. When the exposure light 94a passes through a transparent region 93a of the mask pattern 93 which is not cross-hatched in the figure, a region 97a of the photopolymer film 96 which is not cross-hatched in the figure will be exposed and inactivated by the exposure light 94a. During the exposure of the mask pattern 93 on the photopolymer film 96, movement of the photopolymer film 96 is stopped. After the exposure, the photopolymer film 96 is moved a predetermined length in order to receive the next exposure.

Figure 35:
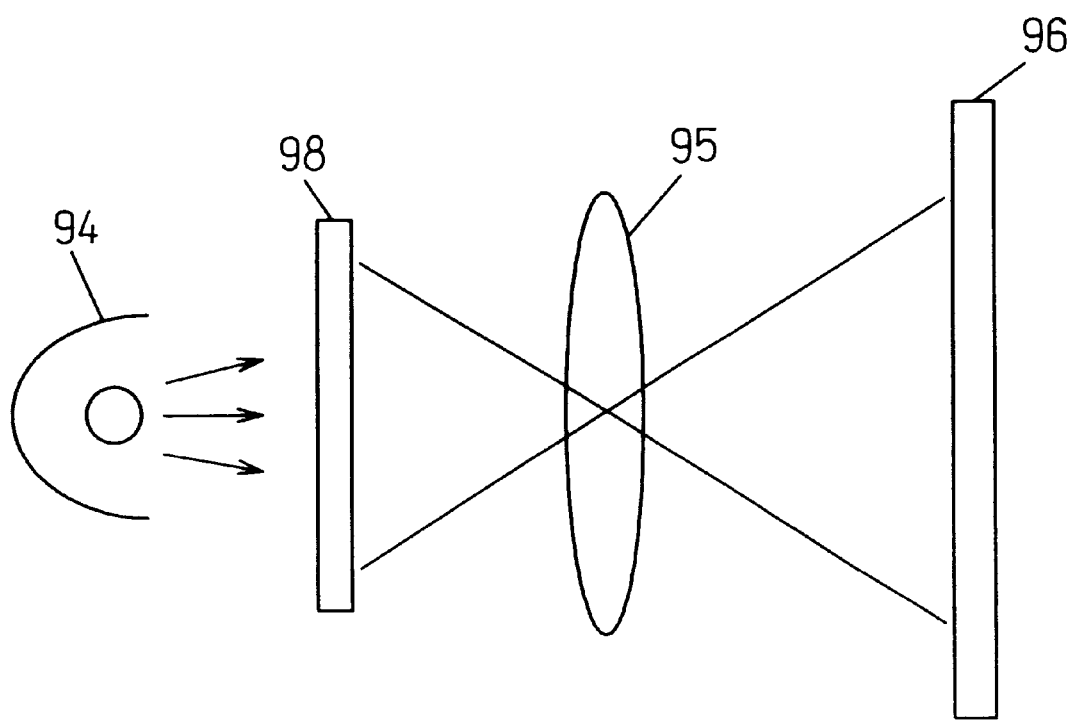
FIG. 35 is a side view showing a configuration of an exposing system using a spatial light modulator for forming an inactivated region on the hologram.

To change the shape of the inactivated region 97a, the next mask pattern 93 is changed. FIG. 35 shows another configuration for forming the inactivated region on the photopolymer film 96. In FIG. 35, a liquid crystal device 98 is used as a mask pattern. With such a configuration, the shape of the mask pattern is easily changeable, and any time loss for changing the mask pattern is reduced.

THIRD EMBODIMENT

A third embodiment relating to the dichroic display apparatus of this invention is described with reference to the figures.

Figure 36:
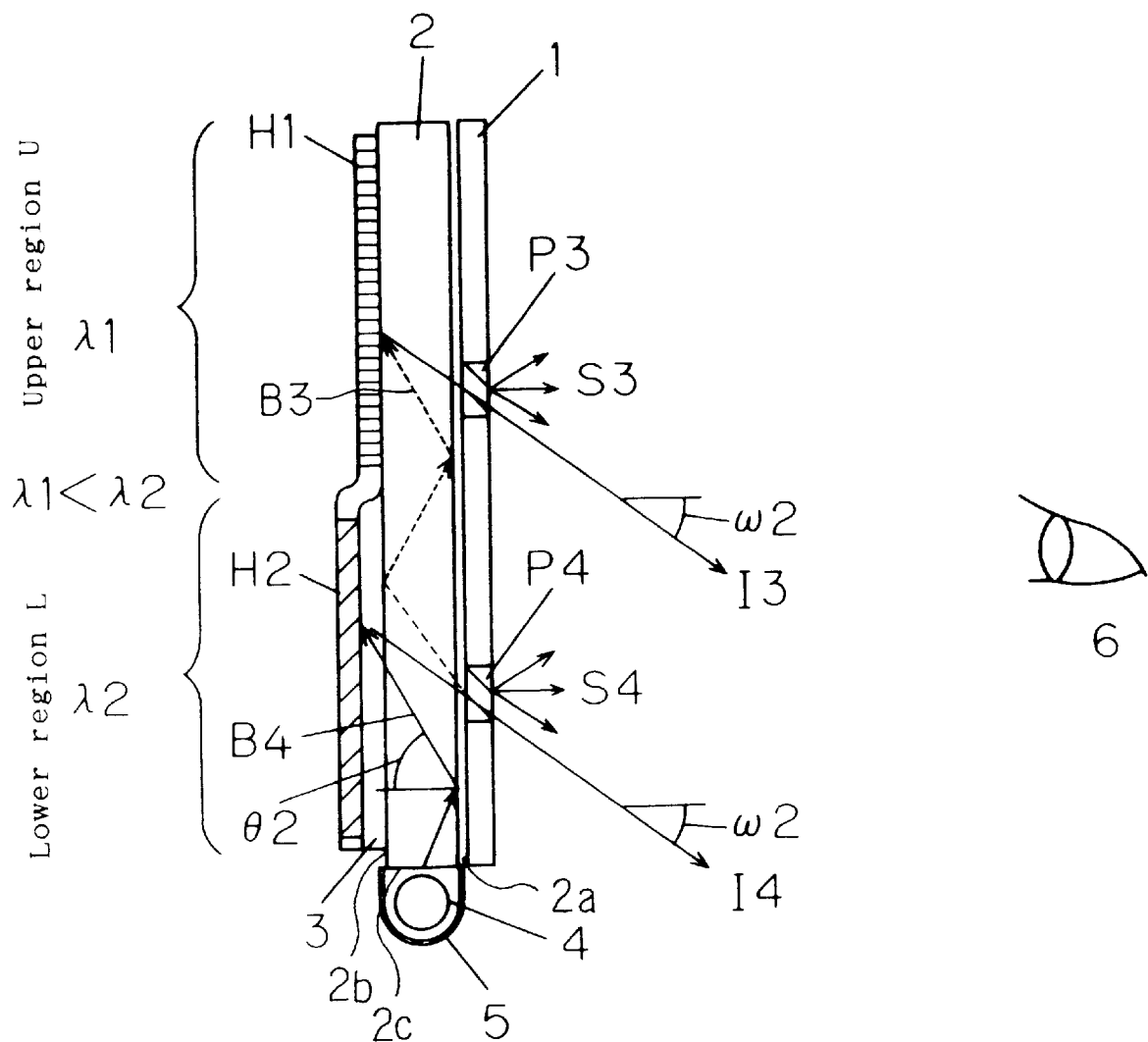
FIG. 36 is a cross-sectional side view showing a first configuration of a trichromatic display apparatus of this invention.

FIG. 36 shows a second configuration of the dichroic display apparatus of the third embodiment. As can be seen from FIG. 36, the display apparatus comprises a transparent substrate 2, a polymer dispersed liquid crystal device 1 disposed in front of a front face 2a of the transparent substrate 2, a transparent layer 3 formed on a part of a rear face 2b of the transparent substrate 2, a reflection type first hologram H1 formed on an upper region U of the rear face 2b of the transparent substrate 2, a reflection type second hologram H2 formed on a surface of the transparent layer 3, a cold cathode fluorescent lamp 4 disposed for facing a side face 2c of the transparent substrate 2 and a reflection mirror 5 enclosing the lamp 4. Numerical reference 6 designates an observer in the figure.

Reference I3 designates a first illumination light having a first wavelength $\lambda 1$. Reference I4 designates a second illumination light having a second wavelength $\lambda 2$. With respect to the relation between the first illumination light I3 and the second illumination light I4, the first wavelength $\lambda 1$ is shorter than the second wavelength $\lambda 2$. Reference P3 designates a first pixel which is in scattering state. Reference S3 designates first forward scattering light from the first pixel S3. Reference P4 designates a second pixel which is in scattering state. Reference S4 designates second forward scattering light from the second pixel S4.

The liquid crystal device 1 displays a dichroic image by using the forward scattering lights at the liquid crystal layer. The first illumination light I3 diffracted by the first hologram H1 irradiates the first pixel P3 from the back. The second illumination light I4 diffracted by the second hologram H2 irradiates the second pixel P4 from the back. When the first pixel P3 is in the scattering state, the first illumination light I3 is scattered by the first pixel P3 and is converted to the first forward scattering light S3. Similarly, when the second pixel P4 is in the scattering state, the second illumination light I4 is scattered by the second pixel P4 and is converted to the second forward scattering light S4. The first forward scattering light S3 and the second forward scattering light S4 respectively reach to the eyes of the observer 6. Thus, the observer 6 sees the image displayed by the display apparatus. It is preferable that the image be formed by one selected from dot-matrix, patterns, a combination of dot-matrix and patterns, etc.

Each of the first and second holograms HI and H2 is a volume phase type. A hologram device includes the first hologram H1, the second hologram H2, the transparent substrate 2, the cold cathode fluorescent lamp 4 and the reflection mirror 5. The hologram device serves as an illuminator of the display apparatus. A light emitted from the lamp 4 enters into the transparent substrate 2 from the side face 2c. The first hologram H1 diffracts the first light which obliquely enters into the first hologram H1 with a first predetermined incident angle toward the front face 2a of the transparent substrate 2. The first hologram H1, however, does not diffract other light, for example, which perpendicularly enters into the transparent substrate 2. Similarly, the second hologram H2 diffracts the second light obliquely which enters into the second hologram H2 with a second predetermined incident angle toward the front face 2a of the transparent substrate 2. The second hologram H2 does not diffract other light, for example, which perpendicularly enters into the transparent substrate 2. Thus, the appearance of the hologram device is transparent.

Since the liquid crystal device 1 is disposed in front of the hologram device, when all the pixels of the liquid crystal device 1 are turned to the transparent state, the image field of the display apparatus is entirely transparent. The background view of the display apparatus can be seen as if it is observed through a glass.

When the first and second illumination lights I3 and I4 irradiate the pixels or the regions in the transparent state of the liquid crystal device 1, the first and second illumination lights I3 and I4 pass through the pixels or the regions. Since the first hologram H1 exits the first illumination lights I3 in a downward direction with a predetermined first exit angle and the second hologram H2 exits the second illumination lights I4 in a downward direction with a predetermined second exit angle, unnecessary illumination light I3 and I4 passing through the pixels or the regions in the transparent state of the liquid crystal device 1 does not reach the eyes of the observer 6. In other words, the observer 6 sees only the first and second forward scattering lights S3 and S4. Only the first and second pixels P3 and P4 in the scattering state, can be seen as shining to the observer 6. As a result, a high contrast image can be displayed superimposed on the background of the display apparatus.

A first feature of the third embodiment of the display apparatus is partially to provide a transparent layer 3 with a refraction index lower than that of the transparent substrate 2 on the rear face 2b of the transparent substrate 2. A second feature is to make the structure of the first hologram H1, which is provided in the upper region U of the image field where the transparent layer 3 is not provided, different from the structure of the second hologram H2 in the lower region L where the transparent layer 3 is provided. With such a configuration, the display apparatus can display the dichroic image, and the first exit angle of the first illumination light I3 in the upper regions U can be coincided with the second exit angle of the second illumination light I4 in the lower region L. In the upper region U of the image field of the display apparatus, the liquid crystal device 1 is illuminated by the first illumination light I3 having the first wavelength $\lambda 1$. In the lower region L of the image field of the display apparatus, the liquid crystal device 1 is illuminated by the second illumination light I4 having the second wavelength $\lambda 2$.

A relation between the first hologram H1 and a propagation light moving in the transparent substrate 2 is described with reference to FIGS. 37 and 38. With respect to the second hologram H2, the above-mentioned description of the hologram H0 in the first embodiment is applied. Thus, the explanation with respect to the second hologram H2 is omitted.

Figure 37:
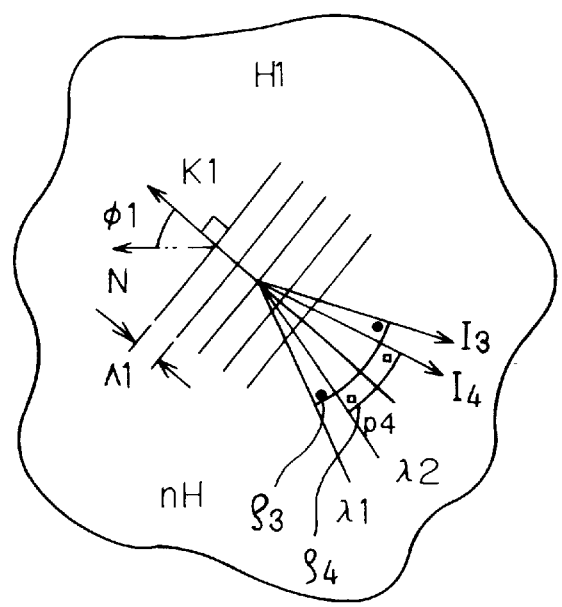
FIG. 37 is a drawing schematically showing a periodic structure of a hologram and optical paths diffracted by a first hologram H1 of the trichromatic display apparatus shown in FIG. 36.

FIG. 37 illustrates a relation between a periodic structure of the first hologram H1 and the light. Reference N designates the normal vector of a medium (eg. photopolymer film) of the first hologram H1 or the normal vector of the rear face 2b of the transparent substrate 2 on which the first hologram H1 is provided. Reference Λ1 designates a pitch of the periodic structure (or grating). Reference K1 designates a grating vector. Reference φ1 designates a slanted angle of the periodic structure with reference to the surface of the medium of the first hologram H1. Reference nH designates a refraction index of the medium of the first hologram H1.

As shown in FIG. 37, the first hologram H1 reflects the first light having the first wavelength λ1 and crossing the grating vector K1 at an angle ρ3. Furthermore, the first hologram H1 reflects the second light having the second wavelength λ2 and crossing the grating vector K1 at an angle ρ4. These relations are shown by the following equations (7) and (8).

$$K1=4\pi nH \cdot \cos \rho 3/\lambda 1=4\pi nH \cdot \cos \rho 4/\lambda 2 \quad (7)$$

$$\Lambda 1=2\pi/K1 \quad (8)$$

For the same reason described in the first embodiment, the phrases of "the first light having the wavelength λ1 and crossing the grating vector K1 at an angle ρ3" and "the second light having the wavelength λ2 and crossing the grating vector K1 at an angle ρ4" respectively imply that the first and second lights respectively include a plurality of light beams having an incident angle in a predetermined range of angle around the angle satisfying the conditions.

Figure 38:
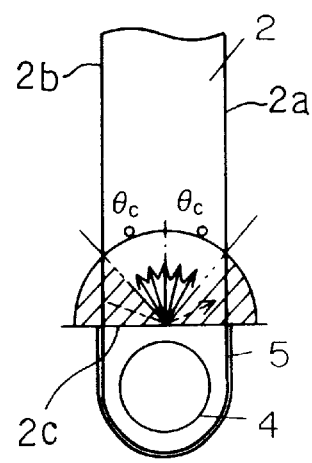
FIG. 38 is a partial cross-sectional view showing the principle that an incident angle of a propagation light beam moving in a transparent substrate is restricted in a predetermined range.
Figure 39:
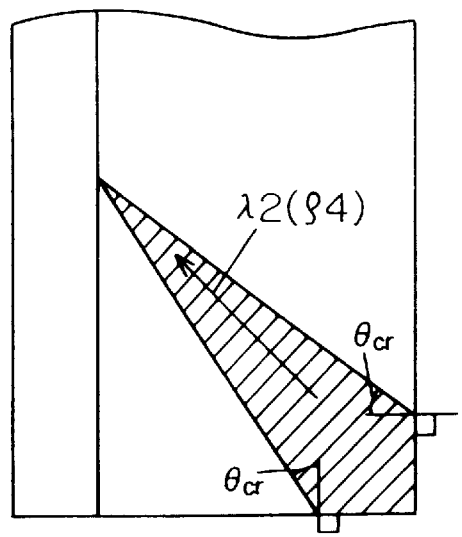
FIG. 39 is a partially enlarged cross-sectional view showing a forbidden band in which no propagation light moves in a transparent substrate.

As shown in FIG. 38, the light emitted from the cold cathode fluorescent lamp 4 enters directly or after reflection by the mirror 5 into the transparent substrate 2. FIG. 38 illustrates the motion of the light beams, which can enter at each point of the side face 2c of the transparent substrate 2 and which have an incident angle θ smaller than the total reflection angle θc shown by the above-mentioned equation (3).

The propagation light moving in the transparent substrate 2 includes light beams (or light components) satisfying the Burrug's condition with respect to the first and second wavelengths λ1 and λ2. Thus, when the propagation light enters into the first hologram H1, the light beams having the first and second wavelengths λ1 and λ2 are diffracted by the first hologram H1 at the same time.

As shown in FIG. 37, the exit angle of the first illumination light I3 is a little different from the exit angle of the second illumination light I4. Thus, the first illumination light I3 and the second illumination light I4 are spatially separated and will reach to spatially different points. However, the hologram device serving as an illuminator and the liquid crystal device are closely disposed in the display apparatus. Thus, the first illumination light I3 and the second illumination light I4 are not independently separated when these illumination lights I3 and I4 reach to the pixels of the liquid crystal device. Consequently, the illumination light mixture of two colors irradiates the pixels in the scattering state.

For separating the first and second illumination lights I3 and I4, the transparent layer 3 is provided between the second hologram H2 and the transparent substrate 2. The refraction index nT of the transparent layer 3 is lower than the refraction index nS of the transparent substrate 2. Furthermore, the pitch and the slanted angle of the periodic structure of the first hologram H1 with respect to the second light having the second wavelength λ2 satisfies the following formula (9).

$$\phi 1+\cos^{-1}(\lambda 2/2nH\Lambda 1+\sin^{-1}(1/nS)<\pi/2 \quad (9)$$

The formula (9) shows a condition that the incident angle of the second light, which has the second wavelength λ2 and satisfies the Burrug's condition with respect to the first hologram H1, becomes larger than the total reflection angle θc. The incident angle of the second light is measured from a normal direction of the side face 2c of the transparent substrate 2.

As shown in FIG. 38, the light, which enters into the transparent substrate 2 at the center of the side face 2c and has an incident angle larger than the total reflection angle θc, is reflected by the boundary between the transparent substrate 2 and returns to the inside of the transparent substrate 2 by total reflection. Thus, the light cannot exit outside the transparent substrate 2. On the other hand, with respect to an external light entering into the transparent substrate 2 from the outside, the larger the incident angle of the external light becomes, the closer the reflection angle in the transparent substrate is to the total reflection angle θc. Finally, when the incident angle is 90 degrees, the reflection angle is θc, but the reflection angle is never larger than θc. Thus, no light enters into the transparent substrate 2 from the cross-hatched region in the figure. The region is called the forbidden band.

In other words, the above-mentioned formula (9) shows the condition that the second light having the second wavelength λ2 passes through the forbidden band. By satisfying the condition, the second light having the wavelength λ2 which is to be diffracted by the first hologram H1 cannot move in the transparent substrate 2. Thus, the first light having the first wavelength λ1 only reaches to and is diffracted by the first hologram H1. Since the first hologram H1 is provided in the upper region of the image field, the monochromaticity in the upper region U is realized.

In the reflection type hologram, the longer the wavelength is, the wider the forbidden band. On the other hand, in the transparent type hologram, the shorter the wavelength, the wider the forbidden band.

The following formula is concludable only for a reflection type hologram for preventing the diffraction of light having a longer wavelength.

$$\lambda/2nH\Lambda>1 \quad (10)$$

Hereupon, Λ is the pitch of the periodic structure of the hologram, and nH is a mean value of the refraction index of the hologram. The hologram satisfying this condition never diffracts light having wavelength λ. The pitch Λ satisfying the above-mentioned formula (10) is smaller than the smallest pitch of the interference fringe formed by the interference of light having the wavelength λ. Thus, the light having the wavelength λ passes through the reflection type hologram as if there were nothing in the space.

Generally, the condition shown by the formula (9) does not coincide with the condition shown by the formula (10). However, with respect to the parameters of the specific examples which are described below in the third embodiment, the condition by the formula (9) includes the condition by the formula (10). Thus, the explanation is considered only for formula (9).

Operation of the display apparatus using the above-mentioned principle for separating dichroic illumination lights is described with reference to FIG. 36.

In the third embodiment, the first hologram H1 is formed so as to diffract the incident light having an incident angle θ2 with an exit angle ω2. The incident angle θ2 and the exit angle ω2 coincide the condition of the angles of the light diffracted by the second hologram H2. This implies that the first hologram H1 is not restricted by the condition, but the first hologram H1 can be constituted so as to satisfy the condition by increasing the degree of freedom of the design of the hologram by the principle of the dichroic display of this invention.

The emitted light beams from the cold cathode fluorescent lamp 4 enter directly or after reflection by the mirror 5 into the transparent substrate 2. A part of the incident light (hereinafter, propagation light) moves in the transparent substrate 2 by repeating the total reflection on the boundary face between the transparent substrate 2 and the transparent layer 3 and the first hologram H1. A part of the remainder reaches the other end face of the transparent substrate 2 without being diffracted by the holograms H1 and H2.

A first propagation light B3 which is illustrated by dotted line in FIG. 36 includes first and second light components respectively having first and second wavelengths $\lambda1$ and $\lambda2$ and moves in the transparent substrate 2 by repeating the total reflection with an incident angle $\theta2$. Both the first and second light components of the first propagation light B3 satisfy the Bragg condition and are diffracted by the first and second holograms H1 and H2. The relation between "ρ" and "$\theta2$" is shown by the following equation (11).

$$\theta2 = \rho3 + \phi1 = \rho4 + \phi2 \tag{11}$$

As described in the above-mentioned first embodiment, the propagation light B3 is totally reflected by both the rear face 2b of the transparent substrate 2 in the lower region L and the boundary between the transparent layer 3 and the transparent substrate 2. Furthermore, the first propagation light B3 moves to the upper region U where the first hologram H1 and the transparent substrate 2 are in direct contact. In the upper region U, the first propagation light B3 is diffracted by the first hologram H1, and is converted to the first illumination light I3. The first illumination light I3 irradiates the first pixel P3 of the liquid crystal device 1 which is in the scattering state, and is scattered by the liquid crystal in the first pixel P3. Thus, the first forward scattering light S3 reaches to the eyes of the observer 6.

Figure 40:
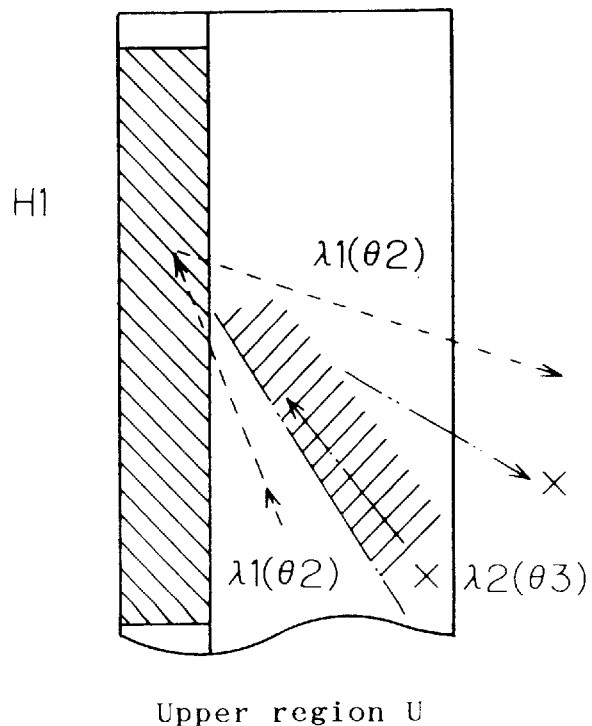
FIG. 40 is a partially enlarged cross-sectional side view showing the principle of light separation due to the forbidden band.

Hereupon, the second light component of the first propagation light B3 has the second wavelength $\lambda2$ and satisfies the Bragg condition with respect to the first hologram H1. Thus, if the second light component of the first propagation light B3 reaches to the first hologram H1, the second light component is diffracted by the first hologram H1. However, the second light component of the first propagation light B3 moves in the forbidden band (which is shown by cross-hatching in FIG. 40), so that the second light component of the first propagation light B3 having the second wavelength $\lambda2$ is totally reflected by the boundary face between the transparent substrate 2 and the first hologram H1. Thus, the second light component of the first propagation light B3 having the second wavelength $\lambda2$ is not diffracted by the first hologram H1. Consequently, the first illumination light I3 is monochromatic with the wavelength $\lambda1$.

On the other hand, a second propagation light B4 which is illustrated by solid line in FIG. 36 does not satisfy the condition of the total reflection on the boundary face between the transparent substrate 2 and the transparent layer 3 in the lower region L, so that the second propagation light B4 passes through both the rear face 2b of the transparent substrate 2 and the transparent layer 3 and reaches to the second hologram H2. In the lower region L, the second propagation light B4 is diffracted by the second hologram H2, and exits to the outside with exit angle $\omega4$. The exit light corresponds to the second illumination light I4. The illumination light I4 irradiates the second pixel P4 of the liquid crystal device I which is in the scattering state, and is scattered by the liquid crystal in the second pixel P4. Thus, the second forward scattering light S4 reaches to the eyes of the observer 6.

By the above-mentioned mechanisms, the first and second pixels P3 and P4 are respectively observed as different colored scattering pixels by the observer 6. The transparent layer 3 is provided in the lower region L where the second hologram H2 is disposed. However, when the transparent layer 3 is further formed between the first hologram H1 and the transparent substrate 2 in the upper region U, substantially the same effect is obtained as the above-mentioned third embodiment.

Specific data for parameters of the display apparatus in the third embodiment are recited below. However, this invention is not limited to these values of the parameters.

Color of the cold cathode fluorescent lamp 4 was a mixture of blue and green, and the diameter of the lamp 4 was 3 mm;

The reflection mirror 5 was an evaporation film of aluminum;

The material (optical glass) of the transparent substrate 2 was BK7, the refraction index nS thereof was 1.52, and the thickness of the transparent substrate 2 was 4 mm;

The material of the transparent layer 3 was $SiO_2$, the refraction index thereof was 1.46 and the thickness of the transparent layer 3 was 1 µm;

The material of the first hologram H1 was photopolymerizing type photopolymer, the refraction index nH thereof was 1.5, and the thickness of the hologram H1 was 10 µm;

The first wavelength $\lambda1$ was 485 nm;

The slanted angle $\phi1$ of the first hologram H1 was 45 degrees;

The pitch $\Lambda1$ of the periodic structure of the first hologram H1 was 0.17 µm;

The incident angle $\theta2$ of the first propagation light B3 having the wave length $\lambda1$ was 65 degrees, and the exit angle $\omega2$ of the first illumination light to the atmosphere was 40 degrees;

The material of the second hologram H2 was. photopolymerizing type photopolymer, the refraction index nH thereof was 1.5, and the thickness of the second hologram H2 was 10 µm;

The second wavelength $\lambda2$ was 545 nm;

The slanted angle $\phi2$ of the second hologram H2 was 45 degrees;

The pitch $\Lambda2$ of the periodic structure of the second hologram H2 was 0.17 µm;

The incident angle $\theta2$ of the second propagation light B4 having the second wavelength $\lambda2$ was 65 degrees, and the exit angle $\omega2$ of the second illumination light to the atmosphere was 40 degrees;

The total reflection angle $\theta c$ was 74 degrees.

It is possible to increase the intensity of the luminance of the scattering display by decreasing the exit angle $\omega2$.

Figure 41:
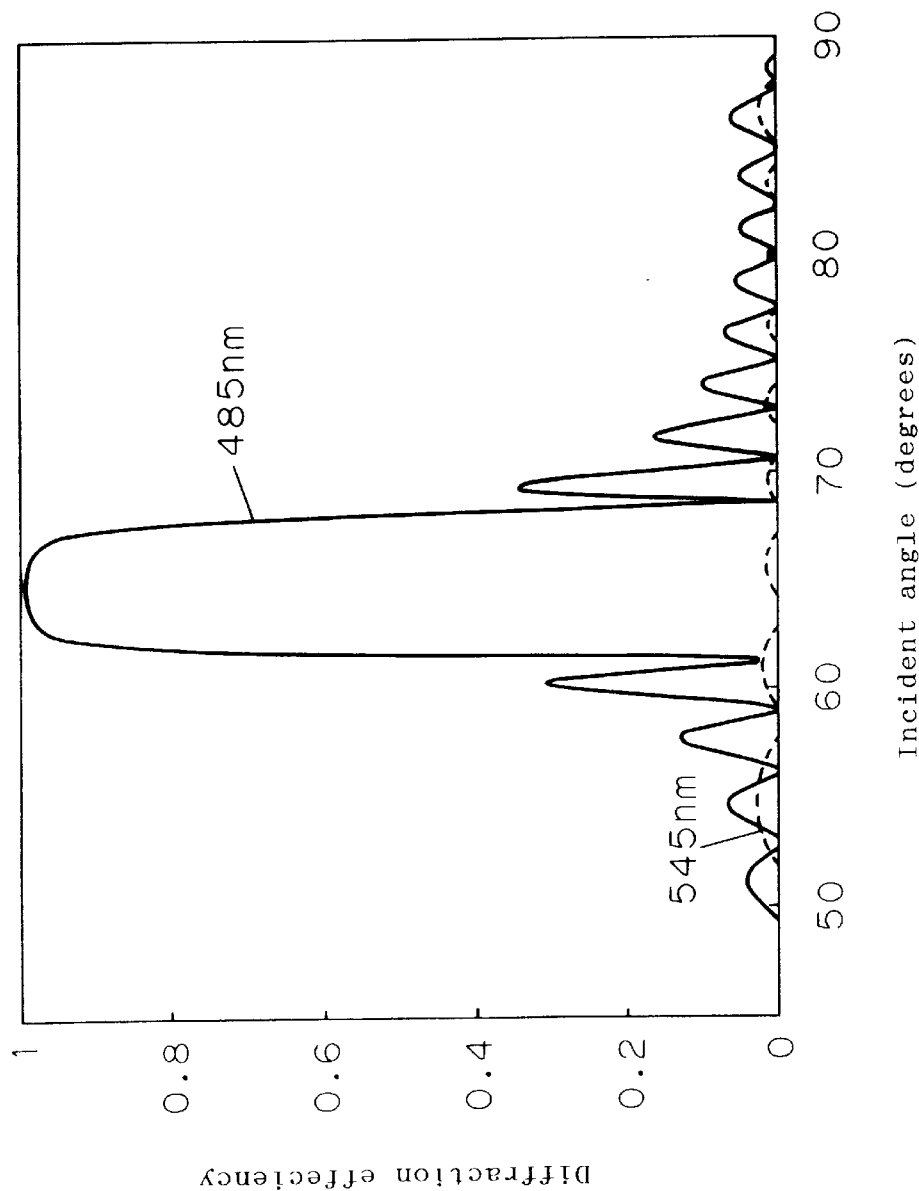
FIG. 41 is a graph showing relations between diffraction efficiency and the incident angle of light with respect to a first hologram H1.

FIG. 41 is a graph showing characteristic curves of a relation between the diffraction efficiency of the first hologram Hl and the incident angle of the incident light, and especially shows the characteristic curves with respect to light beams having the first wavelength with 485 nm ($\lambda1$) and the second wavelength 545 nm ($\lambda2$). In order to simplify the graph, the characteristic curves for the s-polarized light are plotted in the figure. The characteristic for the p-polarized light never overcomes the characteristic for the s-polarized light at the main peak, so that the following description is not inconsistent. The degree of the modulation of the refraction index was 0.03.

As can be seen from FIG. 41, with respect to the light having the wavelength 545 nm, the center of the main peak is in the forbidden band less than 48.8 degrees, so that only the lower slope of the characteristic curve is illustrated by dotted line in the figure. The light having the wavelength 545 nm rarely contributes to the display, so that substantial monochromatic display by blue light with the wavelength 485 nm is realized.

The specific feature of the display apparatus in the third embodiment is that the color of the illumination light for displaying the monochromatic image in each of the upper region U and the lower region L is freely selectable. As shown in FIG. 36, since the first hologram H1 is disposed in the upper region U of the image field and the transparent layer 3 and the second hologram H2 are disposed in the lower region L of the image field, a first monochromatic image by the first illumination light I3 with the first wavelength λ1 is displayed in the upper region U and a second monochromatic image by the second illumination light I4 with the second wavelength λ2 is displayed in the lower region L. The wavelength of the light diffracted by the first hologram H1 is independently selected from that of the second hologram H2 due to the configuration of the display apparatus of the third embodiment.

Variations of the display apparatus in accordance with the third embodiment are now described referring to FIGS. 42(a) to 42(f) which show an image field of the display apparatus. In the figures, the illumination light source (not shown in the figures) are supposed to be disposed below the image field.

Figure 42C:
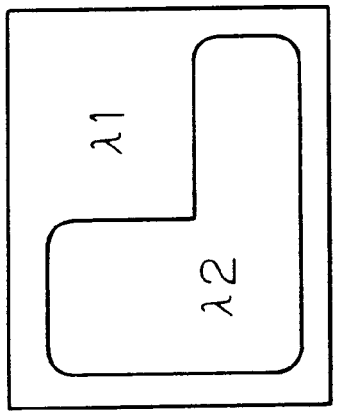
FIG. 42(c) is a schematic front view showing a third example of an image field of the trichromatic display apparatus of this invention.
Figure 42F:
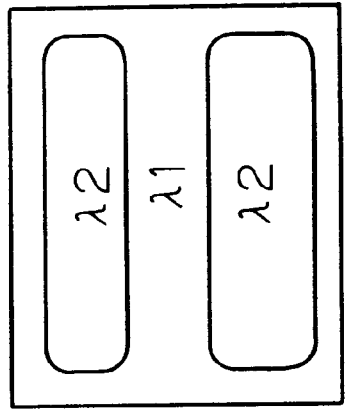
FIG. 42(f) is a schematic front view showing a sixth example of an image field of the trichromatic display apparatus of this invention.
Figure 42B:
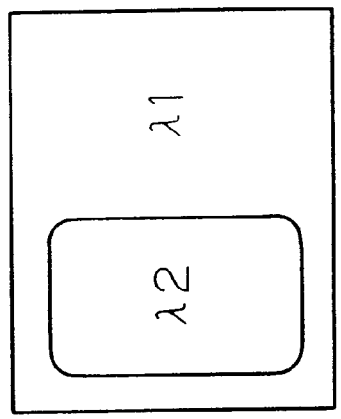
FIG. 42(b) is a schematic front view showing a second example of an image field of the trichromatic display apparatus of this invention.
Figure 42E:
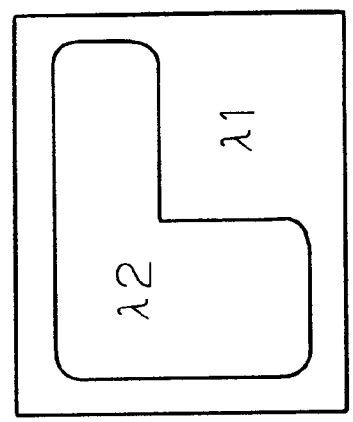
FIG. 42(e) is a schematic front view showing a fifth example of an image field of the trichromatic display apparatus of this invention.
Figure 42A:
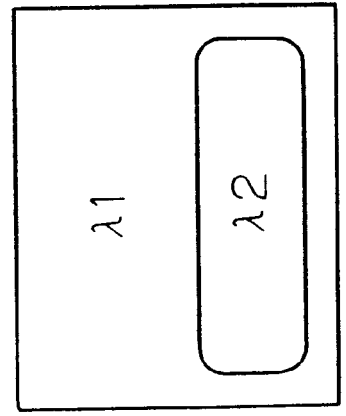
FIG. 42(a) is a schematic front view showing a first example of an image field of the trichromatic display apparatus of this invention.

FIG. 42(a) shows a first example of the display apparatus in which a first region displaying the image by the first illumination light I3 is disposed in an upper portion of the image field, and a second region displaying the image by the second illumination light I4 is disposed in a lower portion of the image field. The sizes of the first and second region are freely selected.

FIG. 42(b) shows a second example of the display apparatus in which the first region corresponding to the first illumination light I3 is disposed in a left-hand portion of the image field, and the second region corresponding to the second illumination light I4 is disposed in a right-hand portion of the image field. The positions of the first region and the second region are interchangeable.

FIG. 42(c) shows a third example of the display apparatus in which the first region corresponding to the first illumination light I3 is disposed in an upper right portion of the image field, and the second region corresponding to the second illumination light I4 is disposed in upper left, lower right and left portions of the image field. The sizes of the first and second region are freely selected.

Figure 42D:
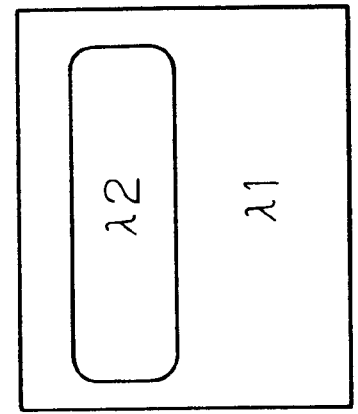
FIG. 42(d) is a schematic front view showing a fourth example of an image field of the trichromatic display apparatus of this invention.

FIG. 42(d) shows a fourth example of the display apparatus in which the first region corresponding to the first illumination light I3 is disposed in the lower portion of the image field, and the second region corresponding to the second illumination light I4 is disposed in the upper portion of the image field, contrary to the above-mentioned first example shown in FIG. 42(a). The sizes of the first and second region are freely selected.

FIG. 42(e) shows a fifth example of the display apparatus in which the first region corresponding to the first illumination light I3 is disposed in a lower right portion of the image field, and the second region corresponding to the second illumination light I4 is disposed in lower left, upper right and left portions of the image field. The sizes of the first and second region are freely selected.

FIG. 42(f) shows a sixth example of the display apparatus in which the the second regions corresponding to the second illumination light I4 are disposed in upper and lower peripheral portions and the first region corresponding to the first illumination light I3 is disposed at the center of the image field. The number, position, size and order of the first region and second regions are freely selected.

When the transparent type hologram is used, a light having a wavelength longer than that in the above-mentioned third embodiment satisfies the condition of total reflection on the boundary face of the transparent substrate 2 and 1he transparent layer 3. Furthermore, a light having a wavelength shorter than that in the third embodiment moves in the forbidden band of the transparent substrate 2. Thus, the relation between the wavelengths of the first illumination light and the second illumination light turns.

The first and second holograms H1 and H2 which are used in the third embodiment are formed by the exposure system shown in FIG. 10 or in FIG,19. More specifically, the first and second holograms H1 and H2 are serially formed in different regions on the same photopolymer film by respectively changing the angles of the reference light and the object light.

As mentioned above, the display apparatus of the third embodiment realizes the dichroic and transparent display. Furthermore, the first and second holograms H1 and H2 are formed by using the method described in the second embodiment.

FOURTH EMBODIMENT

A fourth embodiment relating to a trichromatic display apparatus of this invention is now described with reference to the figures.

In the above-mentioned first embodiment, the dichroic display apparatus is realized by partially forming the transparent layer 3 between the hologram H0 and the transparent substrate 2, and thereby the first propagation light I1 having the shorter wavelength cannot enter into a part of the hologram H0 where the transparent layer 3 is formed.

In the above-mentioned third embodiment, the dichroic display apparatus is realized by using the first and second holograms H1 and H2 respectively having different periodic structure, and thereby the second propagation light I4 having the longer wavelength cannot enter into the first hologram H1, and vice versa.

In the fourth embodiment, the trichromatic display is realized by using these characteristics so as to separate three illumination lights respectively having different wavelength.

Figure 43:
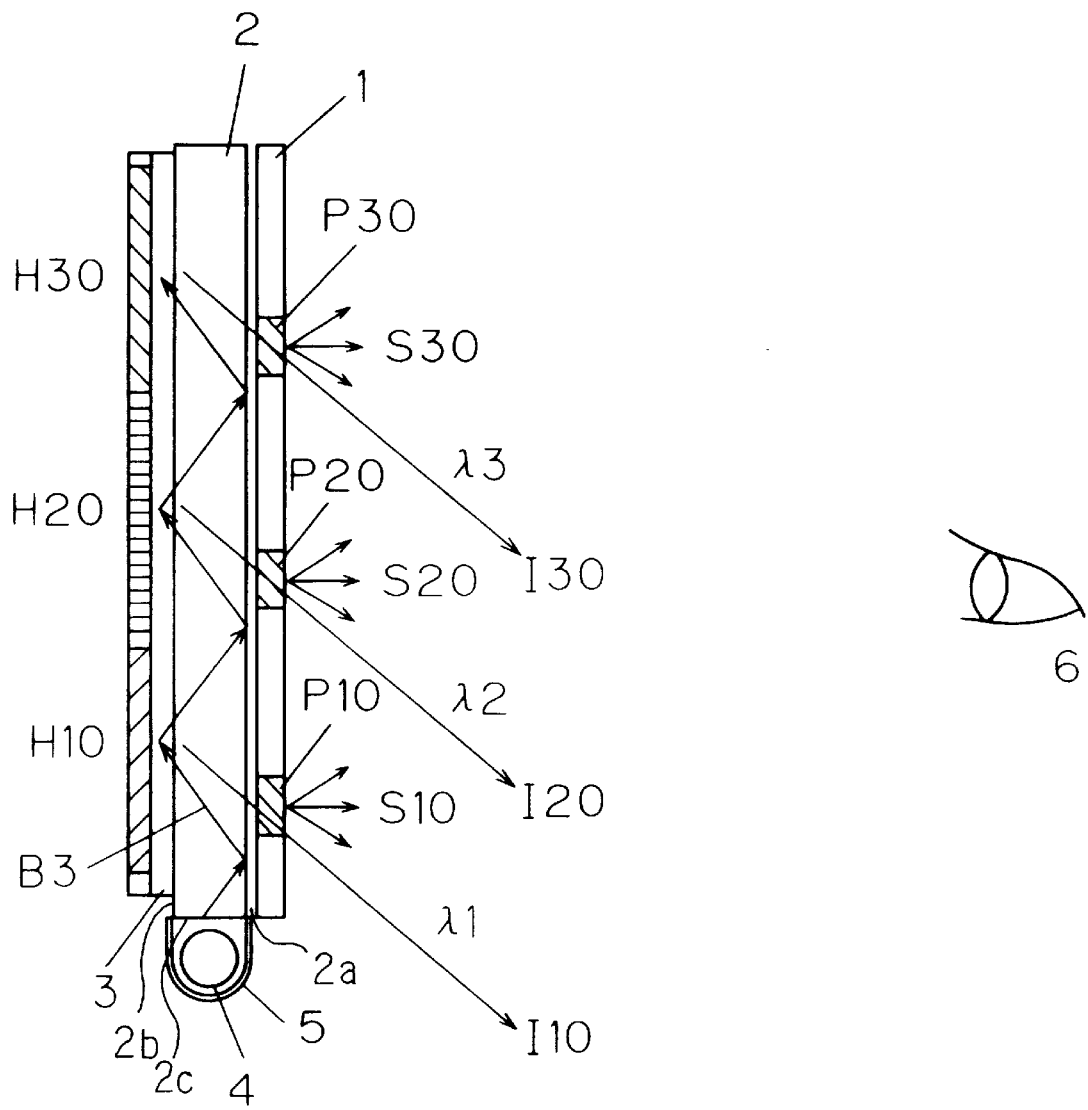
FIG. 43 is a cross-sectional side view showing a second configuration of a trichromatic display apparatus of this invention.

FIG. 43 shows a first configuration of the trichromatic display apparatus of this invention. As can be seen from FIG. 43, the display apparatus comprises a transparent substrate 2, a polymer dispersed liquid crystal device 1 disposed in front of a front face 2a of the transparent substrate 2, a transparent layer 3 formed on a rear face 2b of the transparent substrate 2, reflection type first, second and third holograms H10, H20 and H30, a cold cathode fluorescent lamp 4 disposed for facing a side face 2c of the transparent substrate 2 and a reflection mirror 5 enclosing the lamp 4. Numerical reference 6 designates an observer in the figure.

Reference I10 designates a first illumination light having a first wavelength λ1. Reference 120 designates a second illumination light having a second wavelength λ2. Reference I30 designates a third illumination light having a third wavelength λ3. Reference P10 designates a first pixel which is in the scattering state. Reference S10 designates first forward scattering light from the first pixel S10. Reference P20 designates a second pixel which is in the scattering state. Reference S20 designates second forward scattering-light from the second pixel S20. Reference P30 designates a second pixel which is in the scattering state. Reference S30 designates a third forward scattering light from the third pixel S30.

The liquid crystal device 1 displays a trichromatic image by using the forward scattering lights due to the liquid crystal layer. The first illumination light 110 diffracted by the first hologram H1O irradiates the first pixel P10 from the back. The second illumination light I20 diffracted by the second hologram H20 irradiates the second pixel P20 from the back. The third illumination light I30 diffracted by the third hologram H30 irradiates the third pixel P30 from the back. When the first pixel P10 is in the scattering state, the first illumination light I10 is scattered by the first pixel P10 and is converted to first forward scattering light S1O. Similarly, when the second pixel P20 is in the scattering state, the second illumination light I20 is scattered by the second pixel P20 and is converted to second forward scattering light S20. When the third pixel P30 is in the scattering state, the third illumination light I30 is scattered by the third pixel P30 and is converted to third forward scattering light S30. The first forward scattering light S10 the second forward scattering light S20 and the third forward scattering light S30 respectively reach to the eyes of the observer 6. Thus, the observer 6 sees the trichromatic image displayed by the display apparatus.

Each of the first, second and third holograms H10, H20 and H30 is a volume phase type. A hologram device includes the first hologram H10, the second hologram H20, the third hologram H30, the transparent substrate 2, the cold cathode fluorescent lamp 4 and the reflection mirror 5. The hologram device serves as an illuminator for the display apparatus. Light emitted from the lamp 4 enters into the transparent substrate 2 from the side face 2c. The first hologram H1O diffracts the first light which obliquely enters into the first hologram H10 with a first predetermined incident angle toward the front face 2a of the transparent substrate 2. The first hologram H10, however, does not diffract other light, for example, which perpendicularly enters into the transparent substrate 2. Similarly, the second hologram H20 diffracts the second light which obliquely enters into the second hologram H20 with a second predetermined incident angle toward the front face 2a of the transparent substrate 2. The second hologram H20 does not diffract other light, for example, which perpendicularly enters into the transparent substrate 2. The third hologram H30 diffracts the third light obliquely which enters into the third hologram H30 with a third predetermined incident angle toward the front face 2a of the transparent substrate 2. The third hologram H30 does not diffract other light, for example, which perpendicularly enters into the transparent substrate 2. Thus, the appearance of the hologram device is transparent.

Since the liquid crystal device 1 is disposed in front of the hologram device, when all the pixels of the liquid crystal device 1 are turned to the transparent state, the image field of the display apparatus is entirely transparent. The background view of the display apparatus can be seen as if it is observed through a glass.

When the first, second and third illumination lights I10, I20 and I30 irradiate the pixels or the regions in the transparent state of the liquid crystal device 1, the first, second and third illumination lights I10, I20 and I30 pass through the pixels or the regions. Since the first hologram H10 exits the first illumination light I10 in a downward direction with a predetermined exit angle, the second hologram H20 exits the second illumination light I20 in a downward direction with the same exit angle, and the third hologram H30 exits the third illumination light I30 in a downward direction with the same exit angle. Thus, unnecessary illumination lights I10, I20 and I30 passing through the pixels or the regions in the transparent state of the liquid crystal device 1 does not reach the eyes of the observer 6. In other words, the observer 6 sees only the first, second and third forward scattering lights S10, S20 and S30.

Only the first, second and third pixels P10, P20 and P30 in the scattering state, can be seen as shining to the observer 6. As a result, a high contrast image can be displayed superimposed on the background of the display apparatus.

A first feature of the fourth embodiment of the display apparatus is to provide the transparent layer 3 having a refraction index lower than that of the transparent substrate 2 along the entire rear face 2b of the transparent substrate 2. A second feature is to vary the structures of the first hologram H10, the second hologram H20 and the third hologram H30, corresponding to the purpose of the fourth embodiment. By such a configuration, the display apparatus can display the trichromatic image, and the exit angle of each illumination light can be made the same as shown in FIG. 43. This implies that the holograms H1O, H20 and H30 are not restricted by the condition, but the holograms can be constituted so as to satisfy the condition by increasing the degree of freedom of the design of the holograms by the principle of the trichromatic display of this invention.

The order of the colors of the illumination lights can freely be selected. FIG. 43 illustrates that the wavelength of the third illumination light I30 in the upper region is $\lambda 3$, the wavelength of the second illumination light I20 in the middle region is $\lambda 2$, and the wavelength of the first illumination light I10 in the lower region is $\lambda 1$. However, it is possible that the order of the illumination lights from the upper region to the lower region of the image field is $\lambda 2, \lambda 3$ and $\lambda 1$, or $\lambda 1, \lambda 3$ and $\lambda 2$.

A relation between the third hologram H30 and a propagation light moving in the transparent substrate 2 is described with reference to FIG. 44. With respect to the first and second holograms H10 and H20, the above-mentioned description of the first and second holograms H1 and H2 in the third embodiment is applied. Thus, the explanations with respect to the first and second holograms H10 and H20 are omitted.

Figure 44:
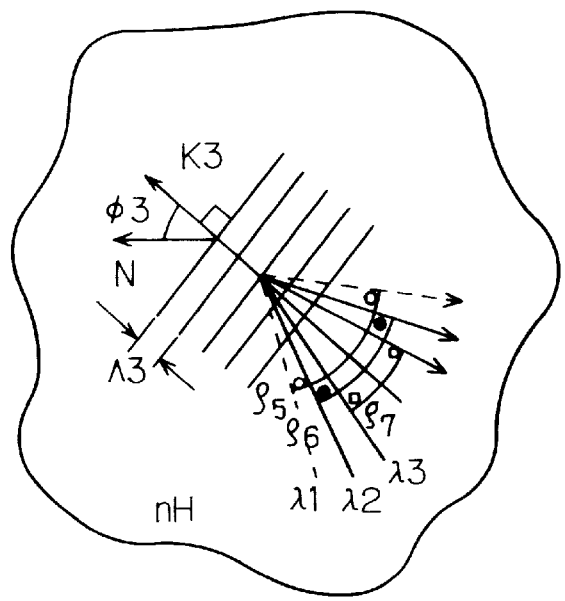
FIG. 44 is a drawing schematically showing a periodic structure of a hologram and optical paths diffracted by a third hologram H30 of the trichromatic display apparatus shown in FIG. 43.

FIG. 44 illustrates a relation between a periodic structure of the third hologram H30 and the various lights. Reference N designates the normal vector of a medium (eg. photopolymer film) of the third hologram H30 or the normal vector of the rear face 2b of the transparent substrate 2 on which the first hologram H1 is provided. Reference $\Lambda 3$ designates a pitch of the periodic structure (or grating). Reference K3 designates a grating vector. Reference $\phi 3$ designates a slanted angle of the periodic structure with reference to the surface of the medium of the third hologram H30. Reference nH designates a refraction index of the medium of the third hologram H30.

As shown in FIG. 44, the third hologram H30 reflects the first light having the first wavelength $\lambda 1$ and crossing the grating vector K3 at an angle $\rho 5$. Furthermore, the third hologram H30 reflects the second light having the second wavelength $\lambda 2$ and crossing the grating vector K3 at an angle $\rho 6$. The third hologram H30 reflects the third light having the third wavelength $\lambda 3$ and crossing the grating vector K3 at an angle $\rho 7$. These relations are shown by the following equations (12) and (13). The relations among the wavelengths are $\lambda 1 < \lambda 2 < \lambda 3$.

$$K3 = 4\pi nH \cdot \cos\rho 5 / \lambda 1 \tag{12}$$
$$= 4\pi nH \cdot \cos\rho 6 / \lambda 2$$
$$= 4\pi nH \cdot \cos\rho 7 / \lambda 3$$

$$\Lambda 3 = 2\pi / K3 \tag{13}$$

For the same reason described in the first embodiment, the phrases of "the first light having the wavelength $\lambda 1$ and crossing the grating vector K3 at an angle ρ5", "the second light having the wavelength λ2 and crossing the grating vector K3 at an angle ρ6"and "the third light having the wavelength λ3 and crossing the grating vector K3 at an angle ρ7"respectively imply that the first, second and third lights respectively include a plurality of light beams having an incident angle in a predetermined range of angle around the angle satisfying the conditions.

Similar to the description in the above-mentioned first and third embodiments, when the propagation light entering into the third hologram H30 includes the light beams (or light components) satisfying the Bragg condition with respect to the first, second and third wavelengths λ1, λ2 and λ3, these three light beams (or light components) are diffracted by the third hologram H30 at the same time. The exit angles of these three light beams (or light components) are respectively a little different. However, the hologram device serving as an illuminator and the liquid crystal device are closely disposed in the display apparatus. Thus, the first illumination light I10, the second illumination light 120 and the third illumination light I30 are not independently separated when the first, second and third illumination lights I10, I20 and I30 reach to the pixels of the liquid crystal device. Consequently, the illumination light mixture of three colors irradiates the pixels in the scattering state.

For separating the first, second and third illumination lights I10, I20 and I30, the first, second and third holograms H10, H20 and H30 respectively have the following constitutions.

(First Hologram H10)

The transparent layer 3 having a refraction index nT smaller than a refraction index nS of the transparent substrate 2 is provided between the first hologram 10 and the transparent substrate 2. The refraction indexes nT and nS satisfy the following formula (14).

$$nT \geq nS \cdot \sin \theta 11 \tag{14}$$

A pitch Λ10 and a slanted angle φ10 of a periodic structure of the first hologram H1O with respect to the second wavelength λ2 satisfy the following formula (15)

$$\phi 10 + \cos^{-1}(\lambda 2/2nH\Lambda 10) + \sin^{-1}(1/nS) < \pi/2 \tag{15}$$

The condition with respect to the third wavelength λ3 is included in the formula (15).

Figure 45:
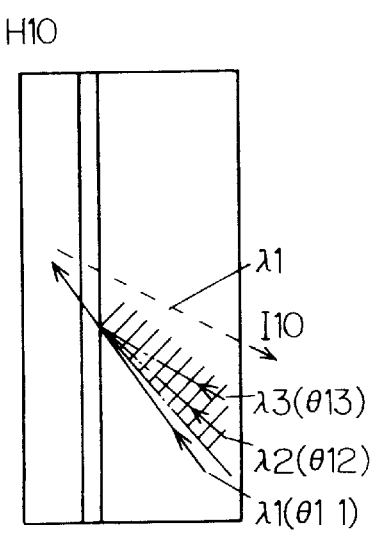
FIG. 45 is a partially enlarged cross-sectional view showing the principle that only a first light having a first wavelength $\lambda 1$ is diffracted by a first hologram H10.

Implications of these formulae are described with reference to FIG. 45.

The formula (14) shows the condition when a first propagation light designated by λ1(θ11) in the figure, which has the first wavelength λ1 and satisfies the Bragg condition with respect to the first hologram H10, is not totally reflected by the boundary face between the transparent substrate 2 and the transparent layer 3.

The formula (15) shows the condition when a second propagation light designated by λ2(θ12) in the figure, which has the first wavelength λ2 and satisfies the Bragg condition with respect to the first hologram H10, moves in the forbidden band. At the same time, a third propagation light designated by λ3(θ13) in the figure, which has the longest third wavelength λ3, also moves in the forbidden band.

By such a mechanism, the first illumination light I10 having the first wavelength λ1 only is obtained by the first hologram H10.

(Second Hologram H20)

The transparent layer 3 having a refraction index nT which is smaller than a refraction index nS of the transparent substrate 2 is provided between the second hologram 20 and the transparent substrate 2. The refraction indexes nT and nS satisfy the following formulae (16) and (17).

$$nT \geq nS \cdot \sin \theta 22 \tag{16}$$

$$nT \leq nS \cdot \sin \theta 21 \tag{17}$$

A pitch Λ20 and a slanted angle θ20 of a periodic structure of the second hologram H20 with respect to the third wavelength λ3 satisfy the following formula (18)

$$\phi 20 + \cos^{-1}(\lambda 3/2nH\Lambda 20) + \sin^{-1}(1/nS) < \pi/2 \tag{18}$$

The condition with respect to the third wavelength λ3 is included in the formula (15).

Figure 46:
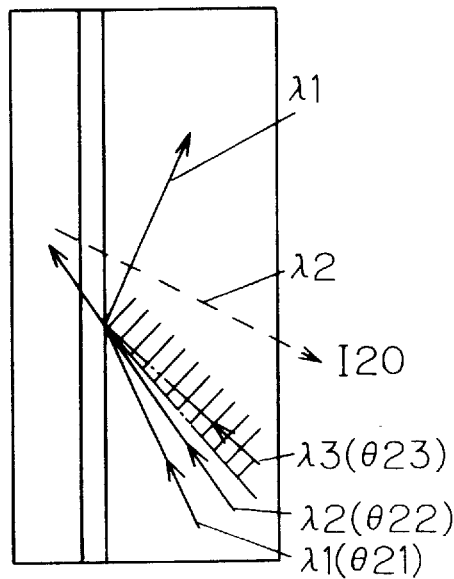
FIG. 46 is a partially enlarged cross-sectional view showing the principle that only a second light having a second wavelength $\lambda 2$ is diffracted by a second hologram H20.

Implications of these formulae are described with reference to FIG. 46.

The formula (16) shows the condition that a second propagation light designated by λ2(θ22) in the figure, which has the second wavelength λ2 and satisfies the Bragg condition with respect to the second hologram H20, is not totally reflected by the boundary face between the transparent substrate 2 and the transparent layer 3.

The formula (17) shows the condition that a first propagation light designated by λ1(θ21) in the figure, which has the first wavelength λ1 and satisfies the Bragg condition with respect to the second hologram H20, is totally reflected by the boundary face between the transparent substrate 2 and the transparent layer 3.

The formula (18) shows the condition that a third propagation light designated by λ3(23) in the figure, which has the third wavelength λ3 and satisfies the Bragg condition with respect to the second hologram H20, moves in the forbidden band.

By such a mechanism, the second illumination light 120 having the second wavelength λ2 only is obtained by the second hologram H20.

(Third hologram H30)

The transparent layer 3 having a refraction index nT which is smaller than a refraction index nS of the transparent substrate 2 is provided between the third hologram 30 and the transparent substrate 2. The refraction indexes nT and nS satisfy the following formulae (19) and (20).

$$nT \geq nS \cdot \sin \theta 33 \tag{19}$$

$$nT \leq nS \cdot \sin \theta 32 \tag{20}$$

In this regard, θ3j implies an incident angle or a propagation angle of a propagation light having the wavelength λj and satisfying the Burrug's condition with respect to the third hologram H30. The condition with respect to the first wavelength λ1 is included in the formula (20).

Figure 47:
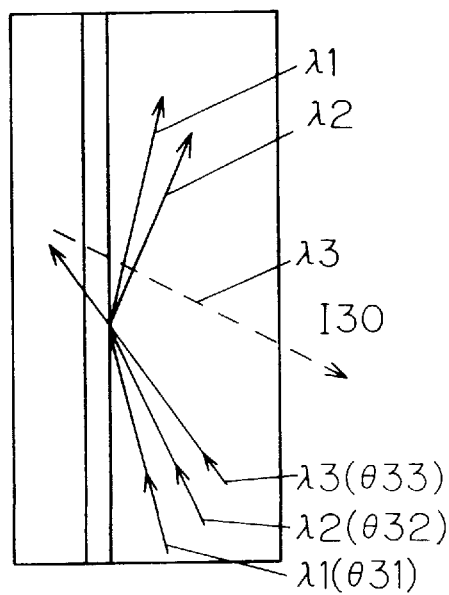
FIG. 47 is a partially enlarged cross-sectional view showing the principle that only a third light having a third wavelength $\lambda 3$ is diffracted by the third hologram B30.

Implications of these formulae are described with reference to FIG. 47.

The formula (19) shows the condition that a third propagation light designated by λ3(θ33) in the figure, which has the third wavelength λ3 and satisfies the Bragg condition with respect to the third hologram H30, is not totally reflected by the boundary face between the transparent substrate 2 and the transparent layer 3.

The formula (20) shows the condition that a second propagation light designated by λ2(θ32) in the figure, which has the second wavelength λ2 and satisfies the Burrug's condition with respect to the third hologram H30, is totally reflected by the boundary face between the transparent substrate 2 and the transparent layer 3. At the same time, a first propagation light designated by λ1(θ31) in the figure and having the first wavelength λ1 which is shorter than the second wavelength λ2 is also totally reflected by the boundary face between the transparent substrate 2 and the transparent layer 3.

By such a mechanism, the third illumination light I30 having the third wavelength λ3 only is obtained by the third hologram H30.

In the above-mentioned formulae, the refraction index of the transparent layer 3 is uniformity designated by nT. The fourth embodiment, however, discloses the possibility that the transparent layer is provided between each of the first, second and third holograms H10, H20 and H30 and the transparent substrate 2. For example, it is possible that the refraction index of the transparent layer 3 between the first hologram H10 and the transparent substrate 2 is different from that between the second or third holograms H20 or H30 and the transparent substrate 2. Alternatively, it is possible that a part of the transparent layer 3 contacting the first hologram H10 is omitted.

Operation of the display apparatus using the above-mentioned principle for separating trichromatic illumination lights is described with reference to FIG. 43.

The first, second and third illumination Lights H10, H20 and H30, which are separated by the first, second and third holograms H10, H20 and H30 due to the above-mentioned mechanisms, irradiate the first, second and third pixels P10, P20 and P30 of the liquid crystal device 1 which are in the scattering state, and scattered by the liquid crystal in the first, second and third pixels P10, P20 and P30. Thus, the first, second and third forward scattering lights S10, S20 and S30 reach to the eyes of the observer 6. By the above-mentioned mechanisms, the first, second and third pixels P10, P20 and P30 are respectively observed as different colored scattering pixels by the observer 6.

Specific data for parameters of the display apparatus in the fourth embodiment are recited below. However, this invention is not limited by these values of the parameters. The incident angle of the propagation light incident on the holograms are designated by θ in, and the exit angle of the diffracted illumination lights are designated by θ out.

Color of the cold cathode fluorescent lamp 4 was a mixture of blue, green and red, and the diameter of the lamp 4 was 3 mm;

The reflection mirror 5 was an evaporation film of aluminum;

The material (optical glass) of the transparent substrate 2 was BK7, the refraction index nS thereof was 1.52, and the thickness of the transparent substrate 2 was 4 mm;

The material of the transparent layer 3 was $SiO_2$, the refraction index thereof was 1.46 and the thickness of the transparent layer 3 was 1 μm;

The material of the first hologram H10 was photopolymerizing type photopolymer, the refraction index nH thereof was 1.5, and the thickness of the hologram H10 was 10 μm;

The first wavelength λ1 was 485 nm;

The slanted angle θ1 of the first hologram H10 was 45 degrees;

The pitch Λ1 of the periodic structure of the first hologram H10 was 0.17 μm;

The incident angle θ in of the propagation light was 65 degrees, and the exit angle θ out of the first illumination light I10 to the atmosphere was 40 degrees;

The material of the second hologram H20 was photopolymerizing type photopolymer, the refraction index nH thereof was 1.5, and the thickness of the second hologram H2 was 10 μm;

The second wavelength λ2 was 545 nm;

The slanted angle θ2 of the second hologram H20 was 45 degrees;

The pitch Λ2 of the periodic structure of the second hologram H20 was 0.19 μm;

The incident angle θ in of the propagation light was 65 degrees, and the exit angle θ out of the second illumination light I20 to the atmosphere was 40 degrees;

The material of the third hologram H30 was photopolymerizing type photopolymer, the refraction index nH thereof was 1.5, and the thickness of the third hologram H30 was 10 μm;

The third wavelength λ3 was 610 nm;

The slanted angle θ3 of the third hologram H30 was 45 degrees;

The pitch Λ3 of the periodic structure of the third hologram H30 was 0.21 μm;

The incident angle θ in of the propagation light was 65 degrees, and the exit angle θ out of the third illumination light I30 to the atmosphere was 40 degrees; and The total reflection angle θc on the boundary face between the transparent substrate (made of BK7) and the transparent layer 3 (made of $SiO_2$) was 74 degrees.

Thus, it is possible for the intensity of the luminance of the scattering display to be increased by decreasing the exit angle θ out.

Figure 48:
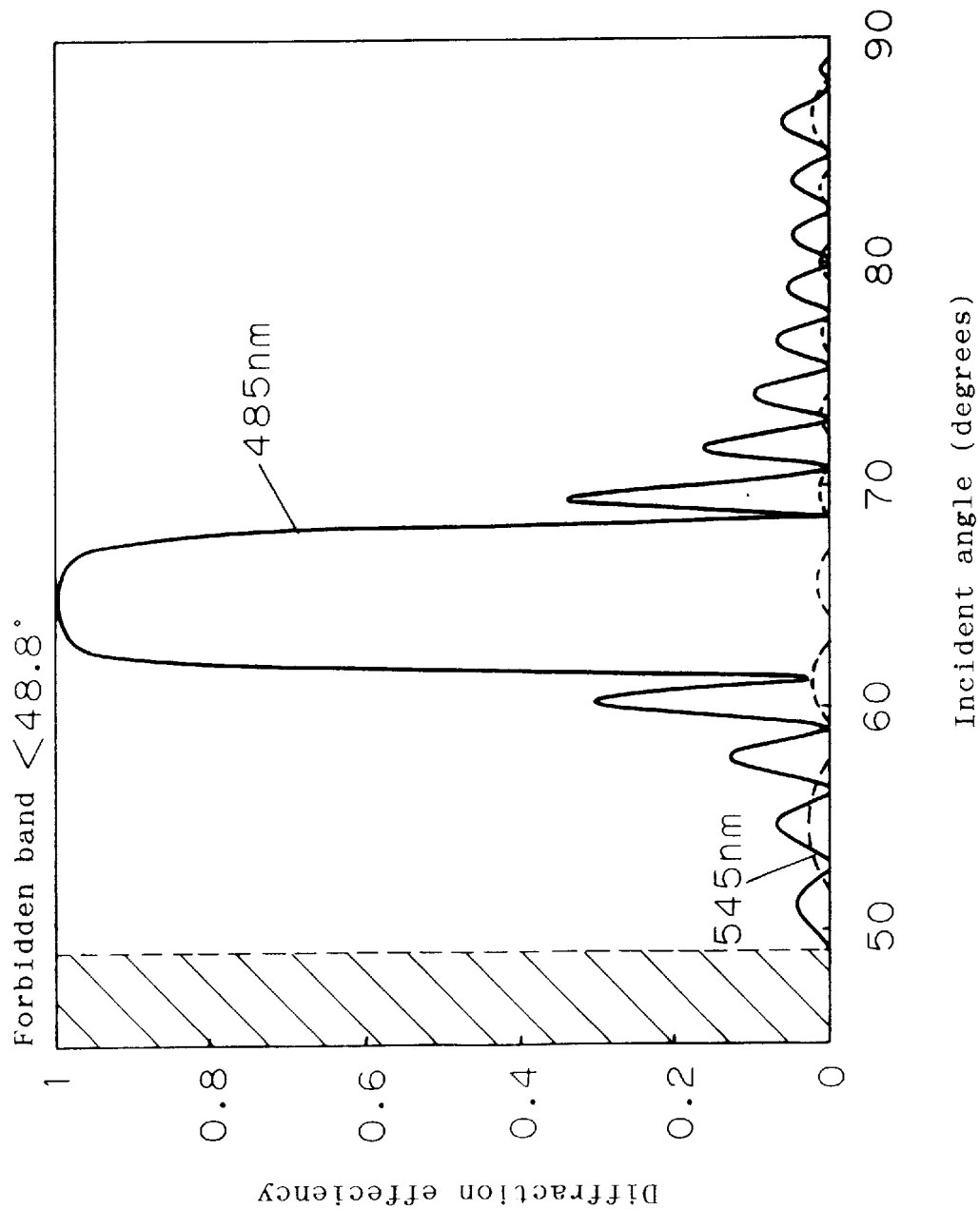
FIG. 48 is a graph showing relations between diffraction efficiency and the incident angle of the light with respect to the first hologram H10.
Figure 49:
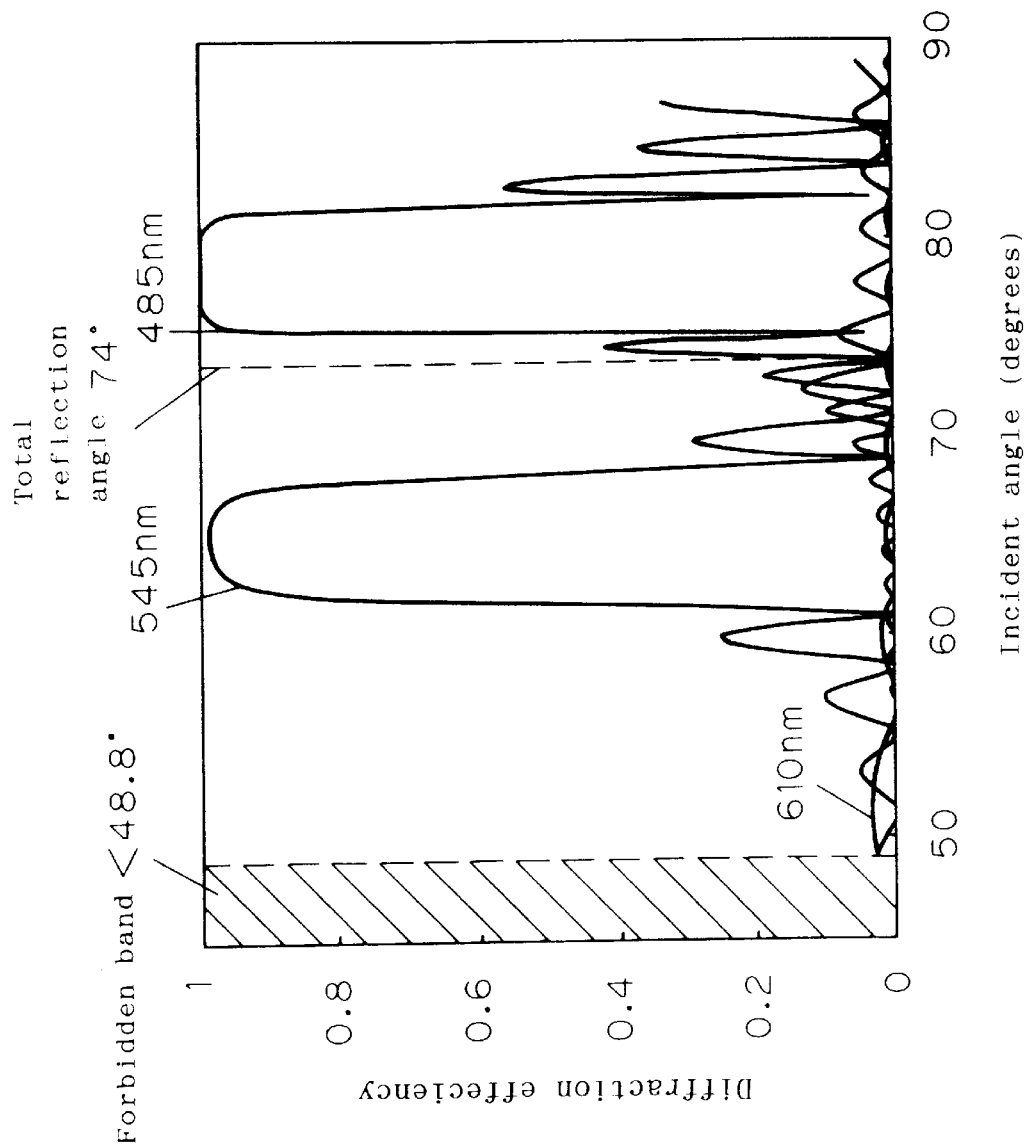
FIG. 49 is a graph showing relations between diffraction efficiency and the incident angle of the light with respect to the second hologram H20.
Figure 50:
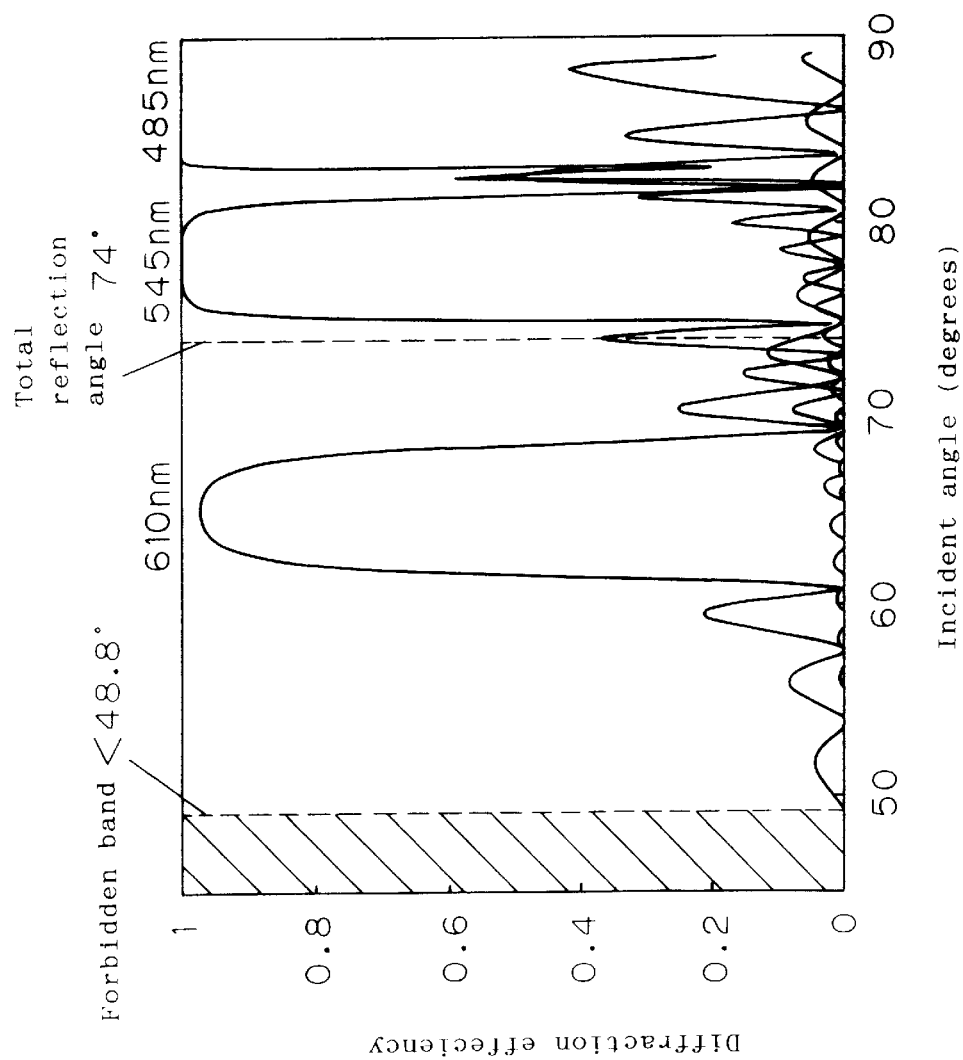
FIG. 50 is a graph showing relations between the diffraction efficiency and the incident angle of the light with respect to the third hologram H30.

The relation between the diffraction efficiency of the holograms H10, H20 and H30 and the incident angles of the incident lights are described referring to FIGS. 48 to 50. In order to simplify the graph, the characteristic curves for the s-polarized light are plotted in the figures. The characteristic for the p-polarized light do not overcome the characteristic for the s-polarized light at the main peak, so that the following description is not inconsistent. The degree of the modulation of the refraction index was 0.03.

FIG. 48 is a graph showing characteristic curves of the relation between the diffraction efficiency of the first hologram H10 and the incident angle of the incident light, and especially shows the characteristic curves with respect to light beams having the first wavelength with 485 nm (λ1) and the second wavelength 545 nm (λ2). As can be seen from FIG. 48, with respect to the light having the second wavelength 545 nm, the center of the main peak is in the forbidden band at less than 48.8 degrees, so that only the lower slope of the characteristic curve is illustrated by dotted line in the figure. With respect to the light having the third wavelength 610 nm, the center of the main peak and the lower slope of the characteristic curve are in the forbidden band at less than 48.8 degrees, so that the characteristic curve with respect to the third wavelength 610 nm is not illustrated in the figure. The light having the wavelength 545 nm rarely contributes to the display, so that substantial monochromatic display by blue light with the first wavelength 485 nm is realized with the first hologram H10.

FIG. 49 is a graph showing characteristic curves of the relation between the diffraction efficiency of the second hologram H20 and the incident angle of the incident light, and especially shows the characteristic curves with respect to light beams having the first wavelength with 485 nm (λ1), the second wavelength 545 nm (λ2) and the third wavelength 610 nm (λ3). As can be seen from FIG. 49, with respect to the light having the first wavelength 485 nm, most of the center of the main peak and the lower slope of the characteristic curve are in the region larger than the total reflection angle of 74 degrees. Thus, it is found that the light having the first wavelength 485 nm is rarely diffracted by the second hologram H20. With respect to the light having the third wavelength 610 nm, the center of the main peak is in the forbidden band less than 48.8 degrees, so that only the lower slope of the characteristic curve is illustrated by the dotted line in the figure. The light having the wavelength 610 nm rarely contributes to the display, so that substantial monochromatic display by green light with the second wavelength 545 nm is realized with the second hologram H20.

FIG. 50 is a graph showing characteristic curves of the relation between the diffraction efficiency of the third hologram H30 and the incident angle of the incident light, and especially shows the characteristic curves with respect to light beams having the first wavelength with 485 nm ($\lambda$1), the second wavelength 545 nm ($\lambda$2) and the third wavelength 610 nm ($\lambda$3). As can be seen from FIG. 50, with respect to both the light having the first wavelength 485 nm and the light having the second wavelength 545 nm, most of the center of the main peak and the lower slope of the characteristic curves are in the region larger than the total reflection angle of 74 degrees. Thus, it is found that the lights having the first wavelength 485 nm and the first wavelength 545 nm are rarely diffracted by the third hologram H30. Thus, substantial monochromatic display by red light with the third wavelength 610 nm is realized by the third hologram H30.

The specific feature of the display apparatus in the fourth embodiment is that the color of the illumination light for displaying the monochromatic image is selectable free from the position of the image. In the display apparatus shown in FIG. 43, the color of the third illumination light I30 in the upper region of the image field is described as red and having the third wavelength 610 nm($\lambda$3); the color of the second illumination light I20 in the middle region of the image field is described as green and having the second wavelength 545 nm ($\lambda$2); and the color of the first illumination light I10 in the lower region of the image field is described as blue and having the second wavelength 485 nm ($\lambda$1). However, the order of the colors of the first, second and third illumination lights I10, I20 and I30 is selected to be, for example, green, red and blue, blue, red and green, etc.

The first, second and third holograms H10, H20 and H30 which are used in the fourth embodiment are formed using the exposure system shown in FIG. 10 or in FIG,19. More specifically, the first, second and third holograms H10, H20 and H30 are serially formed in different regions on the same photopolymer film by respectively changing the angles of the reference light and the object light.

As mentioned above, the display apparatus of the fourth embodiment realizes a trichromatic and transparent display. Furthermore, the first, second and third holograms H10, H20 and H30 are formed by using the method described in the second embodiment.

OTHER APPLICATION

Figure 51:
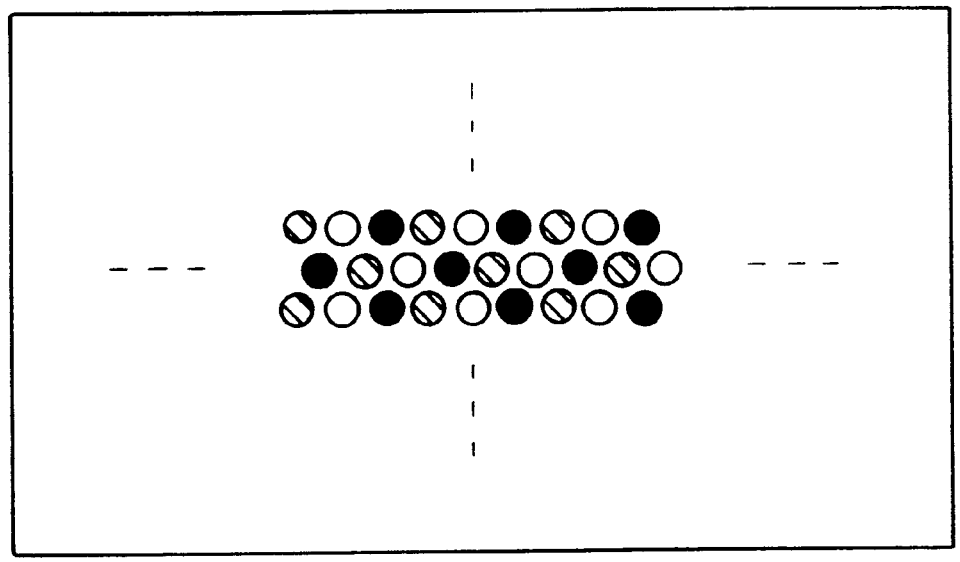
FIG. 51 is an enlarged front view showing a matrix of the first, second and third holograms for displaying a full colored image by an application of the trichromatic display apparatus of this invention.

In an application of the trichromatic display apparatus of the above-mentioned fourth embodiment, a full-colored display apparatus is realized. In the full-colored display apparatus, an area for each display region where each of the first, second and third illumination lights irradiates is minimized, and the display regions corresponding to the the first, second and third illumination lights are arranged for forming a matrix as shown in FIG. 51. The arrangement of the display regions corresponding to the colors of blue, green and red are not restricted as illustrated.

The first, second and third holograms corresponding to the matrix are formed by the exposure system shown in FIG. 10 or in FIG. 19. More specifically, the first, second and third holograms corresponding to blue, green and red are serially formed in different regions on the same photopolymer film by respectively changing the angles of the reference light and the object light.

When another configuration as shown in FIGS. 13 to 18 and described in the above-mentioned first embodiment is further added in the configuration shown in FIG. 51, the intensity of the luminance of the display apparatus is further increased and is made even. The details are already described above, so that the explanation is omitted here. The holograms are formed by the method described in the second embodiment.

In the above-mentioned first to fourth embodiments, the hologram(s) are formed as reflection type, and the illumination light from each hologram obliquely exits downward of the image field. With such configuration of the hologram, both the s-polarized light component and the p-polarized light component of the propagation light moving in the transparent substrate are effectively utilized. Consequently, the luminance of the display apparatus is increased.

Figure 52:
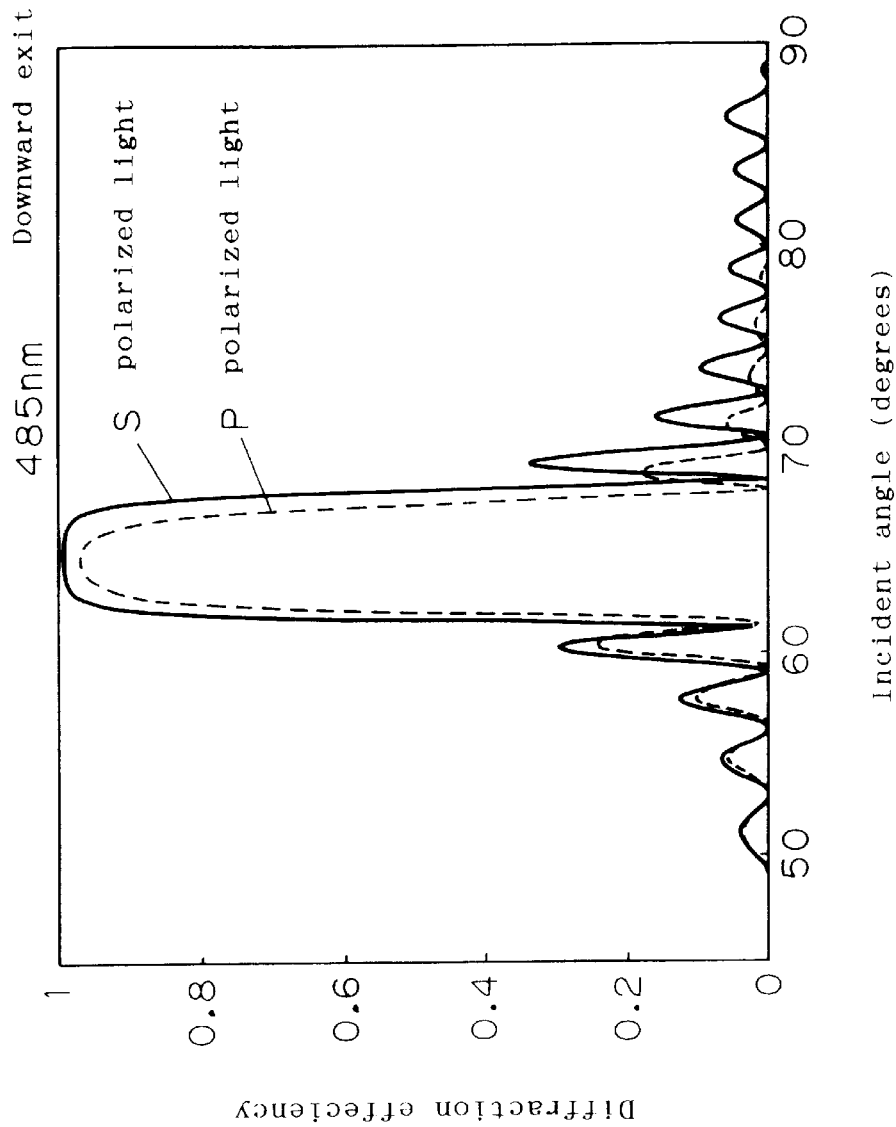
FIG. 52 is a graph showing relations between diffraction efficiency and the incident angle of s-polarized light and p-polarized light with respect to a hologram obliquely exiting diffracted light in a downward direction.

FIG. 52 is a graph showing characteristic curves of the relation between the diffraction efficiency of the first hologram H10 in the fourth embodiment and the incident angle of the incident light, and especially shows the characteristic curves corresponding to the s-polarized light and the p-polarized light having the first wavelength with 485 nm ($\lambda$1). The data for illustrating FIG. 48 are re-plotted with respect to the s-polarized light and the p-polarized light in FIG. 52.

Figure 53:
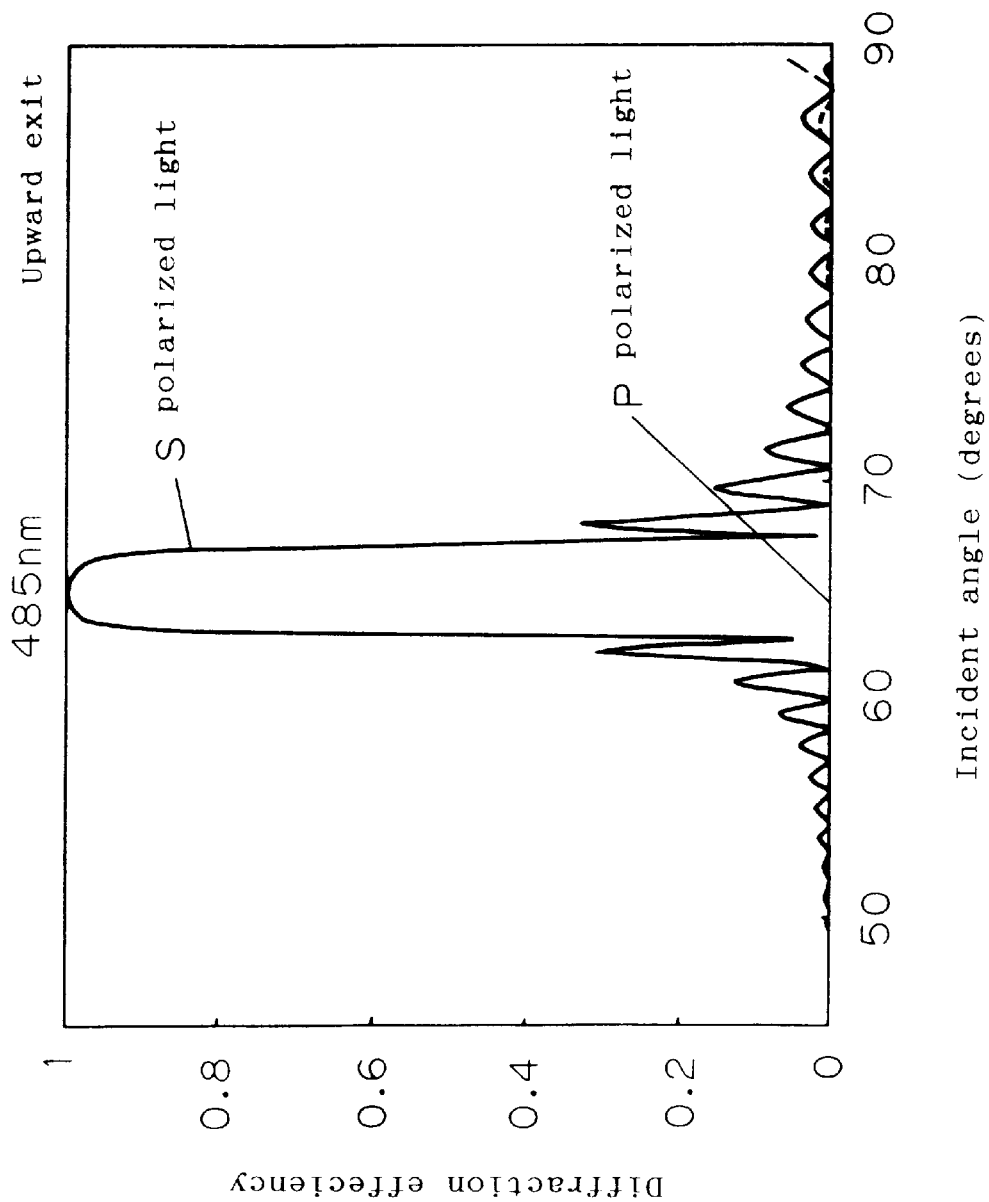
FIG. 53 is a graph showing relations between diffraction efficiency and the incident angle of s-polarized light and p-polarized light with respect to a hologram obliquely exiting diffracted light in an upward direction.

FIG. 53 is a graph showing characteristic curves of the relation between the diffraction efficiency of the first hologram H10 in the fourth embodiment and the incident angle of the incident light, and especially shows the characteristic curves corresponding to the s-polarized light and the p-polarized light having the first wavelength with 485 nm ($\lambda$1). In comparison with the case of FIG. 52, the incident angle was fixed at 65 degrees, but the exit angle to the atmosphere of the illumination light was changed to be 40 degrees in an upward direction.

The degree of the modulation of the refraction index was 0.03 in both cases of FIGS. 52 and 53.

As can be seen from FIG. 53, it is found that the diffraction efficiency of the p-polarized light in the upward direction was extremely small. Furthermore, the band width of the main peak of the characteristic curve corresponding to the s-polarized light was narrower than that shown in FIG. 52. On the other hand, as can be seen from FIG. 52, the diffraction efficiency of the p-polarized light was relatively higher at about 98%, and the band widths of the main peaks of the characteristic curves corresponding to the s-polarized light and the p-polarized light were relatively wider. Thus, by directing the illumination light downward, the luminance of the display apparatus is increased.

Alternatively, the above-mentioned relations are applicable to the transmission hologram. When the illumination light is upwardly exited, the diffraction efficiency of the p-polarized light component is higher. Alternatively, when the illumination light is downwardly exited, the diffraction efficiency of the p-polarized light component is Lower. Thus, in the display apparatus using the transmission hologram, it is preferable that the illumination light be exited upwardly in order to increase the luminance of the display apparatus.

Hereupon, the terms "upward" and "downward" are used for defining the exit direction of the illumination light, because the image field of the display apparatus is oriented to be vertical and the light source is disposed below the bottom face of the transparent substrate. The propagation light entering into the transparent substrate moves from the bottom end face to the top end face.

Figure 54:
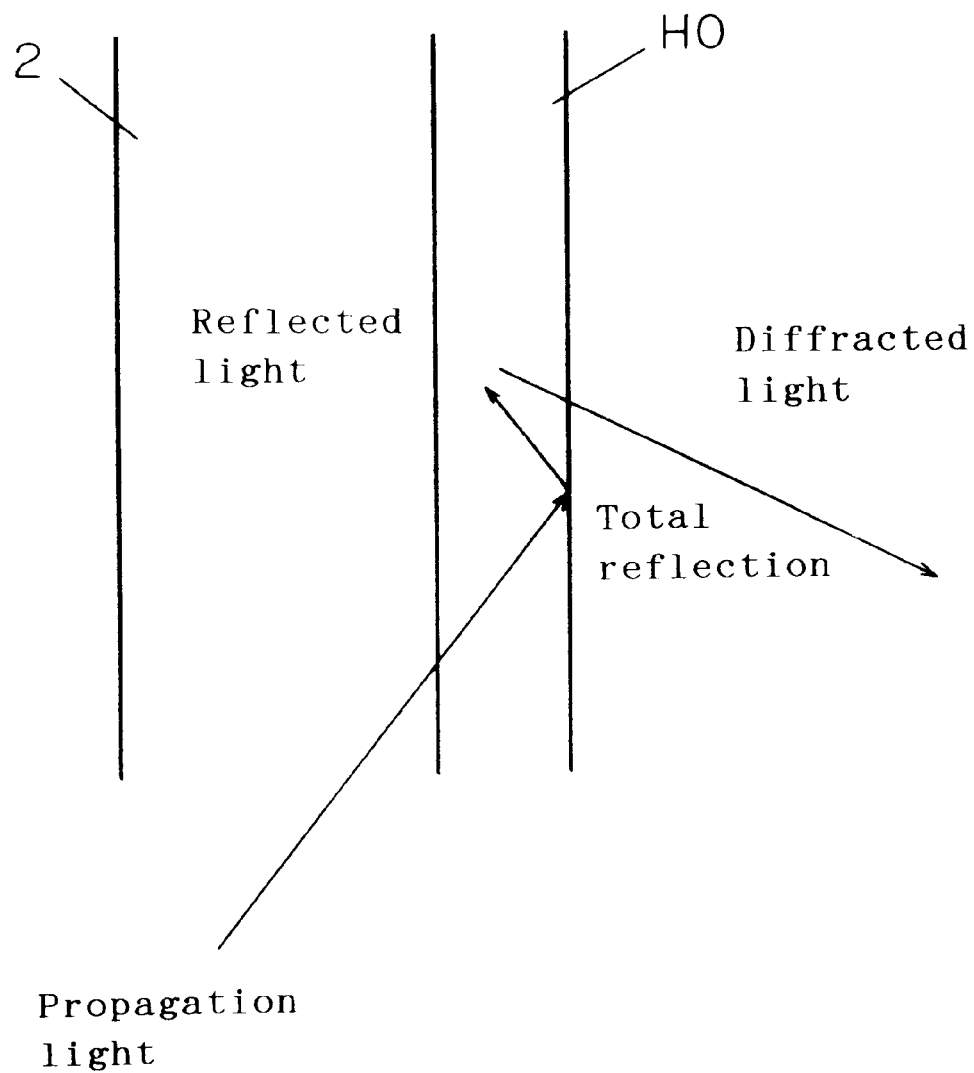
FIG. 54 is a partially enlarged cross-sectional side view showing another application of this invention in which positions of a transparent substrate and a hologram are turned.
Figure 55:
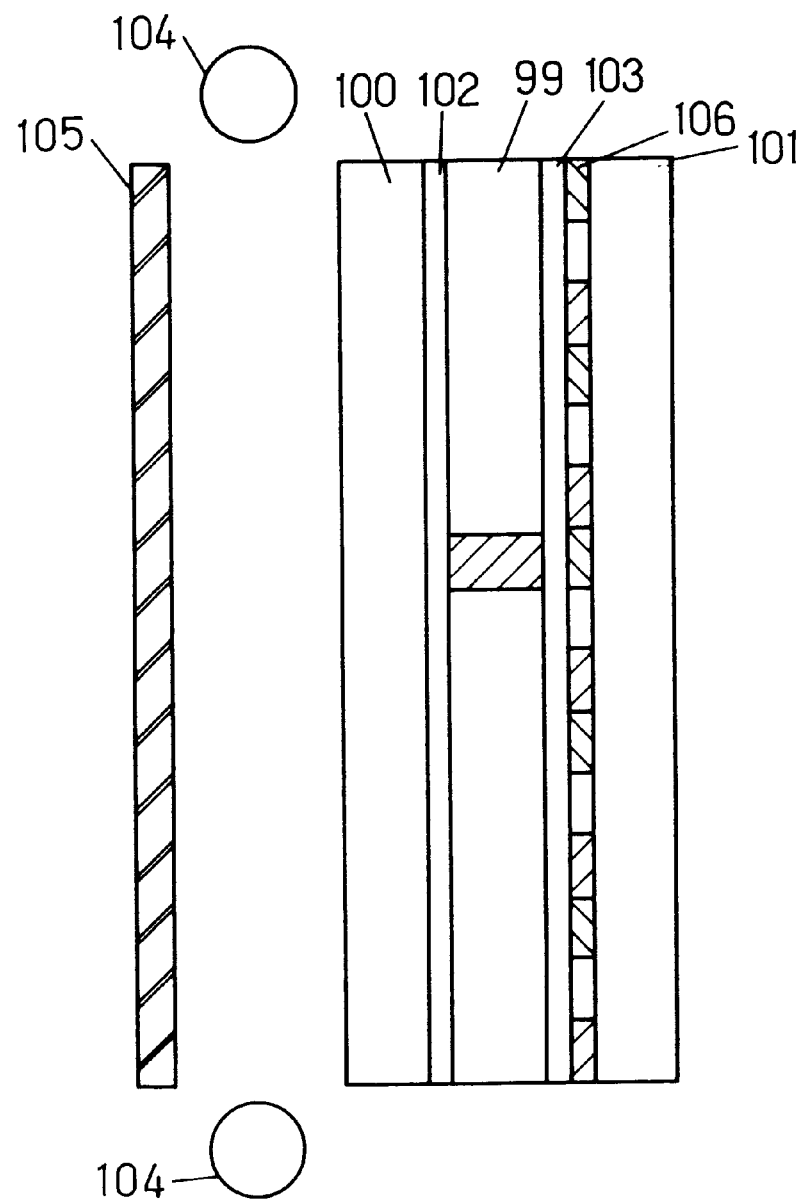
FIG. 55 is a cross-sectional side view showing a configuration of a inventional liquid crystal display apparatus.
Figure 56:
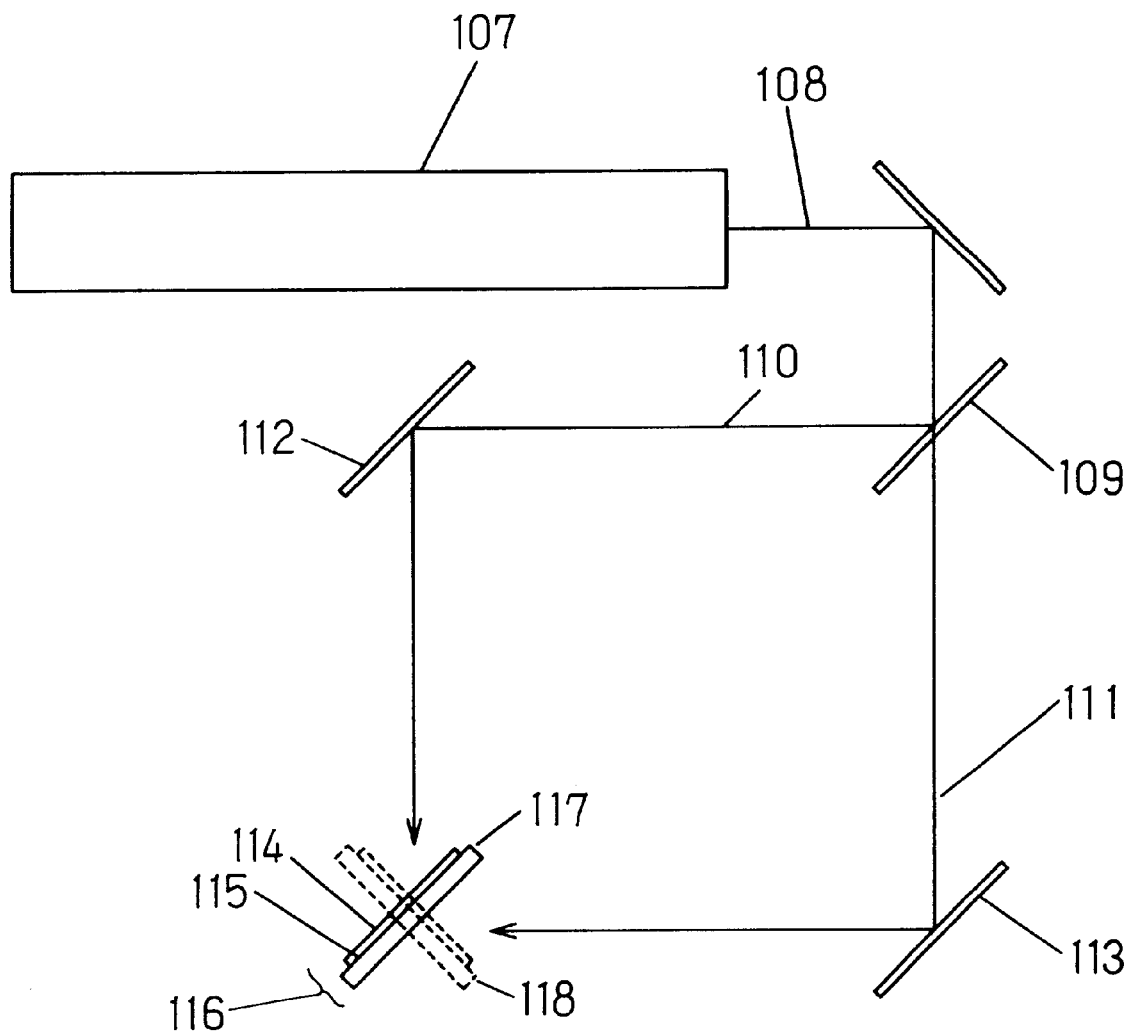
FIG. 56 is a plan view showing a configuration of an optical system for exposing laser light beams for forming a conventional hologram.
Figure 57:
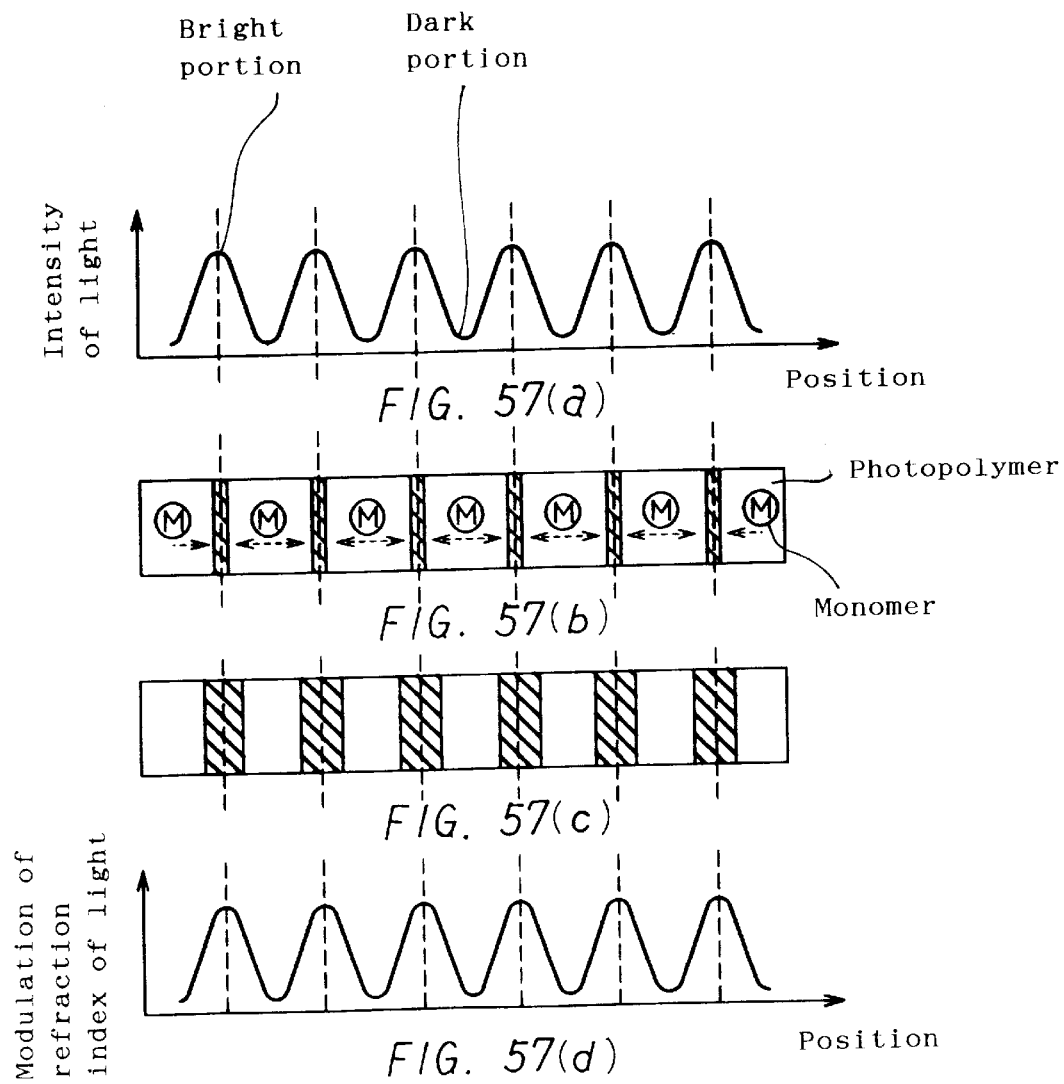
FIG. 57(a) is a graph showing a distribution of intensity at an interference fringe.
FIG. 57(b) is a drawing schematically showing the motion of a monomer which does not react in a photopolymer.
FIG. 57(c) is a drawing schematically showing regions where photopolymerization advances.
FIG. 57(d) is a graph showing the distribution of the degree of modulation of the refraction index of light of the photopolymer.
Figure 58:
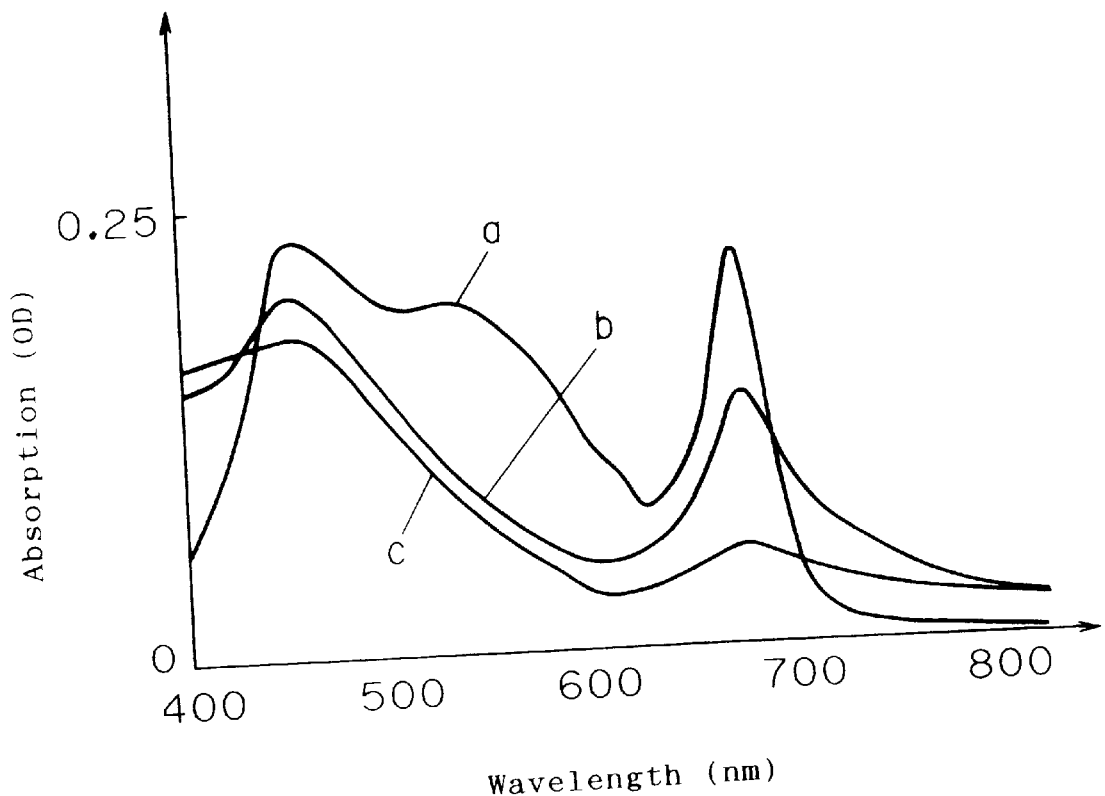
FIG. 58 is a graph showing characteristic curves of absorption by the photopolymer in conventional processes for forming the hologram.
Figure 59:
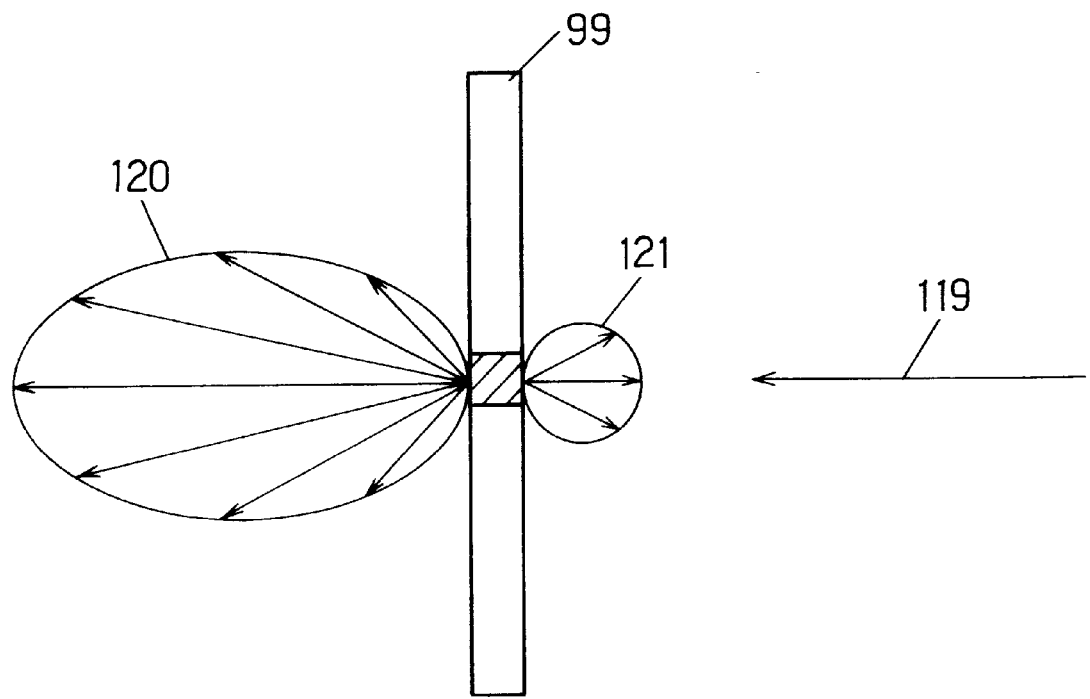
FIG. 59 is a cross-sectional side view showing the principle of the scattering light due to the photopolymer.
Figure 60A:
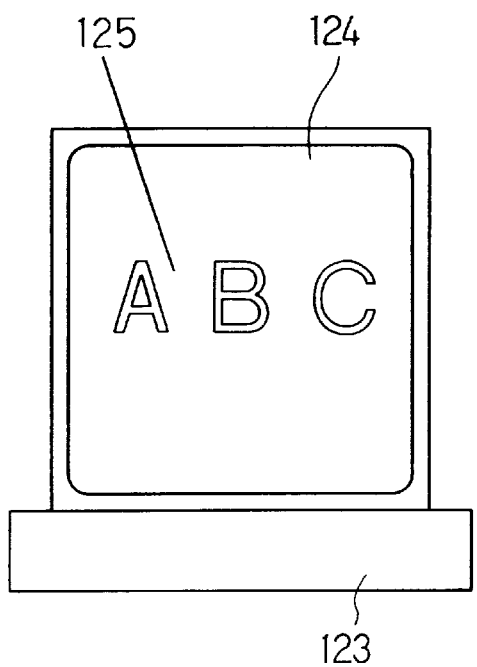
FIG. 60(a) is a front view of a conventional liquid crystal display apparatus.
Figure 60B:
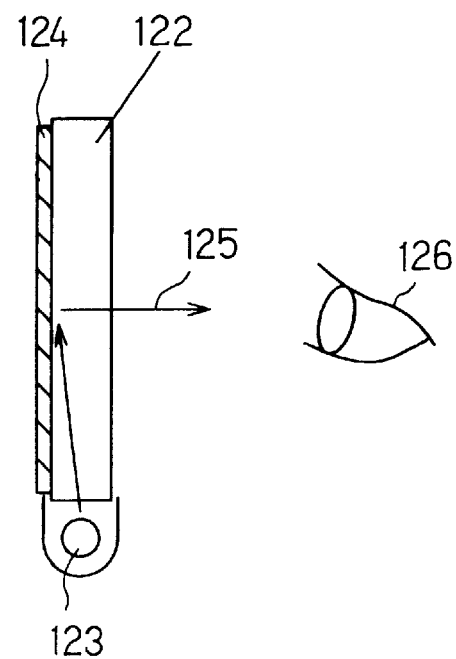
FIG. 60(b) is a cross-sectional side view of the conventional liquid crystal display apparatus.
Figure 61:
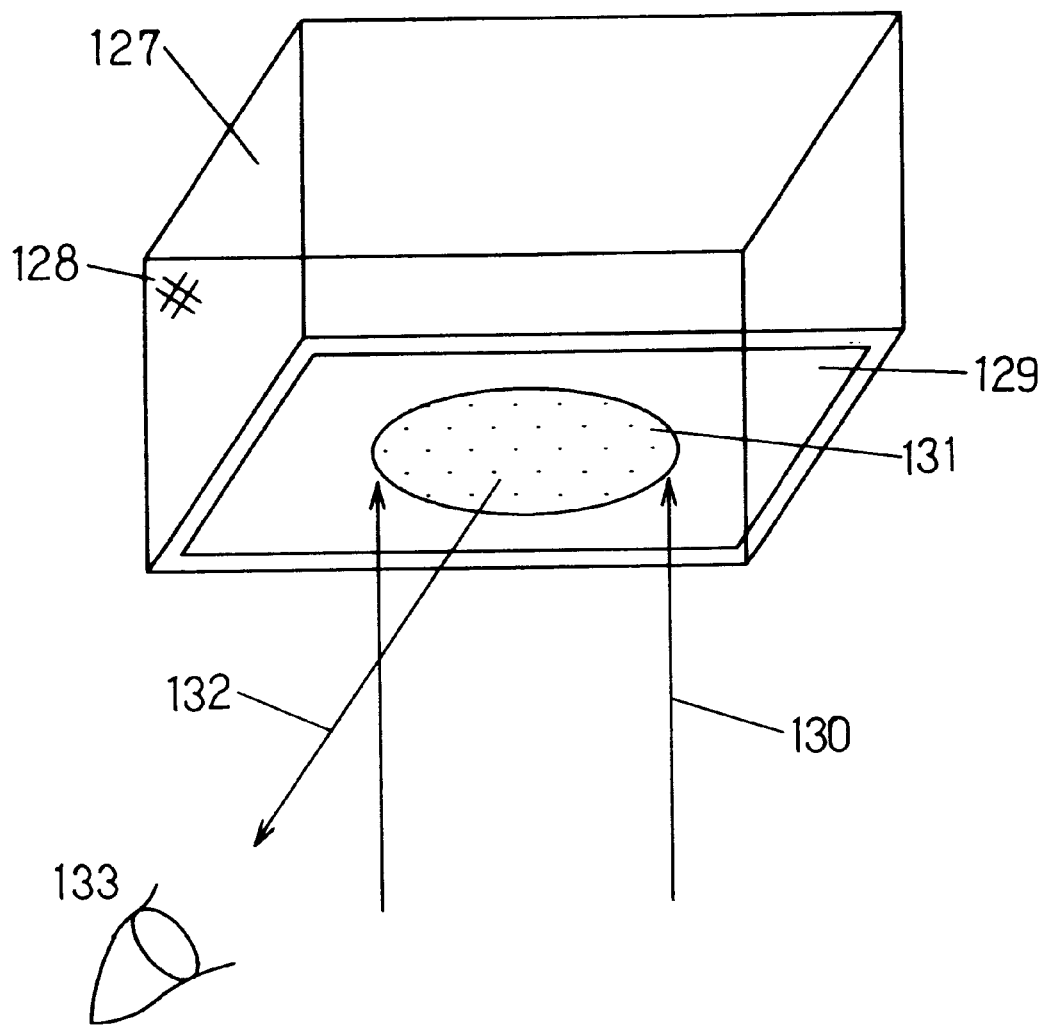
FIG. 61 is a perspective view showing an observation of the scattering light due to the photopolymer.
Figure 62:
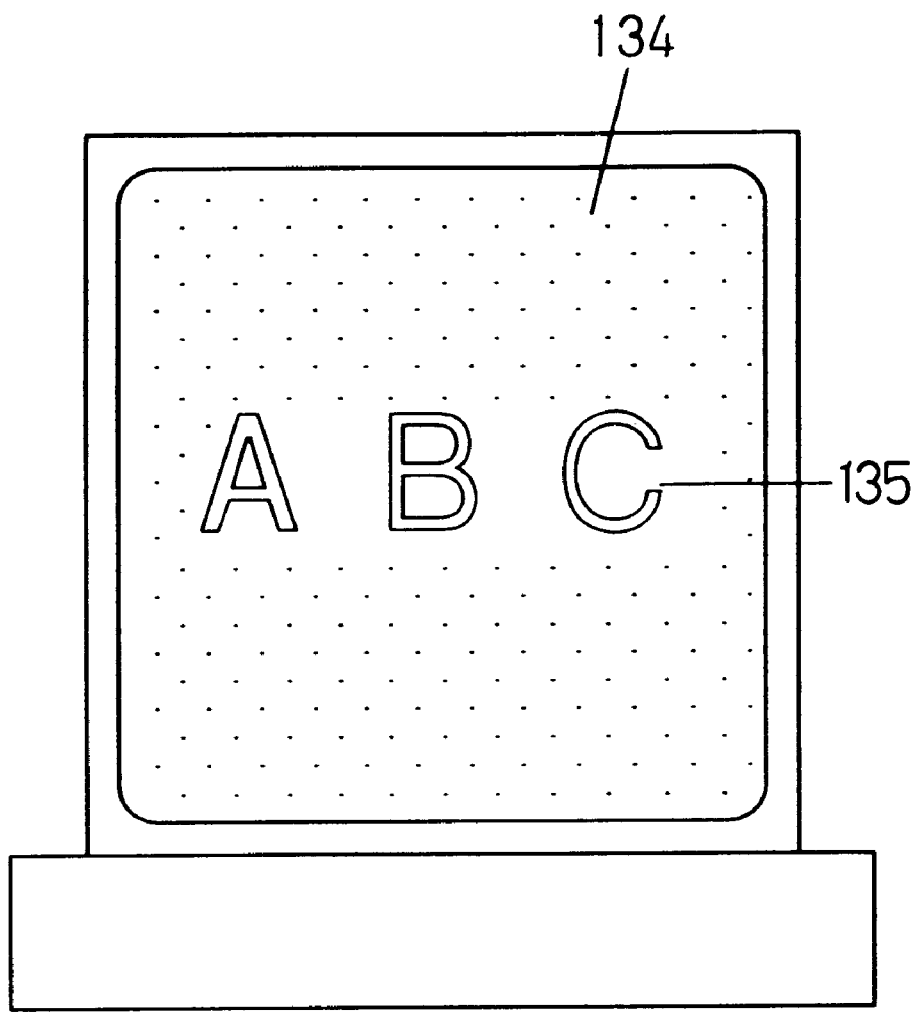
FIG. 62 is a front view showing an image including scattering noise displayed by the conventional display apparatus.

As shown in FIG. 54, it is possible that the positions of the transparent substrate 2 and the reflection hologram H0 are turned. In this case, the propagation light which passes through the boundary face between the transparent substrate 2 and the hologram H0, is totally reflected by the boundary face between the hologram H0 and the atmosphere, is diffracted by the boundary between the hologram H0 and the transparent substrate 2, and finally exits from the surface of the hologram H0. This is applicable to the transmission hologram.

The above-mentioned display apparatus of this invention is basically configured so as to exit the illumination light obliquely from the surface of the hologram device. An illuminator, in which the illumination light exits vertically from the surface of the hologram, can be configured. The illuminator is used for illuminating an optical shutter display apparatus, such as the twisted nematic liquid crystal display apparatus illuminated from the back. Alternatively, since the illuminator is transparent, it is used for illuminating a reflection display apparatus from the front. In any case, the principle of the dichroic or trichromatic and high luminance of this invention are applicable.

The method for varying the degree of modulation, and for varying the slanted angle and the pitch of the periodic structure of the hologram are effective in the display apparatus without using the transparent layer. Similarly, the selection of the exit direction of the illumination light corresponding to the type of hologram is applicable to the display apparatus without using the transparent layer. For example, the illuminance of the display apparatus for displaying the image by the illumination of the mixture of the blue and green can be increased. In the display apparatus without the transparent layer, when the refraction index of the hologram is less than that of the transparent substrate, a monochromatic display is realized. In this configuration, the effect of a light having a larger incident angle is smaller, so that the diffraction efficiency of the light is reduced. In the reflection hologram, the intensity of the diffraction of a first light having the shorter wavelength is less than a second light having the longer wavelength. Thus, the second light having the longer wavelength contributes the most to the illumination. In the transmission hologram, the light relations are opposite, as mentioned above.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A display apparatus comprising:
   a polymer dispersed liquid crystal display device, a source of light, a transparent substrate, a transparent layer having a refractive index lower than that of the transparent substrate, the transparent layer being formed on said transparent substrate; and
   a hologram, at least a portion of which is formed on said transparent layer.

2. The display apparatus in accordance with claim 1, wherein said hologram has multiple hologram structure.

3. The display apparatus in accordance with claim 1, wherein the hologram is a reflection type, the light emitted from the source entering into the transparent substrate from a bottom end face thereof, and the light being diffracted by the hologram and obliquely and downwardly exiting from a front face of the transparent surface.

4. The display apparatus in accordance with claim 1, wherein the hologram is a transmission type, the light emitted from the source entering into the transparent substrate from a bottom end face thereof, and the light being diffracted by the hologram and obliquely and upwardly exiting from a front face of the transparent substrate.

5. The display apparatus in accordance with claim 1, wherein a degree of modulation of a refractive index of the hologram is varied corresponding to a portion of the hologram.

6. The display apparatus in accordance with claim 1, wherein for at least one wavelength of the light from said source propagating in said transparent substrate by repeated reflection on boundary surfaces thereof with an incident angle $\theta$, $$nT \leq nS \sin \theta$$

where nT is the refractive index of the transparent layer, and nS is the refractive index of the transparent substrate.

7. The display apparatus in accordance with claim 1, wherein a pitch, a slanted angle, or the pitch and the slanted angle of periodic structure of the hologram is varied corresponding to a portion of the hologram.

8. The display apparatus in accordance with claim 7, wherein the pitch of the periodic structure of the hologram is $\Lambda$, the slanted angle of the periodic structure is $\angle$ mean value of a refractive index of the hologram is nH, the refractive index of the transparent substrate is nS, the circular constant is $\pi$, and a wavelength of light emitted from the source is $\lambda$, satisfies $$\phi + \cos^{-1}(\lambda/2nH\Lambda) + \sin^{-1}(1/nS) < \pi/2.$$

9. The display apparatus in accordance with claim 7, wherein the pitch of the periodic structure of the hologram is $\Lambda$, the slanted angle of the periodic structure is $\phi$, a mean value of a refractive index of the hologram is nH, a wavelength of light emitted from the source is $\lambda$ satisfies $$\lambda/2nH\Lambda \leq 1.$$

* * * * *